US012779479B2

(12) United States Patent
Tschan

(10) Patent No.: US 12,779,479 B2
(45) Date of Patent: Nov. 3, 2026

(54) MULTIPART MATERIAL NEEDLE FOR A PAINT SPRAY GUN, FRONT NEEDLE OF A MATERIAL NEEDLE, PAINT SPRAY GUN, AND METHOD FOR EXCHANGING A FRONT NEEDLE

(71) Applicant: SATA GmbH & Co. KG, Kornwestheim (DE)

(72) Inventor: Alexander Tschan, Kornwestheim (DE)

(73) Assignee: SATA GmbH & Co. KG, Kornwestheim (DE)

( * ) Notice: Subject to any disclaimer, the term of this patent is extended or adjusted under 35 U.S.C. 154(b) by 320 days.

(21) Appl. No.: 18/692,855

(22) PCT Filed: Sep. 15, 2022

(86) PCT No.: PCT/EP2022/075664

§ 371 (c)(1),
(2) Date: Mar. 18, 2024

(87) PCT Pub. No.: WO2023/041656

PCT Pub. Date: Mar. 23, 2023

(65) Prior Publication Data

US 2024/0408626 A1 Dec. 12, 2024

(30) Foreign Application Priority Data

Sep. 17, 2021 (DE) ..................... 10 2021 124 140.5

(51) Int. Cl.
*B05B 1/30* (2006.01)
*B05B 7/24* (2006.01)
*F16C 31/02* (2006.01)

(52) U.S. Cl.
CPC .......... *B05B 1/3046* (2013.01); *B05B 7/2489* (2013.01); *F16C 31/02* (2013.01)

(58) Field of Classification Search
CPC ...... B05B 1/3046–3066; B05B 7/0815; B05B 7/2424; B05B 7/2489; F16C 31/02
See application file for complete search history.

(56) References Cited

U.S. PATENT DOCUMENTS 40,433 A 10/1863 Sees
327,260 A 9/1885 Hart
(Continued)

FOREIGN PATENT DOCUMENTS

AT 153883 6/1997
AT 163577 3/1998
(Continued)

OTHER PUBLICATIONS

Final Office Action dated Sep. 23, 2020, for U.S. Appl. No. 15/575,549.

(Continued)

*Primary Examiner* — Tuongminh N Pham
(74) *Attorney, Agent, or Firm* — Fleit Intellectual Property Law; Paul D. Bianco

(57) ABSTRACT

A material needle is insertable into a guide channel of a spray gun and is displaceable along a longitudinal axis to open and close a nozzle opening of the spray gun material nozzle by a defined needle stroke movement. The material needle has front and rear needles which are releasably connected together to guide axial forces via an axial form-fitting connection. The axial form-fitting connection is formed by front form-fitting elements arranged on the front needle and rear form-fitting elements arranged on the rear needle. The front and/or rear form-fitting elements can be elastically deflected in a direction perpendicular to the longitudinal axis to release the axial form-fitting connection. The axial form-fitting connection is secured against being released by a securing member which includes an externally sliding bearing surface of the front needle and/or the rear
(Continued)

needle to interact with a corresponding sliding surface of the spray gun.

23 Claims, 17 Drawing Sheets

(56) References Cited

U.S. PATENT DOCUMENTS

| | | | |
|---|---|---|---|
| 459,432 | A | 9/1891 | Anderson |
| 459,433 | A | 9/1891 | Avery |
| 548,816 | A | 10/1895 | Paul |
| 552,213 | A | 12/1895 | Troy |
| 552,715 | A | 1/1896 | Lugrin |
| 563,505 | A | 7/1896 | McCornack |
| 574,880 | A | 1/1897 | Collison |
| 581,107 | A | 4/1897 | Emery |
| 644,803 | A | 3/1900 | Justi |
| 672,012 | A | 4/1901 | Ruper |
| 1,610,190 | A | 12/1926 | Anderson |
| 1,662,496 | A | 3/1928 | Forsgard |
| 1,703,383 | A | 2/1929 | Birkenmaier |
| 1,703,384 | A | 2/1929 | Birkenmaier |
| 1,711,221 | A | 4/1929 | Blakeslee |
| 1,751,787 | A | 3/1930 | Binks |
| 1,889,201 | A | 11/1932 | Holveck |
| 1,958,730 | A | 5/1934 | Tracy |
| 2,004,303 | A | 6/1935 | Wahlin |
| 2,008,381 | A | 7/1935 | Beeg |
| D99,473 | S | 4/1936 | Bramsen |
| 2,049,700 | A | 8/1936 | Gustafson |
| 2,051,210 | A | 8/1936 | Gustafsson |
| 2,070,696 | A | 2/1937 | Tracy |
| 2,116,036 | A | 5/1938 | Money |
| 2,125,445 | A | 8/1938 | Holveck |
| 2,198,441 | A | 4/1940 | Mollart |
| 2,204,599 | A | 6/1940 | Jenkins |
| 2,269,057 | A | 1/1942 | Jenkins |
| D133,223 | S | 7/1942 | Tammen |
| 2,356,865 | A | 8/1944 | Mason |
| 2,416,856 | A | 3/1947 | Thomsen |
| 2,416,923 | A | 3/1947 | Jenkins |
| 2,470,718 | A | 5/1949 | Peeps |
| 2,533,953 | A | 12/1950 | Peeps |
| 2,557,593 | A | 6/1951 | Bjorkman |
| 2,557,606 | A | 6/1951 | Liedberg |
| 2,559,091 | A | 7/1951 | Reasenberg |
| 2,578,402 | A | 12/1951 | Dalrymple |
| 2,609,961 | A | 9/1952 | Sapien |
| 2,612,899 | A | 10/1952 | Webb |
| 2,626,188 | A | 1/1953 | Dalrymple |
| 2,646,314 | A | 7/1953 | Peeps |
| 2,721,004 | A | 10/1955 | Schultz |
| 2,743,963 | A | 5/1956 | Peeps |
| 2,844,267 | A | 7/1958 | Petriccione |
| 2,886,252 | A | 5/1959 | Ehrensperger |
| 3,090,530 | A | 5/1963 | Peeps |
| D196,477 | S | 10/1963 | Kelly |
| 3,159,472 | A | 12/1964 | Revell |
| D200,594 | S | 3/1965 | Sass |
| 3,240,398 | A | 3/1966 | Dalton, Jr. |
| D204,306 | S | 4/1966 | Hamm |
| D205,760 | S | 9/1966 | Hocult et al. |
| 3,327,949 | A | 6/1967 | Eull |
| D208,903 | S | 10/1967 | Zadron et al. |
| 3,344,992 | A | 10/1967 | Norris |
| D209,792 | S | 1/1968 | Clark |
| 3,381,845 | A | 5/1968 | MacDonald |
| 3,417,650 | A | 12/1968 | Varrin |
| 3,420,106 | A | 1/1969 | Keller et al. |
| 3,435,683 | A | 4/1969 | Keller et al. |
| 3,463,363 | A | 8/1969 | Zelna |
| 3,482,781 | A | 12/1969 | Sharpe |
| D217,928 | S | 6/1970 | Felske |
| 3,524,589 | A | 8/1970 | Pelton, Jr. |
| 3,527,372 | A | 9/1970 | Manning |
| 3,583,632 | A | 6/1971 | Schaffer |
| 3,622,078 | A | 11/1971 | Gronert |
| 3,645,562 | A | 2/1972 | Fandetti et al. |
| 3,656,493 | A | 4/1972 | Black et al. |
| 3,714,967 | A | 2/1973 | Zupan et al. |
| 3,746,253 | A | 7/1973 | Walberg |
| 3,747,850 | A | 7/1973 | Hastings et al. |
| 3,771,539 | A | 11/1973 | De Santis |
| 3,840,143 | A | 10/1974 | Davis et al. |
| 3,848,807 | A | 11/1974 | Partida |
| 3,857,511 | A | 12/1974 | Govindan |
| 3,870,223 | A | 3/1975 | Wyant |
| 3,873,023 | A | 3/1975 | Moss et al. |
| 3,938,739 | A | 2/1976 | Bertilsson et al. |
| 4,000,915 | A | 1/1977 | Strom |
| D245,048 | S | 7/1977 | Pool |
| 4,105,164 | A | 8/1978 | Lau |
| D252,097 | S | 6/1979 | Probst et al. |
| 4,160,525 | A | 7/1979 | Wagner |
| 4,162,042 | A | 7/1979 | Mommsen |
| 4,171,091 | A | 10/1979 | van Hardeveld et al. |
| 4,210,263 | A | 7/1980 | Bos |
| 4,273,293 | A | 6/1981 | Hastings |
| 4,278,276 | A | 7/1981 | Ekman |
| 4,411,387 | A | 10/1983 | Stern et al. |
| 4,478,370 | A | 10/1984 | Hastings |
| D276,472 | S | 11/1984 | Harrison |
| D278,543 | S | 4/1985 | Gintz |
| 4,545,536 | A | 10/1985 | Avidon |
| 4,562,965 | A | 1/1986 | Ihmels et al. |
| 4,572,437 | A | 2/1986 | Huber et al. |
| 4,580,035 | A | 4/1986 | Luscher |
| 4,585,168 | A | 4/1986 | Even et al. |
| 4,614,300 | A | 9/1986 | Falcoff |
| 4,643,330 | A | 2/1987 | Kennedy |
| 4,653,661 | A | 3/1987 | Buchner et al. |
| 4,667,878 | A | 5/1987 | Behr |
| 4,713,257 | A | 12/1987 | Luttermoeller |
| D293,950 | S | 1/1988 | Ogden et al. |
| 4,730,753 | A | 3/1988 | Grime |
| 4,767,057 | A | 8/1988 | Degli et al. |
| D298,372 | S | 11/1988 | Taylor, Jr. |
| 4,784,184 | A | 11/1988 | Gates |
| 4,806,736 | A | 2/1989 | Schirico |
| 4,826,539 | A | 5/1989 | Harpold |
| 4,832,232 | A | 5/1989 | Broccoli |
| 4,844,347 | A | 7/1989 | Konhäuser |
| 4,854,504 | A | 8/1989 | Hedger, Jr. et al. |
| 4,863,781 | A | 9/1989 | Kronzer |
| 4,877,144 | A | 10/1989 | Thanisch |
| D305,057 | S | 12/1989 | Morgan |
| 4,887,747 | A | 12/1989 | Ostrowsky et al. |
| 4,901,761 | A | 2/1990 | Taylor |
| 4,906,151 | A | 3/1990 | Kubis |
| 4,917,300 | A | 4/1990 | Gloviak et al. |
| 4,946,075 | A | 8/1990 | Lundback |
| 4,964,361 | A | 10/1990 | Aebersold |
| 4,967,600 | A | 11/1990 | Keller |
| 4,969,603 | A | 11/1990 | Norman |
| 4,973,184 | A | 11/1990 | La Salle |
| D313,064 | S | 12/1990 | Lind |
| D314,421 | S | 2/1991 | Tajima et al. |
| D314,588 | S | 2/1991 | Denham |
| 4,989,787 | A | 2/1991 | Nikkel et al. |
| 5,020,700 | A | 6/1991 | Krzywdziak et al. |
| D318,877 | S | 8/1991 | Miranda et al. |
| 5,042,840 | A | 8/1991 | Rieple et al. |
| D321,597 | S | 11/1991 | Cerny |
| 5,064,119 | A | 11/1991 | Mellette |
| 5,071,074 | A | 12/1991 | Lind |
| 5,074,334 | A | 12/1991 | Onodera |
| 5,078,323 | A | 1/1992 | Frank |
| 5,078,325 | A | 1/1992 | Waryu |
| 5,080,285 | A | 1/1992 | Toth |
| 5,088,648 | A | 2/1992 | Schmon |
| 5,090,623 | A | 2/1992 | Burns et al. |
| 5,102,045 | A | 4/1992 | Diana |
| 5,119,992 | A | 6/1992 | Grime |
| 5,125,391 | A | 6/1992 | Srivastava et al. |

(56) References Cited

U.S. PATENT DOCUMENTS

| | | | |
|---|---|---|---|
| 5,135,124 | A | 8/1992 | Wobser |
| 5,143,102 | A | 9/1992 | Blaul |
| 5,165,605 | A | 11/1992 | Morita et al. |
| 5,170,941 | A | 12/1992 | Morita et al. |
| 5,190,219 | A | 3/1993 | Copp, Jr. |
| 5,191,797 | A | 3/1993 | Smith |
| 5,209,405 | A | 5/1993 | Robinson |
| 5,228,488 | A | 7/1993 | Fletcher |
| 5,232,299 | A | 8/1993 | Hiss |
| 5,236,128 | A | 8/1993 | Morita et al. |
| 5,249,746 | A | 10/1993 | Kaneko et al. |
| D341,186 | S | 11/1993 | Albers |
| 5,289,974 | A | 3/1994 | Grime et al. |
| 5,322,221 | A | 6/1994 | Anderson |
| 5,325,473 | A | 6/1994 | Monroe et al. |
| 5,332,156 | A | 7/1994 | Wheeler |
| 5,333,506 | A | 8/1994 | Smith et al. |
| 5,333,908 | A | 8/1994 | Dorney et al. |
| 5,344,078 | A | 9/1994 | Fritz et al. |
| 5,367,148 | A | 11/1994 | Storch et al. |
| D353,836 | S | 12/1994 | Carvelli et al. |
| 5,381,962 | A | 1/1995 | Teague |
| 5,435,491 | A | 7/1995 | Sakuma |
| 5,443,642 | A | 8/1995 | Bienduga |
| 5,456,414 | A | 10/1995 | Burns et al. |
| D365,962 | S | 1/1996 | Gagnon et al. |
| 5,503,439 | A | 4/1996 | LaJeunesse et al. |
| 5,529,245 | A | 6/1996 | Brown |
| 5,533,674 | A | 7/1996 | Feyrer et al. |
| 5,540,385 | A | 7/1996 | Garlick |
| 5,540,386 | A | 7/1996 | Roman |
| D376,637 | S | 12/1996 | Kieffer |
| 5,582,350 | A | 12/1996 | Kosmyna et al. |
| 5,584,899 | A | 12/1996 | Shorts |
| 5,588,562 | A | 12/1996 | Sander et al. |
| 5,592,597 | A | 1/1997 | Kiss |
| 5,609,302 | A | 3/1997 | Smith |
| 5,613,637 | A | 3/1997 | Schmon |
| D380,301 | S | 7/1997 | Kogutt |
| 5,655,714 | A | 8/1997 | Kieffer et al. |
| 5,662,444 | A | 9/1997 | Schmidt, Jr. |
| 5,667,143 | A | 9/1997 | Sebion et al. |
| 5,695,125 | A | 12/1997 | Kumar |
| 5,704,381 | A | 1/1998 | Millan et al. |
| 5,718,767 | A | 2/1998 | Crum et al. |
| D391,403 | S | 3/1998 | Josephs |
| 5,725,161 | A | 3/1998 | Hartle |
| RE35,769 | E | 4/1998 | Grime et al. |
| 5,755,363 | A | 5/1998 | Gantner et al. |
| 5,762,228 | A | 6/1998 | Morgan et al. |
| 5,803,360 | A | 9/1998 | Spitznagel |
| 5,816,501 | A | 10/1998 | LoPresti et al. |
| 5,829,682 | A | 11/1998 | Haruch |
| 5,836,517 | A | 11/1998 | Burns et al. |
| D402,820 | S | 12/1998 | Morison et al. |
| 5,843,515 | A | 12/1998 | Crum et al. |
| 5,853,014 | A | 12/1998 | Rosenauer |
| D405,503 | S | 2/1999 | Edo |
| D405,603 | S | 2/1999 | Takeshi |
| 5,874,680 | A | 2/1999 | Moore |
| 5,884,006 | A | 3/1999 | Frohlich et al. |
| D409,719 | S | 5/1999 | Kaneko |
| D412,965 | S | 8/1999 | Kieffer |
| 5,941,461 | A | 8/1999 | Akin et al. |
| 5,951,190 | A | 9/1999 | Wilson |
| 5,951,296 | A | 9/1999 | Klein |
| 5,954,268 | A | 9/1999 | Joshi et al. |
| D414,636 | S | 10/1999 | Wiese |
| 5,979,797 | A | 11/1999 | Castellano |
| 5,992,763 | A | 11/1999 | Smith et al. |
| 6,006,930 | A | 12/1999 | Dreyer et al. |
| 6,010,082 | A | 1/2000 | Peterson |
| 6,017,394 | A | 1/2000 | Crum et al. |
| 6,019,294 | A | 2/2000 | Anderson |
| 6,036,109 | A | 3/2000 | DeYoung |
| 6,039,218 | A | 3/2000 | Beck |
| 6,050,499 | A | 4/2000 | Takayama |
| 6,053,429 | A | 4/2000 | Chang |
| 6,056,213 | A | 5/2000 | Ruta et al. |
| 6,056,215 | A | 5/2000 | Hansinger |
| 6,089,471 | A | 7/2000 | Scholl |
| 6,089,607 | A | 7/2000 | Keeney et al. |
| 6,091,053 | A | 7/2000 | Aonuma |
| 6,092,740 | A | 7/2000 | Liu |
| 6,105,881 | A | 8/2000 | Kitajima |
| 6,132,511 | A | 10/2000 | Crum et al. |
| D435,379 | S | 12/2000 | Nguyen |
| 6,230,986 | B1 | 5/2001 | Vacher et al. |
| 6,250,567 | B1 | 6/2001 | Lewis et al. |
| 6,267,301 | B1 | 7/2001 | Haruch |
| 6,276,616 | B1 | 8/2001 | Jenkins |
| D448,451 | S | 9/2001 | Turnbull et al. |
| 6,308,991 | B1 | 10/2001 | Royer |
| D457,599 | S | 5/2002 | Karwoski et al. |
| D459,432 | S | 6/2002 | Schmon |
| D459,433 | S | 6/2002 | Schmon |
| 6,402,058 | B2 | 6/2002 | Kaneko et al. |
| 6,402,062 | B1 | 6/2002 | Bending et al. |
| 6,431,466 | B1 | 8/2002 | Kitajima |
| 6,435,426 | B1 | 8/2002 | Copp, Jr. |
| 6,442,276 | B1 | 8/2002 | Doljack |
| 6,450,422 | B1 | 9/2002 | Maggio |
| 6,494,387 | B1 | 12/2002 | Kaneko |
| 6,536,684 | B1 | 3/2003 | Wei |
| 6,536,687 | B1 | 3/2003 | Navis et al. |
| D472,730 | S | 4/2003 | Sparkowski |
| 6,540,114 | B1 | 4/2003 | Popovich et al. |
| 6,543,632 | B1 | 4/2003 | McIntyre et al. |
| 6,547,160 | B1 | 4/2003 | Huang |
| 6,547,884 | B1 | 4/2003 | Crum et al. |
| 6,553,712 | B1 | 4/2003 | Majerowski et al. |
| 6,554,009 | B1 | 4/2003 | Beijbom et al. |
| D474,528 | S | 5/2003 | Huang |
| 6,585,173 | B2 | 7/2003 | Schmon et al. |
| 6,595,441 | B2 | 7/2003 | Petrie et al. |
| 6,612,506 | B1 | 9/2003 | Huang |
| 6,626,382 | B1 | 9/2003 | Liu |
| 6,626,383 | B1 | 9/2003 | Campbell |
| 6,647,997 | B2 | 11/2003 | Mohn |
| 6,661,438 | B1 | 12/2003 | Shiraishi et al. |
| D485,685 | S | 1/2004 | Zupkofska et al. |
| 6,675,845 | B2 | 1/2004 | Volpenheim et al. |
| 6,692,118 | B2 | 2/2004 | Michele et al. |
| 6,712,292 | B1 | 3/2004 | Gosis et al. |
| 6,717,584 | B2 | 4/2004 | Kulczycka |
| 6,732,751 | B2 | 5/2004 | Chiang |
| 6,763,964 | B1 | 7/2004 | Hurlbut et al. |
| 6,766,763 | B2 | 7/2004 | Crum et al. |
| 6,786,345 | B2 | 9/2004 | Richards |
| 6,796,514 | B1 | 9/2004 | Schwartz |
| 6,801,211 | B2 | 10/2004 | Forsline et al. |
| 6,820,824 | B1 | 11/2004 | Joseph et al. |
| 6,843,390 | B1 | 1/2005 | Bristor |
| 6,845,924 | B2 | 1/2005 | Schmon |
| 6,855,173 | B2 | 2/2005 | Ehrnsperger et al. |
| 6,863,310 | B1 | 3/2005 | Petkovsek |
| 6,863,920 | B2 | 3/2005 | Crum et al. |
| 6,874,656 | B2 | 4/2005 | Rohr et al. |
| 6,874,664 | B1 | 4/2005 | Montgomery |
| 6,874,708 | B2 | 4/2005 | Reetz, III |
| 6,877,677 | B2 | 4/2005 | Schmon et al. |
| 6,929,019 | B2 | 8/2005 | Weinmann et al. |
| 6,945,429 | B2 | 9/2005 | Gosis et al. |
| 6,955,180 | B2 | 10/2005 | Kocherlakota et al. |
| 6,962,432 | B2 | 11/2005 | Hofeldt |
| 6,963,331 | B1 | 11/2005 | Kobayashi et al. |
| 7,017,838 | B2 | 3/2006 | Schmon |
| 7,018,154 | B2 | 3/2006 | Schmon |
| D519,687 | S | 4/2006 | Zahav |
| 7,032,839 | B2 | 4/2006 | Biette |
| 7,036,752 | B1 | 5/2006 | Hsiang |
| 7,083,119 | B2 | 8/2006 | Bouic et al. |
| 7,090,148 | B2 | 8/2006 | Petrie et al. |
| 7,097,118 | B1 | 8/2006 | Huang |

(56) References Cited

U.S. PATENT DOCUMENTS

D528,192 S 9/2006 Nicholson
7,106,343 B1 9/2006 Hickman
7,165,732 B2 1/2007 Kosmyna et al.
7,172,139 B2 2/2007 Bouic et al.
7,175,110 B2 2/2007 Vicentini
7,182,213 B2 2/2007 King
D538,050 S 3/2007 Tardif
D538,493 S 3/2007 Zimmerle et al.
D538,886 S 3/2007 Huang
7,194,829 B2 3/2007 Boire et al.
D541,053 S 4/2007 Sanders
D541,088 S 4/2007 Nesci
7,201,336 B2 4/2007 Blette et al.
7,216,813 B2 5/2007 Rogers
D545,943 S 7/2007 Rodgers et al.
7,246,713 B2 7/2007 King
7,249,519 B2 7/2007 Rogers
D548,816 S 8/2007 Schmon
7,255,293 B2 8/2007 Dodd
7,264,131 B2 9/2007 Tsutsumi et al.
D552,213 S 10/2007 Schmon
D552,715 S 10/2007 Schmon
D554,703 S 11/2007 Josephson
7,328,855 B2 2/2008 Chatron et al.
D563,505 S 3/2008 Schmon
7,374,111 B2 5/2008 Joseph et al.
D570,448 S 6/2008 Wang
D571,463 S 6/2008 Chesnin
7,384,004 B2 6/2008 Rogers
7,389,945 B2 6/2008 Huang
RE40,433 E 7/2008 Schmon
D573,227 S 7/2008 Mirazita et al.
D574,926 S 8/2008 Huang
D574,927 S 8/2008 Larsen
D575,374 S 8/2008 Huang
7,410,106 B2 8/2008 Escoto, Jr. et al.
7,416,140 B2 8/2008 Camilleri et al.
7,422,164 B2 9/2008 Matsumoto
D579,213 S 10/2008 Aipa
D581,107 S 11/2008 Schmon
D581,483 S 11/2008 Bass et al.
D583,013 S 12/2008 Wang
7,458,612 B1 12/2008 Bennett
7,472,840 B2 1/2009 Gregory
D588,231 S 3/2009 Pellin
7,533,678 B2 5/2009 Rosa
7,540,434 B2 6/2009 Gohring et al.
7,542,032 B2 6/2009 Kruse
7,568,638 B2 8/2009 Gehrung
D604,394 S 11/2009 Wang
7,614,571 B2 11/2009 Camilleri et al.
D607,086 S 12/2009 Kosaka
7,624,869 B2 12/2009 Primer
D607,972 S 1/2010 Wang
D608,858 S 1/2010 Baltz et al.
D613,820 S 4/2010 Chou
D614,731 S 4/2010 Wang
7,694,893 B2 4/2010 Zittel et al.
7,694,896 B2 4/2010 Turnbull et al.
D615,586 S 5/2010 Kudimi
D616,022 S 5/2010 Kudimi
D616,527 S 5/2010 Anderson et al.
7,765,876 B1 8/2010 Chen
D624,668 S 9/2010 Noppe
7,810,744 B2 10/2010 Schmon et al.
7,819,341 B2 10/2010 Schmon et al.
D627,039 S 11/2010 Yu
D627,432 S 11/2010 Escoto et al.
7,823,806 B2 11/2010 Schmon
D629,623 S 12/2010 Lampe
7,856,940 B2 12/2010 Wendler
7,913,938 B2 3/2011 Cooper
7,922,107 B2 4/2011 Fox
D637,269 S 5/2011 Wang
D638,121 S 5/2011 Villasana
D639,863 S 6/2011 Langan
D641,067 S 7/2011 Wang
D644,716 S 9/2011 Gehrung
D644,803 S 9/2011 Schmon
D645,094 S 9/2011 Langan
8,042,402 B2 10/2011 Brown et al.
D649,196 S 11/2011 Langan
8,052,071 B2 11/2011 Kruse
D655,347 S 3/2012 Gehrung
8,127,963 B2 3/2012 Gerson et al.
D657,276 S 4/2012 Brose
D661,492 S 6/2012 Ranschau
D661,742 S 6/2012 Clark
D663,960 S 7/2012 Jeronimo
8,225,892 B2 7/2012 Ben-Tzvi
D664,773 S 8/2012 Papin
8,240,579 B1 8/2012 Bennett
8,297,536 B2 10/2012 Ruda
D670,085 S 11/2012 Brookman et al.
8,308,086 B2 11/2012 Micheli
D671,988 S 12/2012 Leipold
D672,012 S 12/2012 Brose
D674,880 S 1/2013 Schmon
8,352,744 B2 1/2013 Kruse
8,360,345 B2 1/2013 Micheli
D681,162 S 4/2013 Kruse
8,444,067 B2 5/2013 Schmon et al.
8,454,759 B2 6/2013 Selsvik
8,481,124 B2 7/2013 Nolte et al.
D689,590 S 9/2013 Brose
D689,593 S 9/2013 Schmon
D690,799 S 10/2013 Maier
D692,530 S 10/2013 Gehrung
D692,532 S 10/2013 Li et al.
8,616,434 B2 12/2013 Wilen
D697,584 S 1/2014 Schmon
D698,008 S 1/2014 Schmon et al.
8,626,674 B2 1/2014 Whitehouse
8,642,131 B2 2/2014 Nolte et al.
D703,293 S 4/2014 Price
8,690,083 B2 4/2014 Drozd
D704,300 S 5/2014 Li
8,757,182 B2 6/2014 Schmon
8,807,460 B2 8/2014 Charpie et al.
8,857,732 B2 10/2014 Brose
8,870,097 B2 10/2014 Micheli
D720,015 S 12/2014 Kruse
D720,041 S 12/2014 Robinson
8,899,501 B2 12/2014 Fox et al.
D721,785 S 1/2015 Gehrung
8,925,836 B2 1/2015 Dettlaff et al.
8,926,836 B2 1/2015 Dettlaff
D726,982 S 4/2015 Campelli
D733,369 S 6/2015 Tschan
D733,453 S 7/2015 Tschan
D734,428 S 7/2015 Wang
D734,429 S 7/2015 Wang
D734,571 S 7/2015 Tschan
9,073,068 B2 7/2015 Krayer et al.
D737,126 S 8/2015 Tschan
D740,393 S 10/2015 Gehrung
D745,636 S 12/2015 Lin
9,220,853 B2 12/2015 Vogt
D757,216 S 5/2016 Gehrung
9,333,519 B2 5/2016 Brose
D758,533 S 6/2016 Dettlaff
D758,537 S 6/2016 Gehrung
9,433,953 B2 9/2016 Ghesla
D768,820 S 10/2016 Binz
D770,593 S 11/2016 Gehrung
9,498,788 B2 11/2016 Kosaka
D773,609 S 12/2016 Morita
9,533,317 B2 1/2017 Gehrung
D792,557 S 7/2017 Wang
D794,756 S 8/2017 Wang
9,782,784 B2 10/2017 Schmon et al.
D803,354 S 11/2017 Negri
9,878,336 B2 1/2018 Gehrung
9,878,340 B2 1/2018 Schmon et al.

(56) References Cited

U.S. PATENT DOCUMENTS

| | | | |
|---|---|---|---|
| D812,719 | S | 3/2018 | Kosaka |
| D820,389 | S | 6/2018 | Gehrung |
| D830,506 | S | 10/2018 | Gehrung |
| D831,792 | S | 10/2018 | Gehrung |
| D835,235 | S | 12/2018 | Gehrung et al. |
| D839,386 | S | 1/2019 | Ghorbani |
| 10,189,037 | B2 | 1/2019 | Schmon et al. |
| 10,247,313 | B2 | 4/2019 | Chien |
| D861,130 | S | 9/2019 | Caris |
| 10,464,076 | B2 | 11/2019 | Kruse |
| 10,471,449 | B2 | 11/2019 | Gehrung |
| D877,294 | S | 3/2020 | Johnston |
| D888,196 | S | 6/2020 | Okajima |
| 10,702,879 | B2 | 7/2020 | Gehrung |
| 10,940,498 | B2 | 3/2021 | Fideler |
| 11,000,872 | B2 | 5/2021 | Speck |
| D927,645 | S | 8/2021 | Davies |
| D929,539 | S | 8/2021 | Stech |
| D929,838 | S | 9/2021 | Tschan |
| D934,383 | S | 10/2021 | Stech |
| 11,141,747 | B2 | 10/2021 | Schmon |
| D937,385 | S | 11/2021 | Takeshita |
| D943,061 | S | 2/2022 | Mcintyre, II |
| D950,679 | S | 5/2022 | Wu |
| D968,568 | S | 11/2022 | Shih |
| D1,004,055 | S | 11/2023 | Chen |
| 11,865,558 | B2 | 1/2024 | Volk |
| 2001/0004996 | A1 | 6/2001 | Schmon |
| 2001/0040192 | A1 | 11/2001 | Kaneko et al. |
| 2002/0092928 | A1 | 7/2002 | Conroy |
| 2002/0134861 | A1 | 9/2002 | Petrie et al. |
| 2002/0148501 | A1 | 10/2002 | Shieh |
| 2002/0170978 | A1 | 11/2002 | Mohn |
| 2003/0006322 | A1 | 1/2003 | Hartle et al. |
| 2003/0025000 | A1 | 2/2003 | Schmon |
| 2003/0066218 | A1 | 4/2003 | Schweikert |
| 2003/0121476 | A1 | 7/2003 | McIntyre et al. |
| 2003/0127046 | A1 | 7/2003 | Zehner et al. |
| 2003/0164408 | A1 | 9/2003 | Schmon |
| 2003/0173419 | A1 | 9/2003 | Huang |
| 2003/0177979 | A1 | 9/2003 | Crum et al. |
| 2003/0189105 | A1 | 10/2003 | Schmon |
| 2003/0209568 | A1 | 11/2003 | Douglas et al. |
| 2003/0213857 | A1 | 11/2003 | Schmon et al. |
| 2003/0218596 | A1 | 11/2003 | Eschler |
| 2003/0230636 | A1 | 12/2003 | Rogers |
| 2004/0046051 | A1 | 3/2004 | Santa Cruz et al. |
| 2004/0050432 | A1 | 3/2004 | Breda |
| 2004/0104194 | A1 | 6/2004 | Dennison |
| 2004/0129738 | A1 | 7/2004 | Stukas |
| 2004/0140373 | A1 | 7/2004 | Joseph et al. |
| 2004/0155063 | A1 | 8/2004 | Hofeldt |
| 2004/0159720 | A1 | 8/2004 | Komornicki |
| 2004/0177890 | A1 | 9/2004 | Weinmann |
| 2004/0191406 | A1 | 9/2004 | Crum et al. |
| 2004/0195382 | A1 | 10/2004 | Anderson |
| 2004/0217201 | A1 | 11/2004 | Ruda |
| 2004/0233223 | A1 | 11/2004 | Schkolne et al. |
| 2004/0245208 | A1 | 12/2004 | Dennison |
| 2005/0001060 | A1 | 1/2005 | Robinson |
| 2005/0056613 | A1 | 3/2005 | King |
| 2005/0082249 | A1 | 4/2005 | King |
| 2005/0127201 | A1 | 6/2005 | Matsumoto |
| 2005/0145723 | A1 | 7/2005 | Blette et al. |
| 2005/0145724 | A1 | 7/2005 | Blette et al. |
| 2005/0161525 | A1 | 7/2005 | Johansson |
| 2005/0178854 | A1 | 8/2005 | Dodd |
| 2005/0189445 | A1 | 9/2005 | Hartle et al. |
| 2005/0215284 | A1 | 9/2005 | Su |
| 2005/0218246 | A1 | 10/2005 | Chatron et al. |
| 2005/0220943 | A1 | 10/2005 | Abrams et al. |
| 2005/0242207 | A1 | 11/2005 | Tejeda |
| 2005/0248148 | A1 | 11/2005 | Schenck et al. |
| 2005/0252993 | A1 | 11/2005 | Rogers |
| 2005/0252994 | A1 | 11/2005 | Rogers |
| 2005/0268949 | A1 | 12/2005 | Rosa |
| 2005/0284963 | A1 | 12/2005 | Reedy |
| 2006/0000927 | A1 | 1/2006 | Ruda |
| 2006/0007123 | A1 | 1/2006 | Wilson et al. |
| 2006/0048803 | A1 | 3/2006 | Jessup et al. |
| 2006/0081060 | A1 | 4/2006 | Forster |
| 2006/0108449 | A1 | 5/2006 | Sodemann |
| 2006/0113409 | A1 | 6/2006 | Camilleri et al. |
| 2006/0118661 | A1 | 6/2006 | Hartle |
| 2006/0131151 | A1 | 6/2006 | Marchand |
| 2006/0171771 | A1 | 8/2006 | Kruse |
| 2006/0192377 | A1 | 8/2006 | Bauer et al. |
| 2006/0196891 | A1 | 9/2006 | Gerson et al. |
| 2007/0029788 | A1 | 2/2007 | Adler |
| 2007/0055883 | A1 | 3/2007 | Kruse |
| 2007/0131795 | A1 | 6/2007 | Abbate et al. |
| 2007/0158349 | A1 | 7/2007 | Schmon et al. |
| 2007/0205305 | A1 | 9/2007 | Vagedes |
| 2007/0221754 | A1 | 9/2007 | Gehrung |
| 2007/0228190 | A1 | 10/2007 | Tanner |
| 2007/0252378 | A1 | 11/2007 | Chambers |
| 2007/0262169 | A1 | 11/2007 | Wang |
| 2007/0262172 | A1 | 11/2007 | Huffman |
| 2008/0011879 | A1 | 1/2008 | Gerson et al. |
| 2008/0019789 | A1 | 1/2008 | Dunaway et al. |
| 2008/0029619 | A1 | 2/2008 | Gohring et al. |
| 2008/0128533 | A1 | 6/2008 | Gehrung |
| 2008/0179763 | A1 | 7/2008 | Schmon et al. |
| 2008/0251607 | A1 | 10/2008 | Krayer et al. |
| 2008/0251977 | A1 | 10/2008 | Naruse et al. |
| 2008/0264892 | A1 | 10/2008 | Nozawa |
| 2008/0272213 | A1 | 11/2008 | Ting |
| 2008/0295410 | A1 | 12/2008 | Carey et al. |
| 2009/0014557 | A1 | 1/2009 | Schmon et al. |
| 2009/0026288 | A1 | 1/2009 | Shih |
| 2009/0026290 | A1 | 1/2009 | Fox |
| 2009/0045623 | A1 | 2/2009 | Schmon |
| 2009/0072050 | A1 | 3/2009 | Ruda |
| 2009/0078789 | A1 | 3/2009 | Kruse |
| 2009/0078790 | A1 | 3/2009 | Camilleri et al. |
| 2009/0143745 | A1 | 6/2009 | Langan et al. |
| 2009/0152382 | A1 | 6/2009 | Charpie |
| 2009/0179081 | A1 | 7/2009 | Charpie |
| 2009/0183516 | A1 | 7/2009 | Appler et al. |
| 2009/0235864 | A1 | 9/2009 | Khoury et al. |
| 2009/0266915 | A1 | 10/2009 | Fedorov |
| 2009/0302133 | A1 | 12/2009 | Micheli |
| 2010/0021646 | A1 | 1/2010 | Nolte et al. |
| 2010/0059533 | A1 | 3/2010 | Unger et al. |
| 2010/0084493 | A1 | 4/2010 | Troudt |
| 2010/0108783 | A1 | 5/2010 | Joseph et al. |
| 2010/0126541 | A1 | 5/2010 | Schmon |
| 2010/0163649 | A1 | 7/2010 | Bass et al. |
| 2010/0206963 | A1 | 8/2010 | Huang |
| 2010/0270390 | A1 | 10/2010 | Reitz |
| 2010/0270400 | A1 | 10/2010 | Evar et al. |
| 2011/0024524 | A1 | 2/2011 | Fox |
| 2011/0121103 | A1 | 5/2011 | Carleton et al. |
| 2011/0125607 | A1 | 5/2011 | Wilen |
| 2011/0127767 | A1 | 6/2011 | Wicks et al. |
| 2011/0168811 | A1 | 7/2011 | Fox et al. |
| 2011/0174901 | A1 | 7/2011 | Dettlaff et al. |
| 2012/0012671 | A1 | 1/2012 | Brose et al. |
| 2012/0097762 | A1 | 4/2012 | Gehrung et al. |
| 2012/0097765 | A1 | 4/2012 | Drozd |
| 2012/0132550 | A1 | 5/2012 | Gerson et al. |
| 2012/0160935 | A1 | 6/2012 | Krayer et al. |
| 2012/0187220 | A1 | 7/2012 | Micheli et al. |
| 2013/0056556 | A1 | 3/2013 | Schmon et al. |
| 2013/0074864 | A1 | 3/2013 | Nuzzo et al. |
| 2013/0092760 | A1 | 4/2013 | Joseph |
| 2013/0266734 | A1 | 10/2013 | Nolte et al. |
| 2013/0320110 | A1 | 12/2013 | Brose et al. |
| 2013/0327850 | A1 | 12/2013 | Joseph |
| 2014/0034757 | A1 | 2/2014 | Kaneko et al. |
| 2014/0048627 | A1 | 2/2014 | Schmon et al. |
| 2014/0059905 | A1 | 3/2014 | Raming |
| 2014/0145003 | A1 | 5/2014 | Schmon et al. |
| 2014/0263686 | A1 | 9/2014 | Hedger |

(56) References Cited

U.S. PATENT DOCUMENTS

| | | | |
|---|---|---|---|
| 2014/0305962 | A1 | 10/2014 | Tschan |
| 2014/0339322 | A1 | 11/2014 | Freers |
| 2014/0346257 | A1 | 11/2014 | Reetz, III et al. |
| 2015/0108254 | A1 | 4/2015 | Commette |
| 2015/0165463 | A1 | 6/2015 | Gehrung |
| 2015/0231655 | A1 | 8/2015 | Adams et al. |
| 2015/0260600 | A1 | 9/2015 | Hata |
| 2016/0030960 | A1 | 2/2016 | Gehrung |
| 2016/0243567 | A1 | 8/2016 | Brose |
| 2017/0252771 | A1 | 9/2017 | Young, II |
| 2017/0304852 | A1 | 10/2017 | Bierie |
| 2018/0050355 | A1 | 2/2018 | Delsard |
| 2018/0050356 | A1 | 2/2018 | Gehrung et al. |
| 2018/0050358 | A1 | 2/2018 | Ruda |
| 2018/0050361 | A1 | 2/2018 | Gehrung et al. |
| 2018/0050362 | A1 | 2/2018 | Gehrung et al. |
| 2018/0111142 | A1 | 4/2018 | Joaquim |
| 2018/0133727 | A1 | 5/2018 | Schmon et al. |
| 2018/0200740 | A1 | 7/2018 | Rossbach et al. |
| 2018/0236465 | A1 | 8/2018 | Krayer |
| 2020/0038889 | A1 | 2/2020 | Volk |
| 2020/0038892 | A1 | 2/2020 | Volk |
| 2021/0162438 | A1 | 6/2021 | Zaki |
| 2021/0379612 | A1 | 12/2021 | Volk |
| 2022/0048054 | A1 | 2/2022 | Maier |
| 2022/0080448 | A1 | 3/2022 | Volk |
| 2022/0193703 | A1 | 6/2022 | Stech |
| 2023/0087047 | A1 | 3/2023 | Maier |
| 2023/0107860 | A1 | 4/2023 | Maier |
| 2023/0149955 | A1 | 5/2023 | Maier |

FOREIGN PATENT DOCUMENTS

| | | | |
|---|---|---|---|
| AT | 250467 | | 10/2003 |
| AT | 322645 | | 4/2006 |
| AT | 383910 | | 2/2008 |
| AT | 461752 | | 4/2010 |
| AT | 461753 | | 4/2010 |
| AT | 475488 | | 8/2010 |
| AU | 637187 | | 5/1993 |
| AU | 2002352235 | | 9/2003 |
| AU | 2004315547 | | 8/2005 |
| AU | 2005205899 | | 8/2005 |
| AU | 2011257605 | | 11/2012 |
| AU | 2011361295 | | 5/2013 |
| CA | 521511 | | 2/1956 |
| CA | 2126957 | | 1/1995 |
| CA | 2277096 | | 7/1998 |
| CA | 2445183 | | 10/2002 |
| CA | 2552390 | | 8/2005 |
| CA | 2555607 | | 8/2005 |
| CA | 2690112 | | 5/2009 |
| CA | 2797990 | | 12/2011 |
| CA | 2812684 | | 9/2012 |
| CA | 102917803 | | 2/2013 |
| CA | 2850401 | A1 | 5/2013 |
| CH | 200754 | A | 10/1938 |
| CH | 203 668 | | 6/1939 |
| CH | 523098 | A | 5/1972 |
| CH | 542104 | A | 9/1973 |
| CH | 676208 | | 12/1990 |
| CN | 2136077 | Y | 6/1993 |
| CN | 1738310 | A | 2/2006 |
| CN | 1802002 | | 1/2007 |
| CN | 1899704 | A | 1/2007 |
| CN | 1909970 | | 2/2007 |
| CN | 1909971 | | 2/2007 |
| CN | 1917960 | | 2/2007 |
| CN | 200954482 | | 10/2007 |
| CN | 101125316 | | 2/2008 |
| CN | 201064746 | Y | 5/2008 |
| CN | 100430150 | | 11/2008 |
| CN | 100455360 | | 1/2009 |
| CN | 101367066 | | 2/2009 |
| CN | 100478080 | | 4/2009 |
| CN | 101516523 | A | 8/2009 |
| CN | 101646500 | | 2/2010 |
| CN | 102211070 | | 4/2011 |
| CN | 102139249 | A | 8/2011 |
| CN | 102211069 | | 10/2011 |
| CN | 202667052 | U | 1/2013 |
| CN | 103 521 378 | A | 1/2014 |
| CN | 203508251 | U | 4/2014 |
| CN | 203737474 | U | 7/2014 |
| CN | 204074345 | U | 1/2015 |
| CN | 204294401 | U | 4/2015 |
| CN | 105377447 | A | 3/2016 |
| CN | 205966208 | U | 2/2017 |
| CN | 107427851 | A | 12/2017 |
| CN | 107666966 | A | 2/2018 |
| CN | 108223901 | A | 6/2018 |
| CN | 207493903 | U | 6/2018 |
| CN | 108438227 | A | 8/2018 |
| DE | 259621 | C | 5/1913 |
| DE | 460381 | | 5/1928 |
| DE | 510362 | | 10/1930 |
| DE | 611325 | C | 3/1935 |
| DE | 1425890 | | 11/1968 |
| DE | 2559036 | | 9/1976 |
| DE | 2653981 | | 6/1978 |
| DE | 2950341 | | 7/1980 |
| DE | 2926286 | A1 | 1/1981 |
| DE | 3016419 | | 11/1981 |
| DE | 8024829.9 | | 9/1982 |
| DE | 3111571 | A1 | 10/1982 |
| DE | 3238149 | A1 | 4/1984 |
| DE | 34 02 097 | | 8/1985 |
| DE | 3402945 | A1 | 8/1985 |
| DE | 3517122 | | 5/1986 |
| DE | 3505618 | | 8/1986 |
| DE | 3526819 | | 2/1987 |
| DE | 3016419 | C2 | 8/1987 |
| DE | 8702559 | | 10/1987 |
| DE | 3708472 | A1 | 10/1988 |
| DE | 8902223 | | 5/1989 |
| DE | 3742308 | | 6/1989 |
| DE | 8905681 | | 11/1989 |
| DE | G 90 01 265 | | 5/1990 |
| DE | 3906219 | | 8/1990 |
| DE | 4302911 | | 8/1993 |
| DE | 4208500 | A1 | 9/1993 |
| DE | 4230535 | | 3/1994 |
| DE | G 94 16 015.5 | U1 | 11/1994 |
| DE | 4321940 | | 1/1995 |
| DE | 69110099 | T2 | 2/1996 |
| DE | 692 11 891 | T2 | 10/1996 |
| DE | 19516485 | | 11/1996 |
| DE | 19727884 | | 2/1999 |
| DE | 69505433 | T2 | 4/1999 |
| DE | 19807973 | | 7/1999 |
| DE | 19824264 | | 12/1999 |
| DE | 19832990 | | 1/2000 |
| DE | 20000483 | | 8/2000 |
| DE | 10004105 | | 10/2000 |
| DE | 19958569 | | 2/2001 |
| DE | 199 41 362 | | 3/2001 |
| DE | 19945760 | | 3/2001 |
| DE | 10103221 | A1 | 8/2001 |
| DE | 10031857 | | 1/2002 |
| DE | 10031858 | | 1/2002 |
| DE | 20114257 | | 2/2002 |
| DE | 10059406 | | 6/2002 |
| DE | 10135104 | | 9/2002 |
| DE | 10135104 | C1 | 9/2002 |
| DE | 10205831 | | 8/2003 |
| DE | 10311238 | | 10/2004 |
| DE | 10 2004 027 789 | | 2/2005 |
| DE | 29825120 | | 2/2005 |
| DE | 102004027789 | A1 | 2/2005 |
| DE | 69827994 | T2 | 4/2005 |
| DE | 20320781 | | 6/2005 |
| DE | 10 2004 014 646 | | 7/2005 |
| DE | 10 2004 003 438 | | 8/2005 |
| DE | 102004003439 | | 8/2005 |

(56) References Cited

FOREIGN PATENT DOCUMENTS

| | | | |
|---|---|---|---|
| DE | 10 2004 007 733 | | 9/2005 |
| DE | 10 2004 021 298 | | 11/2005 |
| DE | 699 28 944 | T2 | 9/2006 |
| DE | 69535077 | T2 | 11/2006 |
| DE | 202007001031 | | 3/2007 |
| DE | 601 20 633 | T2 | 5/2007 |
| DE | 60200500 1173 | | 8/2007 |
| DE | 60206956 | T2 | 8/2008 |
| DE | 102007006547 | | 8/2008 |
| DE | 102007013628 | A1 | 9/2008 |
| DE | 102007039106 | | 2/2009 |
| DE | 102007052067 | | 5/2009 |
| DE | 10 2008 010 169 | A1 | 9/2009 |
| DE | 10 2009 020 194 | A1 | 11/2010 |
| DE | 20 2010 012 449 | U1 | 12/2010 |
| DE | 202010012449 | | 12/2010 |
| DE | 10 2009 032 399 | A1 | 1/2011 |
| DE | 102009053449 | | 2/2011 |
| DE | 102010060086 | | 4/2012 |
| DE | 102010056263 | A1 | 6/2012 |
| DE | 10 2011 100 806 | A1 | 11/2012 |
| DE | 102011106060 | | 1/2013 |
| DE | 20 2013 002 228 | U2 | 5/2013 |
| DE | 102011118120 | | 5/2013 |
| DE | 10 2011 120 717 | A1 | 6/2013 |
| DE | 112007001824 | B4 | 7/2013 |
| DE | 10 2012 013 464 | A1 | 11/2013 |
| DE | 10 2015 114202 | A1 | 1/2017 |
| DE | 10 2018 118 737 | A1 | 2/2020 |
| DE | 102021124139 | A1 | 3/2023 |
| DE | 102021124140 | A1 | 3/2023 |
| DE | 102021124141 | A1 | 3/2023 |
| EM | 002066910-0001 | | 3/2013 |
| EM | 002066910-0002 | | 3/2013 |
| EM | 002066910-0003 | | 3/2013 |
| EM | 002066910-0004 | | 3/2013 |
| EM | 002066910-0005 | | 3/2013 |
| EM | 002066910-0006 | | 3/2013 |
| EM | 002066910-0007 | | 3/2013 |
| EM | 002066910-0008 | | 3/2013 |
| EM | 002066910-0009 | | 3/2013 |
| EM | 002066910-0010 | | 3/2013 |
| EP | 0092043 | A2 | 10/1983 |
| EP | 0092392 | | 10/1983 |
| EP | 0114064 | A2 | 7/1984 |
| EP | 0313958 | A2 | 5/1989 |
| EP | 524408 | | 1/1993 |
| EP | 567325 | | 10/1993 |
| EP | 0631821 | | 1/1995 |
| EP | 0650766 | | 5/1995 |
| EP | 0650766 | A2 | 5/1995 |
| EP | 678334 | | 10/1995 |
| EP | 0706832 | | 4/1996 |
| EP | 0706832 | A1 | 4/1996 |
| EP | 0710506 | | 6/1996 |
| EP | 801002 | | 10/1997 |
| EP | 0846498 | A1 | 6/1998 |
| EP | 987060 | | 3/2000 |
| EP | 1081639 | | 3/2001 |
| EP | 1106262 | | 6/2001 |
| EP | 1 247 586 | | 10/2002 |
| EP | 1277519 | | 1/2003 |
| EP | 1294490 | | 3/2003 |
| EP | 1299194 | | 4/2003 |
| EP | 1366823 | | 12/2003 |
| EP | 1412669 | | 4/2004 |
| EP | 1424135 | | 6/2004 |
| EP | 1477232 | A1 | 11/2004 |
| EP | 1479447 | A1 | 11/2004 |
| EP | 1504823 | A1 | 2/2005 |
| EP | 1563913 | | 8/2005 |
| EP | 1574262 | | 9/2005 |
| EP | 1602412 | | 12/2005 |
| EP | 1658902 | A1 | 5/2006 |
| EP | 1708822 | | 10/2006 |
| EP | 1708823 | | 10/2006 |
| EP | 1718415 | | 11/2006 |
| EP | 1880771 | A1 | 1/2008 |
| EP | 1902766 | A1 | 3/2008 |
| EP | 1902786 | | 3/2008 |
| EP | 1902876 | | 3/2008 |
| EP | 1930084 | | 6/2008 |
| EP | 1964616 | | 9/2008 |
| EP | 1964616 | A2 | 9/2008 |
| EP | 1987886 | A2 | 11/2008 |
| EP | 1997561 | A2 | 12/2008 |
| EP | 2017010 | A2 | 1/2009 |
| EP | 2027931 | | 2/2009 |
| EP | 1 270 081 | B1 | 3/2009 |
| EP | 2092987 | A1 | 8/2009 |
| EP | 2106298 | | 10/2009 |
| EP | 2111920 | | 10/2009 |
| EP | 2127758 | A1 | 12/2009 |
| EP | 2451586 | A1 | 5/2012 |
| EP | 2490819 | | 8/2012 |
| EP | 2576079 | | 4/2013 |
| EP | 2608890 | | 7/2013 |
| EP | 2 669 213 | A1 | 12/2013 |
| EP | 2703089 | A1 | 3/2014 |
| EP | 2736651 | B1 | 6/2014 |
| EP | 2 828 000 | A | 1/2015 |
| EP | 2 828 000 | A1 | 1/2015 |
| EP | 3184177 | A1 | 6/2017 |
| EP | 2828000 | B1 | 8/2019 |
| FR | 398333 | | 6/1909 |
| FR | 789762 | | 11/1935 |
| FR | 1410519 | | 9/1964 |
| FR | 2444501 | | 7/1980 |
| FR | 2462200 | A1 | 2/1981 |
| FR | 2 570 140 | | 3/1986 |
| FR | 2 774 928 | | 8/1999 |
| FR | 2863512 | A1 | 6/2005 |
| FR | 2927824 | A1 | 8/2009 |
| GB | 190900523 | | 6/1909 |
| GB | 657854 | A | 9/1951 |
| GB | 2 132 916 | | 7/1984 |
| GB | 2153260 | | 8/1985 |
| GB | 2372465 | | 8/2002 |
| GB | 2411235 | | 8/2005 |
| GB | 2416141 | A | 1/2006 |
| GB | 2444909 | A | 6/2008 |
| GB | 2508446 | A | 6/2014 |
| HK | 1100405 | | 6/2009 |
| HK | 1096057 | | 7/2009 |
| HK | 1125067 | | 8/2012 |
| HK | 1138533 | | 11/2012 |
| JP | S49-136868 | U | 11/1974 |
| JP | S55-107258 | U | 7/1980 |
| JP | S5654328 | | 5/1981 |
| JP | S57-75246 | | 5/1982 |
| JP | S57128346 | A | 8/1982 |
| JP | 58-119862 | | 5/1983 |
| JP | S5998757 | | 6/1984 |
| JP | S601722 | | 1/1985 |
| JP | S62160156 | A | 7/1987 |
| JP | H01-87805 | | 6/1989 |
| JP | H02258076 | A | 10/1990 |
| JP | H04-176352 | A | 6/1992 |
| JP | H0530749 | | 4/1993 |
| JP | H05172678 | | 7/1993 |
| JP | 674850 | | 3/1994 |
| JP | H06215741 | | 8/1994 |
| JP | H07204542 | A | 8/1995 |
| JP | H08196950 | | 8/1996 |
| JP | H08196950 | A | 8/1996 |
| JP | H09117697 | | 5/1997 |
| JP | 11-047643 | A | 2/1999 |
| JP | 2000015150 | A | 1/2000 |
| JP | 2000070780 | A | 3/2000 |
| JP | 2001259487 | | 9/2001 |
| JP | 2003042882 | | 2/2002 |
| JP | 2003088780 | | 3/2003 |
| JP | 2004-501763 | A | 1/2004 |
| JP | 2004017044 | | 1/2004 |

(56) References Cited

FOREIGN PATENT DOCUMENTS

| | | | |
|---|---|---|---|
| JP | 2003-211034 | A | 5/2004 |
| JP | 2005000735 | A | 1/2005 |
| JP | 2005-052830 | A | 3/2005 |
| JP | 2005138885 | | 6/2005 |
| JP | 2007516831 | | 6/2007 |
| JP | 2008018296 | A | 1/2008 |
| JP | 2008161789 | A | 7/2008 |
| JP | 2010-528837 | A | 8/2010 |
| JP | 2014124274 | A | 7/2014 |
| JP | 2017-135647 | A | 8/2017 |
| JP | 2018-505779 | A | 3/2018 |
| KR | 20140064644 | A | 5/2014 |
| RU | 2523816 | C1 | 1/2014 |
| TW | 491092 | | 6/2002 |
| TW | 510253 | U | 11/2002 |
| TW | I220392 | | 8/2004 |
| TW | I303587 | | 12/2008 |
| TW | I309584 | | 5/2009 |
| TW | 201020031 | A | 6/2010 |
| WO | 90/008456 | | 8/1990 |
| WO | 91/16610 | | 10/1991 |
| WO | 1992/07346 | | 4/1992 |
| WO | 9522409 | | 8/1995 |
| WO | 1998/32539 | | 7/1998 |
| WO | 01/012337 | | 2/2001 |
| WO | 2001/12337 | | 2/2001 |
| WO | 0166261 | | 9/2001 |
| WO | 01/099062 | | 12/2001 |
| WO | 02/000355 | | 1/2002 |
| WO | 0202242 | | 1/2002 |
| WO | 02/018061 | | 3/2002 |
| WO | 02/085533 | | 10/2002 |
| WO | 03/007252 | | 1/2003 |
| WO | 03/045575 | | 6/2003 |
| WO | 03/069208 | | 8/2003 |
| WO | 03069208 | A1 | 8/2003 |
| WO | 03/086654 | A1 | 10/2003 |
| WO | 04/037433 | | 5/2004 |
| WO | 2004/37433 | | 5/2004 |
| WO | 04/052552 | | 6/2004 |
| WO | 05/018815 | | 3/2005 |
| WO | 05/068220 | | 7/2005 |
| WO | 05/070557 | | 8/2005 |
| WO | 05/070558 | | 8/2005 |
| WO | 05/077543 | | 8/2005 |
| WO | 05/115631 | | 12/2005 |
| WO | 2006065850 | | 6/2006 |
| WO | 07/128127 | | 11/2007 |
| WO | 2007133386 | A2 | 11/2007 |
| WO | 2007/149760 | A2 | 12/2007 |
| WO | 2008/093866 | A1 | 8/2008 |
| WO | 2009015260 | | 1/2009 |
| WO | 2009015260 | A2 | 1/2009 |
| WO | 2009/054986 | A1 | 4/2009 |
| WO | 2009056424 | | 5/2009 |
| WO | 2010019274 | A1 | 2/2010 |
| WO | 2010/044864 | A1 | 4/2010 |
| WO | 2011047876 | | 4/2011 |
| WO | 2011147555 | | 12/2011 |
| WO | 2012/013574 | A1 | 2/2012 |
| WO | 2012/052255 | A1 | 4/2012 |
| WO | 2012/119578 | A1 | 9/2012 |
| WO | 2012119664 | | 9/2012 |
| WO | 2013000524 | | 1/2013 |
| WO | 2013016474 | | 1/2013 |
| WO | 2013/131626 | A1 | 9/2013 |
| WO | 2013/142045 | A1 | 9/2013 |
| WO | 2014/006593 | A1 | 1/2014 |
| WO | 2015/125619 | A1 | 8/2015 |
| WO | 2016/127106 | A1 | 8/2016 |
| WO | 2016/188804 | A1 | 12/2016 |
| WO | 2017/096740 | A1 | 6/2017 |
| WO | 2018/197025 | A1 | 10/2017 |
| WO | 2020/053153 | A | 3/2020 |
| WO | 2020/0053153 | A1 | 3/2020 |
| WO | 2020/086977 | A1 | 4/2020 |

OTHER PUBLICATIONS

Office Action dated Feb. 5, 2021 for U.S. Appl. No. 16/524,740.
Office Action dated Feb. 5, 2021 for U.S. Appl. No. 16/524,838.
Office Action dated Nov. 18, 2014 for U.S. Appl. No. 14/113,649.
Notice of Allowance dated Nov. 19, 2014 for U.S. Appl. No. 29/486,223.
Office Action dated Dec. 31, 2013 for U.S. Appl. No. 13/380,949.
Restriction Requirement dated Jan. 9, 2015 for Design U.S. Appl. No. 29/469,049.
Response to Office Action filed Dec. 2, 2014 for U.S. Appl. No. 29/487,679.
Notice of Allowance dated Jan. 15, 2015 for Design U.S. Appl. No. 29/490,620.
Office Action dated Jan. 14, 2015 for Design U.S. Appl. No. 29/447,887.
Hercules Paint Gun Washers brochure publish date Jan. 2012, [online], [site visited Jan. 7, 2015], >http://www.herkules.us/pdfs/L00761-Hercules-Gun_Washers-4-page-brochure.pdf>.
Jetclean GUn Cleaner Terry's Auto Supply, google publish date Aug. 4, 2011, [online], [site visited Jan. 7, 2015], <http://secure.terrys.net/viewProduct.php?productID=FT.FHAZ1005>.
Restriction Requirement dated Feb. 6, 2015 for Design U.S. Appl. No. 29/486,232.
Office Action dated Mar. 30, 2015 for U.S. Appl. No. 13/698,417.
Responde to Office Action filed Apr. 14, 2015 to Office Action dated Jan. 14, 2015 for U.S. Appl. No. 29/447,887.
Response filed Jul. 20, 2015 for Office Action dated Mar. 30, 2015 for U.S. Appl. No. 12/698,417.
Notice of Allowance dated Apr. 30, 2015 for U.S. Appl. No. 29/447,887.
Chinese Office Action dated Oct. 28, 2014 and Search Report dared Oct. 15, 2014 for Chinese Application No. 2011800266029.
Australian Examination Report dated Oct. 30, 2012 for Australian Application No. 2010268870.
Notice of Allowance dated Apr. 24, 2015 for Design U.S. Appl. No. 29/486,232.
Restriction Requirement dated Jan. 22, 2015 for U.S. Appl. No. 13/698,417.
Response filed Mar. 23, 2015 to Restriction Requirement dated Jan. 22, 2015 for U.S. Appl. No. 13/698,417.
Response filed Apr. 6, 2015 to Office Action dated Feb. 6, 2015 for Design U.S. Appl. No. 29/486,232.
Response filed Mar. 31, 2015 to Office Action dated Dec. 31, 2014 for U.S. Appl. No. 13/380,949.
Japanese Office Action dated Jun. 11, 2014 for Japanese Patent Application No. 2012-618769.
Australian Examination Report dated Nov. 11, 2014 for Australian patent Application No. 2011257606.
Japanese Notice of Allowance mailed Jan. 13, 2015 for Japanese Patent Application No. 2012/518769.
Application filed Dec. 11, 2011 for U.S. Appl. No. 13/380,949.
Chinese Office Action dated Jan. 28, 2014 and Search Report dated Jan. 21, 2014 for Chinese Application No. 201080030935.4.
Search Report dated Apr. 24, 2010 for German Application No. 10 2009 032 399.6-51.
Application filed Oct. 24, 2013 for U.S. Appl. No. 14/113,649.
Response filed May 18, 2015 to Office Action dated Nov. 18, 2014 for U.S. Appl. No. 14/113,649.
Application filed Dec. 17, 2014 for U.S. Appl. No. 14/572,998.
German Search Report dated Mar. 25, 2014 for German Application No. 202013105779-7.
Application filed Nov. 16, 2012 for U.S. Appl. No. 13/698,417.
Application filed Jun. 2, 2013 for U.S. Appl. No. 13/991,285.
English translation of application filed Aug. 13, 2013 for Application filed Jun. 2, 2013 for U.S. Appl. No. 13/991,285.
Restriction Requirement dated May 27, 2015 for U.S. Appl. No. 13/991,285.

(56) References Cited

OTHER PUBLICATIONS

Application filed Jan. 29, 2015 for Design U.S. Appl. No. 29/516,073.
Application filed Jan. 29, 2015 for Design U.S. Appl. No. 29/516,082.
Application filed Mar. 3, 2018, 2015 for Design U.S. Appl. No. 29/519,198.
Final Office Action dated Jul. 20, 2015 for U.S. Appl. No. 14/113,649.
Final Office Action dated Aug. 12, 2019 from U.S. Appl. No. 14/815,210.
Response to Restriction Requirement filed Oct. 29, 2019 for U.S. Appl. No. 15/575,549.
German Search Report dated May 26, 2021, for DE 10 2020 123 769.3, with machine translation.
RCE Reply filed Oct. 11, 2019 for U.S. Appl. No. 15/679,461.
Office Action dated Jun. 30, 2017 for U.S. Appl. No. 14/815,210.
Final Office Action dated Dec. 7, 2017 for U.S. Appl. No. 14/815,210.
Re U.S. Appl. No. 17/410,124: Office Action dated Oct. 30, 2023.
Response to Office Action dated Apr. 5, 2019 for U.S. Appl. No. 15/679,461 (29 pages).
Response to Office Action dated Apr. 9, 2019 for U.S. Appl. No. 15/679,533 (22 pages).
Response filed Dec. 21, 2015 to Office Action dated Jul. 20, 2015 for U.S. Appl. No. 14/113,649.
Office Action, dated Jan. 9, 2019, for U.S. Appl. No. 15/679,482.
Final Office Action dated Sep. 12, 2018 in U.S. Appl. No. 14/815,210.
European Search Report dated Jan. 24, 2018 for Application No. 17186905.
Restriction/Species requirement dated Dec. 7, 2020 for U.S. Appl. No. 16/524,838.
Office Action dated Nov. 24, 2021 for U.S. Appl. No. 16/524,740.
Final Office Action dated Nov. 23, 2021 for U.S. Appl. No. 15/679,533.
German Search Report dated Mar. 15, 2016 for Application No. 20 2015 003 664.3, 8 pages.
Chinese Search Report dated Feb. 21, 2019 for Application No. 2016800293781, 3 pages.
European Search Report dated May 8, 2017 for Application No. EP16203544.
"Spray Guns/sata.com", Oct. 18, 2015, XP055364928 URL:http://web.archive.org/web/20151018205307/http://www.sata.com/index.php?id=lackierpistolen&L=11 [gefunden am Apr. 13, 2017]; reprinted on Dec. 8, 2017.
"SATAjet 5000 B Lackierpistolen | Bechersysteme | Atemschutz | Filtertechnik | Zubehor So flexibel wie Ihre Aufgaben" Apr. 11, 2017, XP055364477 Gefunden im Internet: URL:https/www.sata.com/uploads/tx_pxspecialcontent/00_SATAjet_5000_B.pdf [gefunden am Apr. 12, 2017]; English translation of full brochure attached.
Amendments submitted to European Patent Office on Dec. 3, 2017 for Application No. EP16203544 (with English translation of chart on p. 3).
German Search Report dated Apr. 21, 2017 for application No. 10 2016 009 957.7.
Office Action dated Aug. 12, 2021 for U.S. Appl. No. 15/679,533.
International Preliminary Report on Patentability dated Sep. 6, 2022 with Written Opinion for PCT/EP2021/053940 (English Translation).
International Preliminary Report on Patentability dated Sep. 6, 2022 with Written Opinion for PCT/EP2021/054059 (English Translation).
International Preliminary Report on Patentability dated Sep. 6, 2022 with Written Opinion for PCT/EP2021/054061 (English Translation).
International Search Report dated Nov. 13, 2019 for PCT/EP2019/074000, filed Sep. 9, 2019.
Written Opinion or PCT/EP2019/074000, filed Sep. 9, 2019.
Final Office Action dated Sep. 4, 2020 for U.S. Appl. No. 15/679,533.
Office Action dated Jan. 25, 2019 for U.S. Appl. No. 15/379,972.
Office Action dated Dec. 2, 2022 for U.S. Appl. No. 16/524,838.
International Search Report dated Jul. 14, 2016 for International Application No. PCT/EP2016/000809, filed May 17, 2016.
Written Opinion for International Application No. PCT/EP2016/000809, filed May 17, 2016.
International Preliminary Report on Patentability, dated Mar. 9, 2021,with Written Opinion for PCT/EP2019/074000, filed Sep. 9, 2019 (English translation) (7 pages).
Response to Final Office Action, dated Nov. 11, 2019, for U.S. Appl. No. 14/815,210 20 pages.
Office Action, dated Nov. 20, 2019, for U.S. Appl. No. 15/575,549 12 pages.
Office Action, dated Dec. 9, 2019, for U.S. Appl. No. 14/815,210 6 pages.
Notice of Allowance dated Jun. 27, 2023 for U.S. Appl. No. 16/524,740.
Notice of Allowance dated Jul. 26, 2021, for U.S. Appl. No. 15/575,549.
Response filed May 28, 2019 for U.S. Appl. No. 15/379,972.
Final Office Action for U.S. Appl. No. 15/679,461 dated Jun. 11, 2019.
Final Office Action for U.S. Appl. No. 15/679,533 dated Jul. 12, 2019.
Third Office Action dated Feb. 15, 2023 for Chinese Patent Application No. 20191070444.X.
Response to Office Action dated Mar. 9, 2020 for U.S. Appl. No. 14/815,210.
Notice of Allowance for U.S. Appl. No. 14/815,210 dated Mar. 25, 2020.
Office Action of U.S. Appl. No. 15/679,461 dated Mar. 31, 2020.
Response restriction requirement filed May 23, 2016 for Design U.S. Appl. No. 29/516,082.
Response to Restriction Requirement filed in U.S. Appl. No. 14/815,210 dated Jun. 19, 2017.
Japanese Office Action dated Sep. 25, 2019 for Japanese Publication No. 2015-149405, 4 pages.
Office Action for U.S. Appl. No. 14/815,210 , dated Apr. 3, 2018.
Response for U.S. Appl. No. 14/113,649, filed Mar. 3, 2018.
German Search Report dated Apr. 10, 2018 for Application No. 10 2017 118 599.2.
European Office Action dated Mar. 15, 2024 for European Patent Application No. 21 706 892.3.
European Office Action dated Mar. 7, 2024 for European Patent Application No. 21 706 572.1.
European Office Action dated Mar. 6, 2024 for European Patent Application No. 21 191 428.8.
European Office Action dated Mar. 14, 2024 for Eiuropean Patent Application No. 21 706 923.6.
For U.S. Appl. No. 17/410,124: Response filed May 8, 2024.
For Chinese Patent Application No. 2019800593031 First Office Action dated Apr. 25, 2022 (Eng. translation) Chinese Search Report dated Apr. 19, 2022.
For U.S. Appl. No. 15/679,533: Interview Summary dated Jun. 17, 2020 Response to Office Action, filed Jun. 30, 2020.
Office Action dated Jun. 12, 2020, for U.S. Appl. No. 15/575,549.
International Search Report dated Apr. 12, 2019 for PCT/DE2018/100679 filed Aug. 1, 2018.
Written Opinion for PCT/DE2018/100679 filed Aug. 1, 2018.
Office Action from U.S. Appl. No. 15/143,698 dated Jan. 5, 2017.
German Search Report for German Application No. 10 2015 016 474.0 dated Aug. 9, 2016, 14 pages ).
Notice of Allowance in U.S. Appl. No. 29/556,463, filed Mar. 1, 2016, 9 pages.
Notice of Allowance in U.S. Appl. No. 29/555,656, filed Feb. 24, 2016, 5 pages.
International Search Report dated Aug. 31, 2016 for PCT/EP2016/061057 filed May 18, 2016.
Written Opinion for PCT/EP2016/061057 filed May 18, 2016.
European Search Report, dated Jan. 20, 2020, for European Patent Application No. 19183380 (216).
Office Action dated Feb. 19, 2016 for U.S. Appl. No. 14/113,649.
Final Office Action dated Feb. 25, 2016 for U.S. Appl. No. 13/698,417.
Restriction Requirement dated Mar. 25, 2016 for Design U.S. Appl. No. 29/516,082.
Response filed Mar. 31, 2016 to Office Action dated Dec. 31, 2016 for U.S. Appl. No. 14/572,998.

(56) References Cited

OTHER PUBLICATIONS

Written Opinion dated Sep. 8, 2016 for International Application No. PCT/EP2016/061057 filed May 18, 2016.
International Search Report dated Apr. 12, 2019 and Written Opinion for PCT/DE18/100679, filed Aug. 1, 2018 (21 pages).
Search Report dated Jan. 26, 2022, for Chinese Patent Appl. No. 2019107032612 with translation.
May 22, 2018 Final Office Action for U.S. Appl. No. 14/113,649.
Jun. 25, 2018 Response to Office Action for U.S. Appl. No. 14/815,210.
Search Report for German Application No. 10 2021 124 140.5, filed Sep. 17, 2021.
International Search Report, Written Opinion and International Preliminary Report on Patentability for PCT/EP2022/075664, filed Sep. 15, 2022.
Search Report for German Application No. 10 2021 124 139.1, filed Sep. 17, 2021.
International Search Report, Written Opinion and International Preliminary Report on Patentability for PCT/EP2022/075666, filed Sep. 15, 2022.
For U.S. Appl. No. 17/410,124: Final Office Action dated Mar. 14, 2024.
Husky Gravity Feed HVLP Spray Gun (2016) https://www.homedepot.com/husky-gravity-feed-hvlp-spray-gun-H4840GHVSG/203497519.
Northern Industrial Paint Spray Gund and Hoses (2008) https://www.northerntool.com/products/northern-industrial-paint-spray-gun-and-hoses-158970.
Office Action dated Aug. 7, 2015 for U.S. Appl. No. 13/991,285.
Final Office Action dated May 2, 2022 for U.S. Appl. No. 16/524,740.
SATA—X5500 Rp Spray Gun 1.3 I W/Rps Cups, Dec. 19, 2022, amazon.com,May 17, 2024, URL: https:llwww.amazon.com/SATA-X5500-Spray-Cups-1 061564/dp/BOBOJ NCL921 (Year: 2022).
For Design U.S. Appl. No. 29/834,813: Interview Summary dated May 17, 2024 Notice of Allowance dated May 24, 2024.
International Preliminary Report on Patentability with Written Opinion dated Mar. 9, 2021 for PCT/EP2019/074000 filed Sep. 9, 2019.
International Search Report and Written Opinion for PCT/EP2021/054061, filed Apr. 16, 2021.
Zhu Zhifu, "Simulation and Experimental Study on Spray Characteristics of Gas-Assisted Urea Spray Gun", Aug. 6, 2019, pp. 1-6.
International Search Report and Written Opinion for PCT/EP2021/53940, filed Feb. 18, 2021.
For Chinese Application No. 2018800961965: Search Report, dated Aug. 1, 2022 (English translation) Second Office Action, dated Aug. 12, 2022 (English translation).
Notice of Allowance dated Aug. 25, 2023 for U.S. Appl. No. 16/524,838.
Office Action dated Mar. 30, 2020, for U.S. Appl. No. 15/679,533.
Examination Report from the European Patent Office dated Nov. 23, 2021 for European Patent Application No. 19183380.5.
German Search Report for Application No. 10 2016 009 957.7 dated Apr. 21, 2017.
International Preliminary Report on Patentability dated Jan. 31, 2023 with Written Opinion for International Application No. PCT/EP2021/071252 filed Jul. 29, 2021.
Response to Final Office Action, filed Jan. 4, 2021, for U.S. Appl. No. 15/679,533 (18 pages).
Response to Restriction Requirement, filed Jan. 25, 2021, for U.S. Appl. No. 16/524,740 (9 pages).
Canadian Office Action dated Nov. 21, 2012 for related application CA2741703.
Chinese Search Report dated Dec. 5, 2012 for related application CN200980135429.9.
Chinese Office Action dated Dec. 13, 2012 for related application CN200980135429.9.
German Search Report for DE 20 2008 014 389.6 completed Jul. 13, 2009.
International Preliminary Report on Patentability for PCT/EP2015/001728 filed Aug. 25, 2015.
Final Office Action dated Mar. 16, 2017 from U.S. Appl. No. 13/698,417, 9 pages.
Restriction Requirement Office Action dated Aug. 28, 2018 in U.S. Appl. No. 15/679,533.
Restriction Requirement Office Action dated Aug. 28, 2018 in U.S. Appl. No. 15/679,461.
Notice of Allowance dated Sep. 14, 2018 in U.S. Appl. No. 29/618,945.
Notice of Allowance dated Sep. 14, 2018 in U.S. Appl. No. 14/113,649.
For U.S. Appl. No. 16/524,740: Interview Summary and Advisory Action dated Aug. 30, 2021.
European Search Report dated Feb. 21, 2020 for Application No. 19183382.1.
Response dated Feb. 19, 2020 for U.S. Appl. No. 15/575,549.
Response to Election of Species Requirement and Amendment filed Oct. 15, 2018 from U.S. Appl. No. 15/679,482.
Chinese Search Report dated Jul. 18, 2018 for Application No. 2014103745834 filed Jul. 31, 2014.
DesignView of CN302452159 registered Jun. 5, 2013, printed Oct. 18, 2018.
Restriction Requirement dated Mar. 18, 2019, for U.S. Appl. No. 29/596,869.
Office Action dated Mar. 15, 2019, for U.S. Appl. No. 14/815,210.
Final Office Action dated Feb. 27, 2020 for U.S. Appl. No. 15/575,549.
Response to Office Action filed Feb. 16, 2016 for U.S. Appl. No. 13/698,417.
Screen shot of a SATA product (SATAjet B) description retrieved on Feb. 12, 2016 from www.sata.com/index.php.
"The Hot Rolling Process;" California Steel; retrieved on Feb. 12, 2016 from http://www.californiasteel.com/GetPublicFile.aspx?id=53.
Notification of the Third Office Action dated Feb. 14, 2023 for Chinese Patent Application No. 2019107032612, 15 pages.
Office Action dated Mar. 21, 2023 for European Patent Application No. 19 183 382.1, (12 pages).
Restriction Requirement Office Action dated Apr. 17, 2017 for U.S. Appl. No. 14/815,210.
Notice of Allowance dated Apr. 10, 2017 for U.S. Appl. No. 29/579,824.
Response to Final Office Action filed May 9, 2017 in U.S. Appl. No. 13/698,417.
Response to Office Action filed May 17, 2017 in U.S. Appl. No. 14/113,649.
Decision on Rejection dated Feb. 10, 2023 for Chinese Patent Application No. 2018800961965.
Search Report dated Jan. 30, 2023 for Chinese Patent Application No. 2018800961965.
Notice of Allowance dated May 20, 2024 for U.S. Appl. No. 17/410,124.
Chinese Search Report for Application No. 2017107135569 dated Aug. 24, 2020 and English translation.
Office Action dated Mar. 29, 2023 for U.S. Appl. No. 17/264,372.
Search Report dated Jan. 7, 2022, for Chinese Patent Appl. No. 2018800961965, with translation.
Office Action dated Apr. 26, 2022 for U.S. Appl. No. 15/679,533.
Japanese Office Action dated Jun. 28, 2023 for Japanese Patent Application No. 2021-537499 with translation.
For Chinese Application No. 201910704447.X: Search Report, dated Aug. 25, 2022 Second Office Action, dated Sep. 1, 2022.
Notification of the First Office Action with search report dated Aug. 24, 2015 for Chinese Application No. 201280020519.5 (related to U.S. Appl. No. 14/113,649), 13 pages.
Notification of the Second Office Action dated May 16, 2016, for Chinese Application No. 201280020519.5 (related to U.S. Appl. No. 14/113,649), 5 pages.
Japanese Office Action for JP2014-517485 (related to U.S. Appl. No. 14/113,649), dated Jul. 5, 2016, 16 pages.
Response to Office Action dated Jun. 25, 2018 for U.S. Appl. No. 14/815,210.
Response to Final Office Action dated Aug. 22, 2018 for U.S. Appl. No. 14/113,649.

(56) References Cited

OTHER PUBLICATIONS

Final Office Action in U.S. Appl. No. 14/113,649 dated Jun. 22, 2017.
Response filed in U.S. Appl. No. 15/143,698 dated Jul. 3, 2017.
For U.S. Appl. No. 16/524,838: Response and Request for Continued Exam filed Oct. 22, 2021.
German Search Report dated May 7, 2019 for Application No. 10 2018 122 004.9.
International Search Report, Written Opinion and International Preliminary Report on Patentability for PCT/EP2004/005381 file May 19, 2004.
International Search Report, Written Opinion and International Preliminary Report on Patentability for PCT/EP2004/011998 filed Oct. 23, 2004.
International Search Report, Written Opinion and International Preliminary Report on Patentability for PCT/EP2005/000435 filed Jan. 18, 2005.
International Search Report, Written Opinion and International Preliminary Report on Patentability for PCT/EP2005/00437 filed Jan. 18, 2005.
International Search Report, Written Opinion and International Preliminary Report on Patentability for PCT/EP2008/063344, filed Oct. 6, 2008.
International Search Report, Written Opinion and International Preliminary Report on Patentability for PCT/EP2010/002392 filed Apr. 20, 2010.
International Search Report, Written Opinion and International Preliminary Report on Patentability for PCT/EP2011/002544 filed May 21, 2011.
International Search Report, Written Opinion and International Preliminary Report on Patentability for PCT/EP2011/066665 filed Sep. 26, 2011.
International Search Report, Written Opinion and International Preliminary Report on Patentability for PCT/EP2010/003399 filed Jun. 7, 2010.
International Search Report, Written Opinion and International Preliminary Report on Patentability for PCT/EP2011/5842 filed Dec. 2, 2010.
International Search Report, Written Opinion and International Preliminary Report on Patentability for PCT/EP2012/01939 filed May 5, 2012.
International Search Report, Written Opinion and International Preliminary Report on Patentability for PCT/EP2009/06992 filed Sep. 29, 2009.
Internet Archive Wayback Machine [online] [captured Sep. 25, 2012] [retrieved on Sep. 8, 2014] retrieved from the Internet URL:http://web.archive.org/web/20120925210554/http://www.sata.com/index.php?id=sal-check&no cache=1&L=11.
JP Office Action issued against JP Patent App. 2012-508926 on Feb. 25, 2014 with English translation.
Notice of Allowance dated Jan. 27, 2016 for Design U.S. Appl. No. 29/510,723.
International Search Report (dated Jun. 20, 2008), Written Opinion (dated Jun. 20, 2008), and International Preliminary Report on Patentability (dated Sep. 14, 2010) from PCT/US2008/03318 filed Mar. 12, 2008.
Response filed Dec. 7, 2015 to Office Action dated Aug. 7, 2015 for U.S. Appl. No. 13/991,285.
Printout from Internet www.ehow.com explaining how to choose a spray gun and stating in item 2 "Nozzle sizes vary between about 1 mm and 2 mm.", printed Sep. 7, 2012 (Exhibit 1023 in IPR 2013-0111).
Printout from Internet www.bodyshopbusiness.com explaining how to choose nozzle setup in paragraph bridging pp. 1 and 2, giving general rule of thumb of nozzle sizes from 1.3 mm to 2.2 mm, depending on material being sprayed, printed Sep. 7, 2012 (Exhibit 1024 in IPR 2013-0111).
Printout from Internet of pages from brochure of Walther Pilot showing nozzle sizes for spray guns ranging from 0.3 mm to 2.5 mm, dated 2007, (Exhibit 1025 in IPR 2013-0111).
Printout from Internet www.alsacorp.com showing in the paragraph bridging pp. 2 and 3, Model VS-7200 Saber LVLP spray gun with nozzle size 1.3 mm with sizes 1.3 to 2.0 available, printed Aug. 26, 2012 (Exhibit 1026 in IPR 2013-0111).
Printout from Internet of p. 28 from current 3Mtm brochure showing Tip/Nozzle/Air Cap Selection Guide with nozzle sizes from 0.5 mm to 3.0 mm., (Exhibit 1027 in IPR 2013-0111).
Decision by EPO regarding opposition proceedings to revoke patent No. 99926841.0-2425/ 1108476, corresponding to '387 patent, 2012, (Exhibit 1029 in IPR 2013-0111).
SATA News Publication Dan-Am Jul.-Sep. 1996, (Exhibit 1034 in IPR 2013-0111).
SATA News Publication Dan-Am Oct.-Dec. 1996, (Exhibit 1035 in IPR 2013-0111).
SATA News Publication Dan-Am Apr.-Jun. 1998 (Exhibit 1036 in IPR 2013-0111).
Dan-Am SATA Catalog 6 for spray guns 1991 (Exhibit 1037 in IPR 2013-0111).
Dan-Am SATA Catalog 8 for spray guns 1994 (Exhibit 1038 in IPR 2013-0111).
Dan-Am Catalog 6—51pp published 1991, (Exhibit 1042 in IPR 2013-0111).
Japanese Industrial Standards B 9809 English translation, 1992 (Exhibit 1049 in IPR 2013-0111).
Japanese Industrial Standards B 9809 revised Mar. 1, 1991 (Exhibit 1050 in IPR 2013-0111).
SATA News, vol. 21, 2009 (Exhibit 2010 in IPR 2013-0111).
Collision Hub TV Document (image from video clip) printed Oct. 9, 2013 (Exhibit 2011 in IPR 2013-0111).
MyRielsMe.com document from press release printed Oct. 9, 2013 (Exhibit 2012 in IPR 2013-0111).
How to set Air pressure, Utube screenshot printed Oct. 9, 2013 (Exhibit 2013 in IPR 2013-0111).
Ohio EPA Letty to Tony Larimer, response to letter dated Aug. 2006 (Exhibit 2014 in IPR 2013-0111).
Pinahs Ben-Tzvi et al., A conceptual design . . . , Mechatrronics 17 (2007) p. 1-13 (Exhibit 2015 in IPR 2013-0111).
On line ad from Amazon.com printed Oct. 14, 2013 (Exhibit 2017 in IPR 2013-0111).
Rone et al., MEMS-Baed Microdroplet Generation with Integrated Sensing, COMSOL, 2011 (Exhibit 2018 in IPR 2013-0111).
Second Chinese Office Action dated Jun. 24, 2015 for Chinese Application No. 2011800266029.
Third Chinese Office Action dated Nov. 30, 2015 for Chinese Application No. 2011800266029.
Final Office Action dated Aug. 29, 2016 for U.S. Appl. No. 14/113,649.
Office Action dated Nov. 2, 2016 for U.S. Appl. No. 11/949,122.
Second Office Action dated Aug. 26, 2022 for Chinese Patent Application No. 2019107032612.
Office Action, dated Jan. 15, 2019, for U.S. Appl. No. 15/679,533.
Office Action, dated Jan. 15, 2019, for U.S. Appl. No. 15/679,461.
Search Report dated Feb. 22, 2019 for German Patent Application No. 10 2018 118 738.6.
Search Report dated Feb. 8, 2019 for German Patent Application No. 10 2018 118 737.8.
Notice of Allowance dated Jul. 1, 2019 for U.S. Appl. No. 15/379,972.
Notice of Allowance dated Jul. 9, 2019 for U.S. Appl. No. 15/679,482 (163).
Office Action dated Dec. 31, 2015 for U.S. Appl. No. 14/572,998.
Notice of Allowance dated Jan. 19, 2016 for Design U.S. Appl. No. 29/539,615.
Notice of Allowance dated Jan. 22, 2016 for U.S. Appl. No. 13/991,285.
Office Action dated May 10, 2024 for European Patent Application No. 19 768 753.6.
European Search Report dated Feb. 4, 2022 for Application No. 21191428.8.
Response filed May 5, 2021 for U.S. Appl. No. 16/524,740.
Response filed May 5, 2021 for U.S. Appl. No. 16/524,838.
International Preliminary Report on Patentability dated Feb. 2, 2021 and Written Opinion for PCT/DE2018/100679 filed Aug. 1, 2018 (English Translation).

(56) References Cited

OTHER PUBLICATIONS

Notice of Allowance dated May 18, 2021 for U.S. Appl. No. 29/730,873.
Anonymous: "DeVilbiss Automotive RefinishingSpray Gun Setup", Jan. 27, 2015 (Jan. 27, 2015), XP055580418, retrieved from the Internet: URLhttps://web.archive.org/web/20150127025402lhttp://www.autorefinishdevilbiss.com.spray-gun-setup.aspx.
Anonymous: "DeVilbiss—Spray Gun Tool on the AppStore", Oct. 19, 2015 (Oct. 19, 2015), XP055580448, retrieved from the Internet: URLhttps://itunes .apple.comlus/app/ devilbiss-spray-gun-tool/id590404917?mt=8.
Final Office Action dated Jun. 1, 2021 for U.S. Appl. No. 16/524,740.
Response filed Oct. 6, 2015 to Notice of Non-Compliant Amendment for U.S. Appl. No. 13/698,417.
Notice of Non-Compliant Amendment dated Aug. 10, 2015 for U.S. Appl. No. 13/698,417.
Final Office Action dated Oct. 16, 2015 for U.S. Appl. No. 13/698,417.
Extended European Search Report dated Apr. 17, 2015 for European Application No. 14004167.4.
Search Report dated Jan. 29, 2022, for Chinese Patent Appl. No. 201910704447X, with translation.
Office Action dated Feb. 24, 2023 for U.S. Appl. No. 16/524,740.
Final Rejection dated Jul. 22, 2021 for U.S. Appl. No. 16/524,838.
Response to Final Office Action and RCE dated Nov. 29, 2016 in U.S. Appl. No. 14/113,649.
Notice of Allowance dated Apr. 18, 2016 for U.S. Appl. No. 14/572,998.
Response filed Apr. 27, 2016 to Office Action dated Jan. 29, 2016 for U.S. Appl. No. 13/380,949.
German Search Report dated Apr. 12, 2016 for related German Application No. 10 2015 008 735.5.
Response filed Jul. 27, 2015 to Restriction Requirement dated May 27, 2015 for U.S. Appl. No. 13/991,285.
Application filed Jul. 31, 2015 for U.S. Appl. No. 14/815,210.
Final Office Action dated Aug. 4, 2015 for U.S. Appl. No. 13/380,949.
Notice of Allowance dated Aug. 3, 2015 for U.S. Appl. No. 29/486,232.
International Search Report and Written Opinion for PCT/EP2021/54059, filed Feb. 18, 2021.
For German Patent Application No. 19 183 380.5: Office Action dated Nov. 4, 2022 Office Action dated May 19, 2023.
Notice of Allowance dated Sep. 17, 2020 for U.S. Appl. No. 15/679,461.
Office Action dated Feb. 19, 2021 for U.S. Appl. No. 15/575,549.
Final Office Action dated May 12, 2022, for U.S. Appl. No. 16/524,838.
Japanese Office Action dated Mar. 6, 2024 for Japanese Patent Application No. 2021-537499 (11 pages).
Office Action dated Apr. 25, 2024 for U.S. Appl. No. 17/274,710.
Office Action dated Dec. 9, 2021 for U.S. Appl. No. 16/524,838.
Examination Report from the European Patent Office dated Nov. 8, 2021 for European Patent Application No. 19183382.1.

MULTIPART MATERIAL NEEDLE FOR A PAINT SPRAY GUN, FRONT NEEDLE OF A MATERIAL NEEDLE, PAINT SPRAY GUN, AND METHOD FOR EXCHANGING A FRONT NEEDLE

FIELD OF THE INVENTION

The invention relates to a material needle for a paint spray gun, to a front needle, to a paint spray gun, and to a method for exchanging a front needle.

BACKGROUND

Material needles in paint spray guns serve to open and close nozzle openings and thus to control the dispensing of sprayable material, such as lacquers, primers and paints, from a nozzle. In order to prevent irreversible contamination with an associated negative influence on the spray pattern of the paint spray gun, the material needle must be cleaned regularly. Furthermore, during the processing of abrasive materials, the material needle is subject to increased wear, which at a certain point also negatively affects the spray pattern. In order to prevent negative influence on the spray pattern, the material needle must therefore be removed regularly. For this purpose, it is usually sufficient to exchange the part of the material needle that engages the nozzle opening, for example a needle head. Exchangeable needle heads are known, for example, from U.S. Pat. No. 3,463,363A or DE69110099T2.

U.S. Pat. No. 3,463,363A discloses an exchangeable needle head which is releasably connected to a needle shaft via a screw connection.

DE69110099T2 teaches a material needle having an exchangeable needle head (valve tip), which is releasably connected to the needle head via a clamping sleeve screwed onto a needle shank. The needle head engages with an end-side ball head in an elastically deformable receptacle of the clamping sleeve. The needle head is thus mounted like a ball joint.

Such solutions satisfy the need for rapid exchange of the needle tip, but are complicated to manufacture in terms of manufacturing technology and require either the use of technically complex fine threads to ensure sufficient positioning accuracies of the needle head or do not ensure an axially sufficiently precise alignment of the needle head.

SUMMARY

Starting from this background, one object of the invention is to further develop paint spray guns or their material needles in such a way that a simple and rapid exchange of a needle tip with simultaneously high manufacturing tolerances is possible. It is also an object of the invention to provide an exchangeable needle tip of a material needle in which an unintentional release of the needle tip from the remaining material needle can be reliably prevented and in which a radial centering of the material needle can be ensured, in particular in the region of a needle tip, independently of the axial position of the material needle.

Accordingly, embodiments of a material needle for a paint spray gun, a front needle, a paint spray gun, and a method for exchanging a front needle are disclosed herein.

Paint spray guns according to the invention are preferably designed as a high-pressure paint spray guns or as low-pressure paint spray guns. The high-pressure paint spray guns according to the invention atomize material under high pressure. The material pressure is generally between 50 and 400 bar. The high-pressure paint spray gun can be designed as conventional high-pressure paint spray guns, in which no compressed air is used, and as air-supported high-pressure paint spray guns, in which air is additionally used to support the atomization. The latter requires a lower material pressure than the high-pressure paint spray gun without air support. The high-pressure paint spray gun has, for example, a slot-shaped nozzle which, without further shaping, generates a flat spray jet, wherein a material valve is provided which serves to control the dispensing of material.

The paint spray gun as a low-pressure paint spray gun is operated with a low material pressure and supplied with material either by means of gravity, negative pressure or a low-pressure material feed (less than 40 bar material pressure). The low-pressure paint spray gun can be designed as a so-called cup spray gun in which the material is supplied via a cup fastened to the paint spray gun. A material container can also be provided, from which the material, which is, for example, under a material pressure of between 1 and 20 bar, is pumped to the paint spray gun. The embodiment of a paint spray gun as a low-pressure paint spray gun atomizes the material by means of a gas or gas mixture, preferably compressed air, which exits at an air gap surrounding the material nozzle, whereby the material is entrained and atomized from the material nozzle.

In the case of a particularly preferred embodiment, the paint spray gun according to the invention is designed as an automatic or hand-guided paint spray gun. The automatic paint spray gun is actuated via an external signal source and is not actuated directly by a user. The hand-guided paint spray gun is held and actuated by a user in his hand.

Furthermore, the paint spray gun according to the invention can preferably be designed as a single-axis and two-axis paint spray gun. In the case of the variant of the invention designed as a single-axis paint spray gun, the air valve for controlling the air dispensing and the material valve for controlling the material dispensing share a common axis. In the variant of the invention designed as a two-axis paint spray gun, the shafts for controlling the air dispensing and the material valve for controlling the material dispensing are not arranged coaxially. The variants as automatic or hand-guided paint spray guns can be designed both as a single-axis and as a two-axis paint spray guns.

According to the invention, a material needle extending along a longitudinal axis is proposed for a paint spray gun having a material nozzle, wherein the material needle can be inserted into a guide channel of the paint spray gun and can be displaced along a longitudinal axis in order to open and close a nozzle opening of the material nozzle with a defined needle stroke. The material needle comprises a front needle, which is at the front in the axial direction, and a rear needle, which is at the rear in the axial direction, which needles are connected together releasably along a connection portion between the front needle and the rear needle via an axial form-fitting connection for conducting axial forces. The axial form-fitting connection is formed by front form-fitting elements, which are arranged on the front needle, and rear form-fitting elements, which are arranged on the rear needle, wherein the form-fitting connection can be released by radial deflection of the front and/or rear form-fitting elements.

In order to prevent unintentional release of the form-fitting connection, the axial form-fitting connection is secured by a securing means which prevents a radial deflection of the front and/or rear form-fitting elements, wherein the securing means contains a radially outer sliding bearing surface of the front needle and/or of the rear needle for form-fitting interaction with a corresponding sliding bearing surface of the paint spray gun.

As a result, high axial forces can be transmitted between the front and rear needles, and at the same time the releasability of the connection with a slight application of force can be ensured. Furthermore, an unintentional release of the axial form-fitting connection in an operating state of the paint spray gun can be reliably prevented. The securing means can, for example, be formed by wings extending radially away from the material needle or can also be formed by the outer circumference of the material needle itself.

A form-fitting connection is to be understood as a direct or indirect form-fitting connection between at least two connection partners, in this case the front needle and the rear needle, which interlock in such a way that the connection does not become detached in the direction of the impeded movement even in the absence of normal force (perpendicular to the surfaces of the connection partners or to the direction of the impeded movement).

A force-fitting connection (frictional connection) is to be understood as a direct or indirect force-fitting connection between at least two connection partners, in this case the front needle and the rear needle, which is caused by means of a frictional connection between the contact surfaces of the connection partners caused by a normal force (perpendicular to the surfaces of the connection partners or to the direction of the impeded movement).

The connection between the front needle and the rear needle can be both a form-fitting and a force-fitting connection or a combination of both connection techniques.

A frictional connection can in particular be achieved by an interference fit in a connection region of the connection between the front and the rear needle, so that a connection region of the front needle is elastically compressed and a connection region of the rear needle is elastically widened, or vice versa.

A connection portion is understood to mean that portion of the material needle in which parts of the front needle and the rear needle overlap axially. In addition to the axial form-fitting connection, further functions or functional components, such as guide surfaces, tilting bearings and other functional surfaces or components, can also be integrated in the connection portion.

In the context of this specification, form-fitting elements are understood to mean those form-fitting elements which contribute to the axial form-fitting connection between the front and the rear needles.

The front end of the front needle and/or the rear needle is to be understood as meaning the end that, in the material dispensing direction, is situated downstream of the rear end of the same part substantially along the longitudinal axis of the material needle, whereas the rear end is situated upstream of the front end in the material dispensing direction. Analogously, this also applies to the designation front and rear, which also relate to the material dispensing direction. In the sense of the invention, axial refers to the axis of the material needle which coincides with the axis of the material nozzle and the front needle axis and the rear needle axis.

Replacement is not only to be understood to be the exchange of a front needle with another front needle, but also the front needle is removed with subsequent insertion of the same front needle, as is done, for example, when cleaning the front needle and/or the material-carrying regions of the paint spray gun.

Further embodiments and features of the invention are also disclosed herein.

In an advantageous embodiment, the front needle or the rear needle respectively has a plurality of form-fitting elements which are preferably arranged so as to be distributed axially symmetrically and/or radially symmetrically over the circumference of the front or rear needle. This means, for example, that in each case two form-fitting elements of the front needle are opposite one another, wherein a different circumferential distribution of, for example, three or more form-fitting elements is also possible, which makes it possible to ensure the coaxial alignment of the front needle and the rear needle relative to one another.

The form-fitting connection can advantageously act axially on both sides. This means that each form-fitting element has contact surfaces which are both axially at the front and axially at the rear and interact with corresponding contact surfaces of the corresponding front needle or rear needle, respectively. A play-free connection can thereby be realized. This can be achieved, for example, by form-fitting elements of the front needle and/or of the rear needle having concave contact surfaces and the corresponding form-fitting elements of the rear needle or of the front needle having corresponding convex contact surfaces. Other corresponding shapes of the contact surfaces, such as a toothing or fluting, are possible.

Advantageously, the sliding bearing surface of the securing means is coated with a friction-reducing material. In this way, frictional forces can be reduced and thus the smooth movement of the material needle in the paint spray gun can be ensured. For this purpose, the sliding bearing surface can also be provided with a lubricant for reducing friction.

In an advantageous embodiment, the sliding bearing surface of the securing means is rounded in the longitudinal direction (in a longitudinal section), for example (circular) curved or involute. Rounding makes it possible advantageously to reduce the contact surface in the sliding bearing to a line contact extending in the direction of rotation. Furthermore, the risk of tilting and the occurrence of slip-and-stick effects are reduced.

In particular, the sliding bearing surface can be rounded in the circumferential direction. The rounding can thereby, for example, be adapted to a radius of curvature of the wall of the guide channel or be selected to be smaller than the radius of curvature of the wall. Among other things, the elasticity of the securing means can thereby be increased, but above all a cross-sectional shape that is advantageous in terms of flow is achieved. If the rounding of the sliding bearing surface is greater than the radius of curvature of the wall of the guide channel, or no rounding is present, a contact can be achieved at two points spaced apart from one another.

In an advantageous embodiment, it is provided that the maximum static frictional force between the sliding bearing surface of the securing means and the sliding surface of the paint spray gun is smaller than the force exerted by a counter-actuating element, for example a spring, on the material needle in the direction of the longitudinal axis in the material dispensing direction and counteracting the needle stroke.

The sliding bearing surface of the securing means is advantageously continuously closed in a circumferential direction of the sliding bearing. The securing means is designed with the sliding bearing surface in the case of a cylindrical guide channel, for example as a circular disk or as a circular cylinder or as a sleeve, wherein the sheath of the circular disk or of the circular cylinder forms the sliding bearing surface. A closed sliding bearing surface can achieve precise centering of the front needle in the guide channel.

Passage openings for passage of material in the longitudinal direction of the guide channel can be provided in the securing means.

Alternatively, however, the sliding bearing surface can also be designed with interruptions in a circumferential direction of the sliding bearing. In particular, the sliding bearing surface can be composed of a plurality of non-contiguous sliding bearing partial surfaces which, for example, are connected to a needle shaft of the front needle and/or the rear needle via radially projecting webs or vanes. Static overdeterminations, in particular as a result of manufacturing errors, can thereby be avoided.

In an expedient development of the invention, the sliding bearing surface can be designed to be continuously closed in the axial direction. However, the sliding bearing surface can also be designed with one or more interruptions in the axial direction. An axially continuously closed sliding bearing surface is easy to manufacture in terms of manufacturing technology. Interruptions in the sliding bearing surface are complicated in terms of manufacturing technology, but can improve sliding properties of the sliding bearing, for example by forming a lubricating film from the material to be atomized in the interruptions. The interruptions can be designed, for example, as a plurality of slots or grooves in the sliding bearing surface.

In order to produce a high angular positional accuracy of the front needle and the rear needle in the sense of a coaxiality or concentricity, the material needle advantageously has two tilting bearings which are axially spaced apart from one another, wherein each tilting bearing comprises an outer circumferential bearing surface extending in the axial direction on the front needle or the rear needle and an inner circumferential bearing surface, which extends in the axial direction and is associated with the outer circumferential bearing surface, on the rear needle or the front needle, so that the inner circumferential bearing surface encloses the outer circumferential bearing surface of each tilting bearing at least partially in contact with each other. The two tilting bearings form contact points or surfaces which prevent tilting of the front needle relative to the rear needle. Due to the tilting bearings, the front needle is statically precise and tilt-proof relative to the rear needle.

The tilting bearings can expediently be designed as cylinders and a cylinder receptacle associated with the cylinder in such a way that the inner circumferential bearing surface forms a cylinder receptacle and the outer circumferential bearing surface substantially forms a cylinder. The cylinder receptacle can, for example, be produced as a bore in the front needle or the rear needle. In another embodiment, the cylinder receptacle can also be formed by contact surfaces which bear in a punctiform or linear manner against the outer circumferential bearing surface.

For example, a pin-like projection of the rear needle or the front needle delimited by a shaft shoulder can be used as the cylinder. The cylinder and the cylinder receptacle can be manufactured with a slight interference fit. As a result, a press fit is present between the front needle and the rear needle, so that the front needle and the rear needle are also connected together in a fixed but releasable manner in a state removed from the paint spray gun. However, this connection can also be realized by an undercut in the front needle or the rear needle into which a counter element of the front needle or the rear needle engages.

It is advantageous if one of the tilting bearings is arranged at the axial rear end of the front needle or if the bearing surfaces of the front or rear needle forming the tilting bearing start at the height of the axial rear end of the front needle and extend axially in the material dispensing direction over a limited portion.

In order to achieve a material needle that is as short as possible, it is furthermore advantageous if the inner circumferential or outer circumferential bearing surface of a tilting bearing are at the same time designed as form-fitting elements of the axial form-fitting connection between the front needle and the rear needle, i.e., the form-fitting elements fulfill both the function of a tilting bearing and the function of a form-fitting connection. Such form-fitting elements enable the connection to be secured against unintentional release, even if increased forces act on the connection. Such a securing is, for example, important for application in high-pressure paint spray guns, in which a material is sprayed under pressures of 40 bar to 400 bar, which can lead to the high material pressure counteracting the opening of the material valve. In low-pressure paint spray guns, such a securing of the connection is advantageous, for example, if the front needle becomes wedged or for other reasons a higher application of force must be applied for retracting the front needle.

For a further improvement in the positional accuracy between the front and the rear needles, the front needle and/or the rear needle can expediently each form at least two form-fitting elements, respectively axially spaced apart from one another for the axial form-fitting connection between the front needle and the rear needle. In addition, the forces that can be transmitted via the form-fitting connection can be increased. High transmission forces also serve to improve the connection between the front and rear needles.

It can advantageously also be provided that the form-fitting elements are arranged in an axial front half of the front needle and—analogously the rear form-fitting elements are arranged at the height of the front half of the front needle, i.e., substantially at the axial end side on the rear needle, in particular at the axial front end of the rear needle.

It is particularly expedient if the securing means, and in particular the sliding bearing surface of the securing means, is formed axially at the height of the front form-fitting elements. The sliding bearing surface is preferably arranged axially between two axially spaced-apart form-fitting elements of the front needle or the rear needle. By means of such a positioning of the securing means or its sliding bearing surface relative to the form-fitting elements, on the one hand a force that is substantially vertical (i.e., acting in the radial direction relative to the axis of the material needle) is realized for securing the axial form-fitting connection between the front and rear needles and on the other hand a uniform division of this force onto two or more form-fitting elements of the front needle that are axially spaced apart from one another.

The axial form-fitting connection or the connection portion can be arranged at different positions within a paint spray gun. In one embodiment, the axial form-fitting connection or the connection portion can be relatively speaking arranged in the front, so that they are located within a material-carrying guide channel (paint channel). The entire front needle is preferably located in the guide channel, as a result of which the sliding bearing is partially lubricated by the material itself between the sliding surface of the wall of the guide channel and the sliding bearing surface of the securing means.

In an alternative embodiment, the axial form-fitting connection or the connection portion can be located outside the material-carrying channel, preferably in a guide channel that is sealed with respect to the material-carrying channel and arranged axially behind it. This guide channel which is not material-carrying is also referred to below as a guide bushing. The sliding bearing formed in the guide bushing can then, for example, be lubricated by means of a separate lubricant. This solution has the advantage that the entire portion of the material needle located in the material-carrying channel is formed by the front needle, and therefore no flow resistances of the detachable connection, such as the securing means represents, for example, hinder a flow of material. Furthermore, the entire part of the material needle that comes into contact with the material can be cleaned by simple removal.

In an expedient embodiment, the front needle has guide surfaces for forming a second sliding bearing with the wall of the guide channel. The second sliding bearing is in this case located at an axially different position than the first sliding bearing formed by the sliding bearing surface and the sliding surface. The coaxial alignment of the front needle and/or the rear needle is thereby ensured, and the vibration tendency of the material needle is reduced.

The guide surface of the second sliding bearing is advantageously radially rotated relative to the sliding bearing surface of the first sliding bearing, thus increasing a radial position (angular position) that differs from the radial position (angular position) of the sliding bearing surface.

It is advantageous if the form-fitting elements at least of the front needle and/or the rear needle are arranged on radially deflectable spring tongues, in particular in such a way that the spring tongues of the front needle do not touch the rear needle in the connected state in regions or over the entire axial length, or that, in the event of spring tongues arranged on the rear needle, the spring tongues of the rear needle do not touch the front needle, preferably only the form-fitting elements arranged at the ends of the spring tongues and the opposite region of the front needle or rear needle touch each other. A radial elasticity of the front needle or the rear needle can be increased in regions via the spring tongues, and, for example, a release of the axial form fitting can be facilitated. The spring tongues can be produced, for example, by introducing longitudinal slots or recesses into a closed circular cylinder surface of the front needle and/or the rear needle.

It is possible for the axial form fitting between the front needle and the rear needle to be prestressed in the radial direction, in particular by forming a pairing of the front form-fitting elements with the rear form-fitting elements as an interference fit. A release protection between the front needle and the rear needle is thereby present which prevents the front needle from releasing or falling from the rear needle when the securing means is released, for example in a maintenance state for exchanging the front needle. Otherwise, it is also possible to ensure a corresponding stiffness of the spring tongues without the need for an interference fit. In addition, the form-fitting elements can be configured such that a tactile and/or acoustic feedback arises when the front needle is connected to the/rear needle.

The axial form fitting between the front and rear needles can be designed to be self-locking or non-self-locking with respect to an axial tensile force in a release direction. The axial form-fitting connection is expediently designed to be not self-locking, so that the form fitting can be released solely by applying an axial tensile force. In contrast to, for example, self-locking clip connections, cumbersome release handles, in which a form-fitting connection must be levered open with a tool, can be avoided.

A non-self-locking form-fitting connection can in particular be realized via a force transfer device acting between the front and rear needles. A force transfer device proposed here is to be understood as a mechanical operative surface pair in which an introduced axial tensile force is converted at least partially into a radially acting force which causes the form-fitting elements of the axial form-fitting connection between the front and the rear needles to lift off from one another. The force transfer device can be realized, for example, in the form of an inclined surface which deflects the adjacent region of the front or rear needle during a movement in the axial direction in the radial direction and thus serves to translate an axial force component into a radial force component. The smooth movement of a release process can thereby be advantageously influenced.

In one embodiment, it can be provided that the securing means is radially elastically deformable, in particular by a recess located in the securing means and/or an opening located there. As a result, the first sliding bearing can be clamped radially between the sliding bearing surface and the sliding surface of the guide channel. This allows improved centering under only slight increase in the frictional forces in the sliding bearing.

Another aspect of the invention relates to a front needle for the above-described material needle, wherein the front needle has a needle tip forming a valve seat and a connection portion with front form-fitting elements for releasable connection to a rear needle. The front needle is characterized in that the front needle comprises a radially projecting securing means, which has a sliding bearing surface, for introducing radially acting forces onto the connection portion at the height of the connection portion.

The features described in connection with the material needle can be applied analogously to the front needle.

The invention also relates to a rear needle of the above-described material needle having the features mentioned in reference to the rear needle.

The statements made above are therefore in particular not to be understood to mean that the invention is to be limited to a material needle which comprises a front needle and a rear needle. Both the front needle and the rear needle can form independent subjects of the invention. Furthermore, the material needle can also be constructed from more than two parts, which can in particular be separated from one another.

Another aspect of the invention proposes a paint spray gun having a material needle mounted in the paint spray gun, as described above. The paint spray gun comprises a material nozzle (nozzle) with a nozzle opening that defines an axis. The material needle extends along a longitudinal axis. The longitudinal axis of the material needle and the axis of the nozzle opening coincide. The paint spray gun comprises a guide channel which extends in the direction of the axis of the nozzle opening and in which the material needle runs at least in portions. The material needle can be moved axially in relation to the longitudinal axis in order to release or close the nozzle opening within a defined needle stroke in the guide channel. The guide channel has a sliding surface facing the axis of the nozzle opening and, with the sliding bearing surface of the securing means of the material needle, forms an axial sliding bearing for securing the axial form-fitting connection between the front needle and the rear needle.

It can be advantageous to form the sliding surface of the guide channel from a first material and the sliding bearing surface of the securing means from a second material that is different from the first material. In particular, the guide channel can be formed from a metal or a metal alloy, while the sliding surface is formed from a technical plastic. As a result, abrasion effects can be limited substantially to the front needle serving as a wear part. On the other hand, a part of or the entire front needle forming the sliding surface can consist of a particularly abrasion-resistant material such as a metal alloy suitable for this purpose or a technical ceramic. On the other hand, only the needle tip or the front part of the front needle can also consist of such a material.

The invention also relates to a first method for exchanging a front needle of a material needle mounted in a paint spray gun having a longitudinal axis, wherein this longitudinal axis coincides with an axis of the nozzle opening defined by a nozzle opening of a material nozzle. The longitudinal axis defines a radial direction which extends circumferentially perpendicular to the longitudinal axis. The material needle comprises a front needle, which is at the front in the axial direction, and a rear needle, which is at the rear in the axial direction, which needles are releasably connected together in order to transmit axial forces via an axially extending connection portion. The paint spray gun has a guide channel extending in the direction of the axis defined by the nozzle opening, in which guide channel the material needle is displaceable axially relative to the longitudinal axis in order to release or close the nozzle opening in an operating mode for spraying paint or another liquid within a defined needle stroke, and wherein the guide channel precisely defines a radial position of the connection portion. The axially extending connection portion of the material needle is located at least in portions in the guide channel if the material needle is located within the defined needle stroke. In order to exchange the front needle, the material needle can be displaced in a maintenance mode (maintenance state) beyond the defined needle stroke, so that the connection portion is located outside the guide channel, wherein the front needle and the rear needle can be separated from one another only and precisely if the connection portion is located outside the guide channel. To exchange the front needle, the following steps are performed:

a) axial displacement of the material needle beyond the defined needle stroke up to a point at which the connection portion is located outside of the guide channel,
b) releasing the front needle from the rear needle by applying an axial tensile force to the front needle,
c) connecting the same or another front needle to the rear needle at the connection portion by pushing the same or other front needle onto the rear needle, and
d) axially inserting the material needle up to a point at which the connection portion lies within the guide channel.

An intermediate step is preferably carried out between the release and the connection of the same or other front needle with the rear needle. This can be the cleaning of the front needle and/or the choice of another, preferably unused front needle.

To the extent necessary, components axially closing the guide channel of the paint spray gun and/or axial stop surfaces impeding the axial movement of the material needle, such as an air cap, are to be removed from the paint spray gun in order to carry out the method.

The paint spray gun can advantageously be designed in such a way that the axial displacement of the material needle takes place beyond the defined needle stroke in the axial direction toward the rear up to a point at which the connection portion is located outside of the guide channel. This is achieved, for example, by the guide channel being designed to be open toward the rear and/or one or more components being provided which hinder a backward movement of the material needle and are attached to the paint spray gun in a removable manner and preferably provide an end stop for the rear end of the rear needle.

In another, second method for exchanging a front needle of a material needle mounted in a paint spray gun with substantially the same structure as described in connection with the first method-instead of moving the connection portion of the material needle from the guide channel by axial displacement of the material needle from the guide channel-it can be provided to remove the guide channel from the paint spray gun and thereby to release the sliding bearing between the sliding bearing surface of the securing means and the sliding surface of the guide channel, so that the securing of the axial form-fitting connection is released.

In particular, the following steps are to be carried out:

a) axially removing the guide channel for releasing the sliding bearing surface of the front needle,
b) removing the front needle from the rear needle by applying an axial tensile force to the front needle,
c) attaching the same or another front needle to the rear needle, and
c) re-attaching the same or another guide channel.

Analogous to the first method, an intermediate step is carried out between the release and the connection of the same or other front needle to the rear needle. This can be the cleaning of the front needle and/or the choice of another, preferably unused front needle.

BRIEF DESCRIPTION OF THE DRAWINGS

The invention is described by way of example below with reference to the accompanying set of figures, wherein the statements are to be understood equally in reference to a front needle according to the invention, a material needle according to the invention, and a paint spray gun according to the invention, and the method according to the invention.

In the drawings.

DETAILED DESCRIPTION

Figure 8:
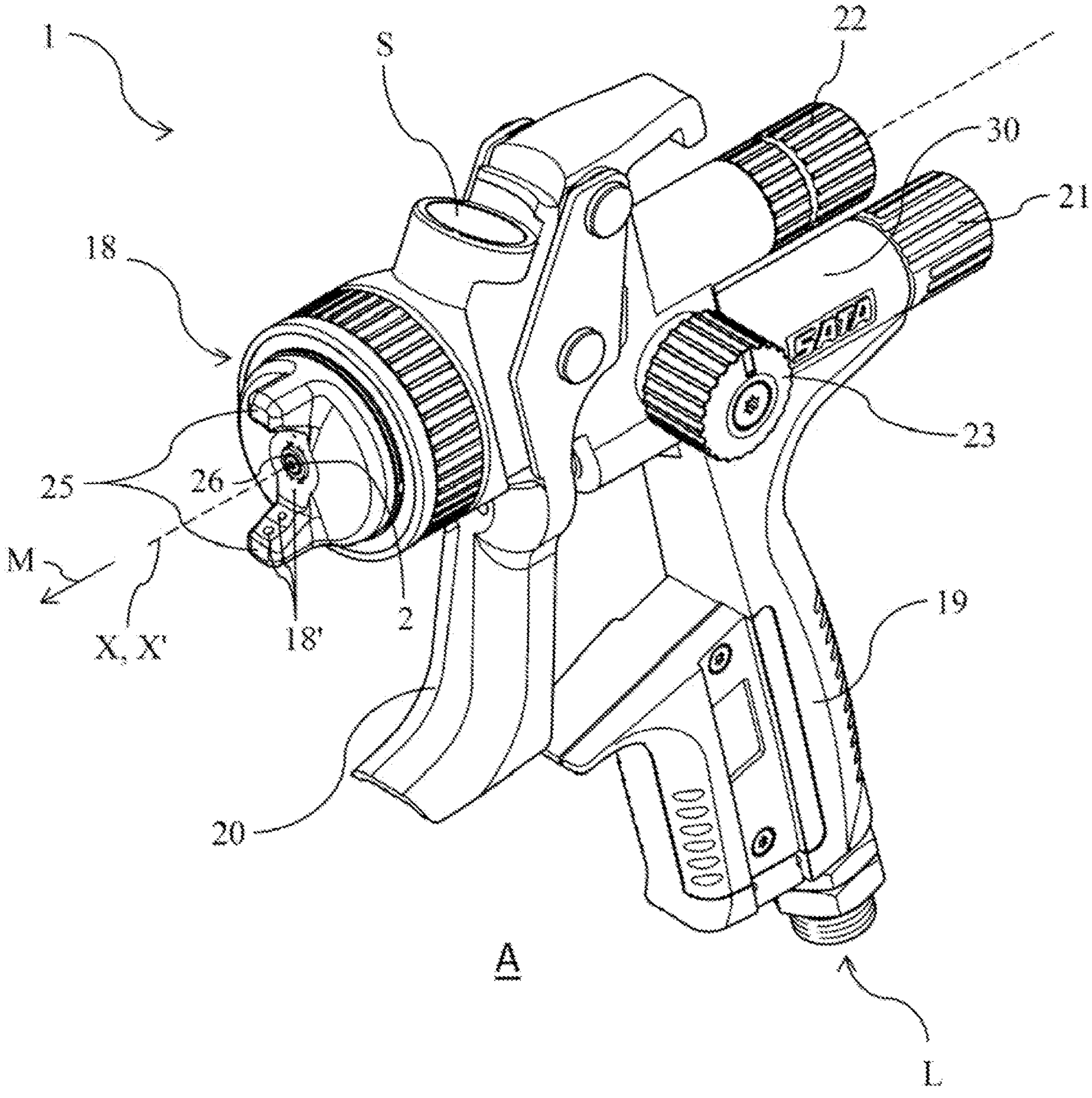
FIG. 8 is a second paint spray gun according to the invention in a perspective view in an operating state A.
Figure 9:
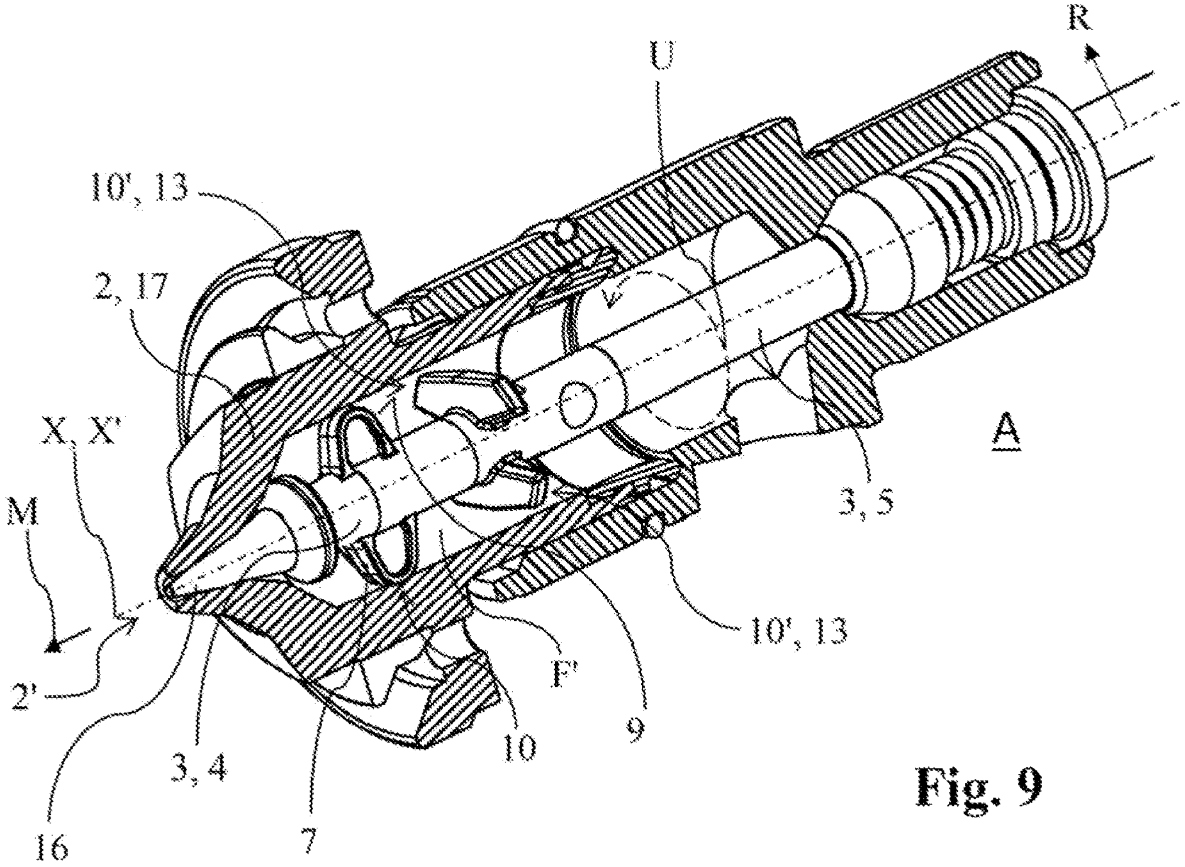
FIG. 9 is a perspective view of a paint channel of the paint spray gun according to FIG. 8 and material needle inserted therein.

FIGS. 1 to 7 show a first embodiment of the invention. A paint spray gun 1 is shown which is designed as an air-supported high-pressure paint spray gun with a compressed air connection L and a material connection S. Paint under pressure of, for example, 100 bar is fed into a paint channel F' via the material connection S and is dispensed via a nozzle 2 or a nozzle opening 2' of the paint spray gun 1. In this case, the paint is atomized directly at the exit from the nozzle opening 2' due to pressure. The shape of the emitted paint jet can be set via air outlet openings 18' of an air cap 18. For this purpose, horns 25 and the air cap can be provided. These can protrude from the air cap in the material dispensing direction M, as can be seen, for example, from FIG. 8. Air outlet openings 18' can be provided on the horns, which air outlet openings are directed inward from the outside in the radial direction toward the extended axis X' of the nozzle opening. The air released at these air outlet openings 18' is sometimes also referred to as horn air and can be regulated via adjusting screw 21 and/or the side adjusting screw 23. Furthermore, air outlet openings 18' can be provided directly on the air cap, which air outlet openings are diametrically opposite with respect to the axis X' of the nozzle opening and serve for the transport of the atomized material in the material dispensing direction M and, if applicable, for jet formation. In addition, an annular gap 26 shown in FIG. 8 can also be provided which surrounds the material nozzle and emerges at the compressed air which serves to nebulize or support the atomization.

A material needle 3 is mounted in the circular cylindrical and hollow cylindrical paint channel F' of the paint spray gun, so as to be displaceable axially along the longitudinal axis X of the material needle 3. The longitudinal axis X coincides with the axis X' of the paint channel F'. The longitudinal axis X defines a radial direction R perpendicular to the longitudinal axis.

Figure 1:
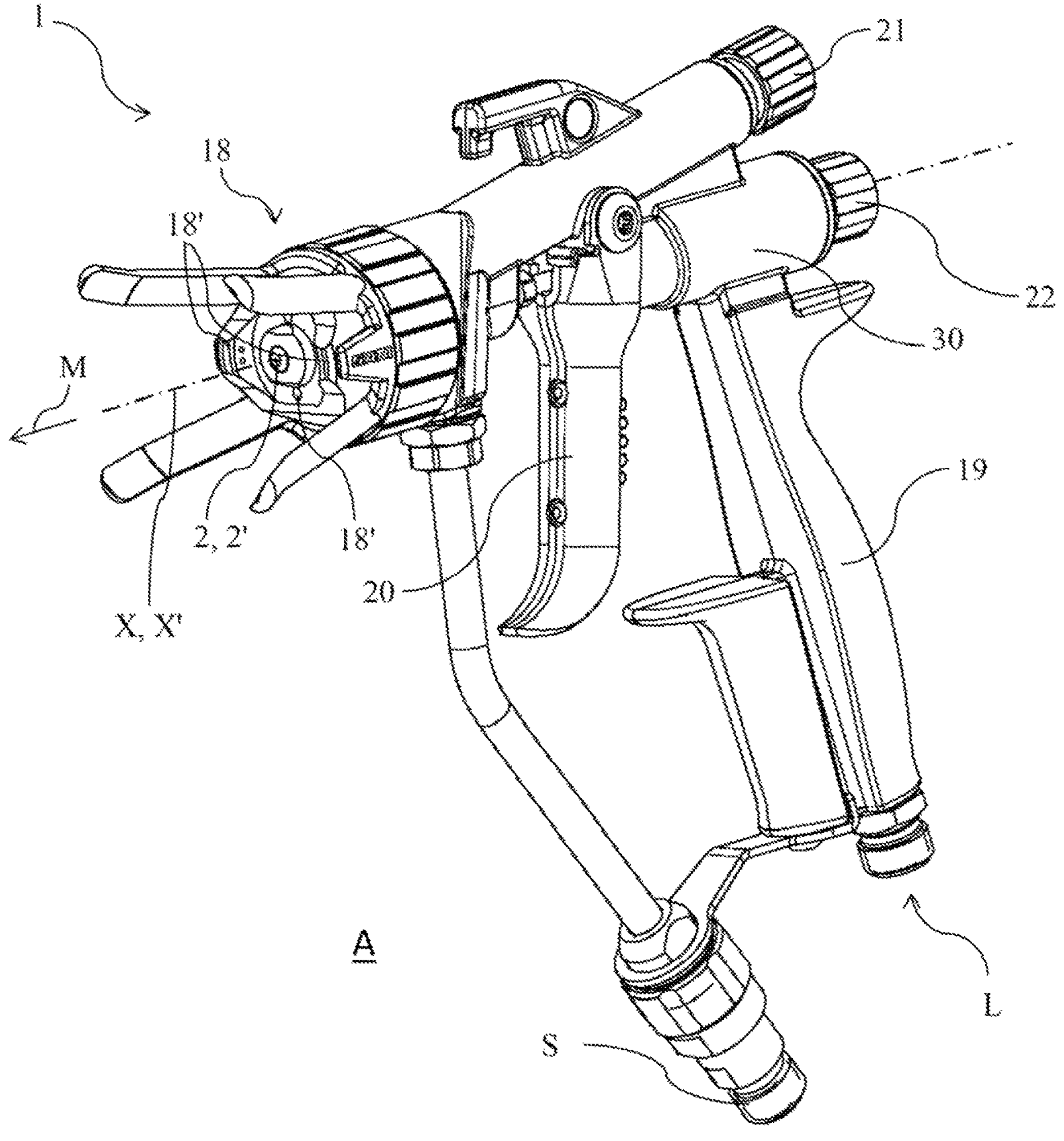
FIG. 1 is a perspective view of a first paint spray gun according to the invention in an operating state A.
Figure 2A:
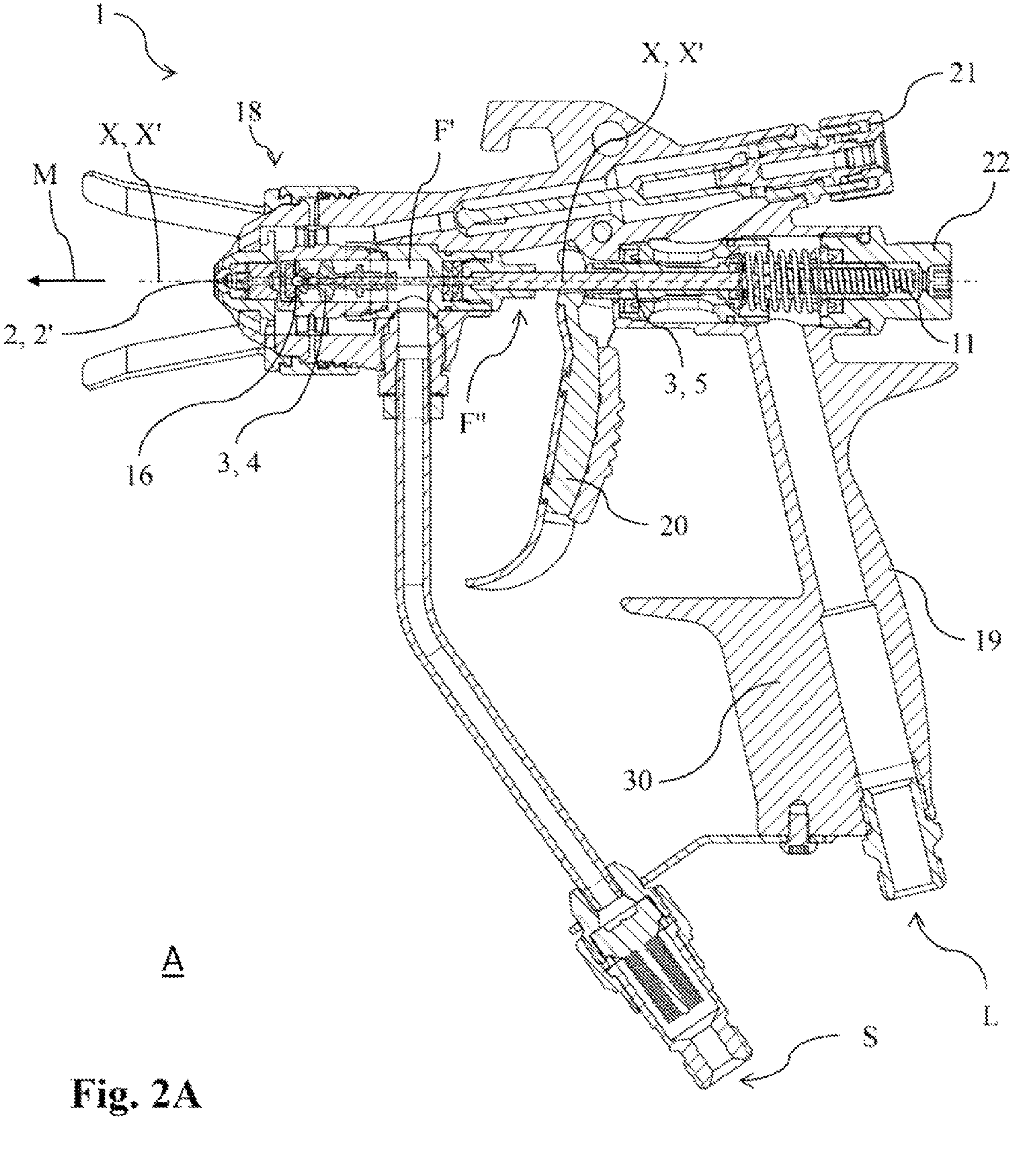
FIG. 2A is a longitudinal section of the paint spray gun from FIG. 1.
Figure 2B:
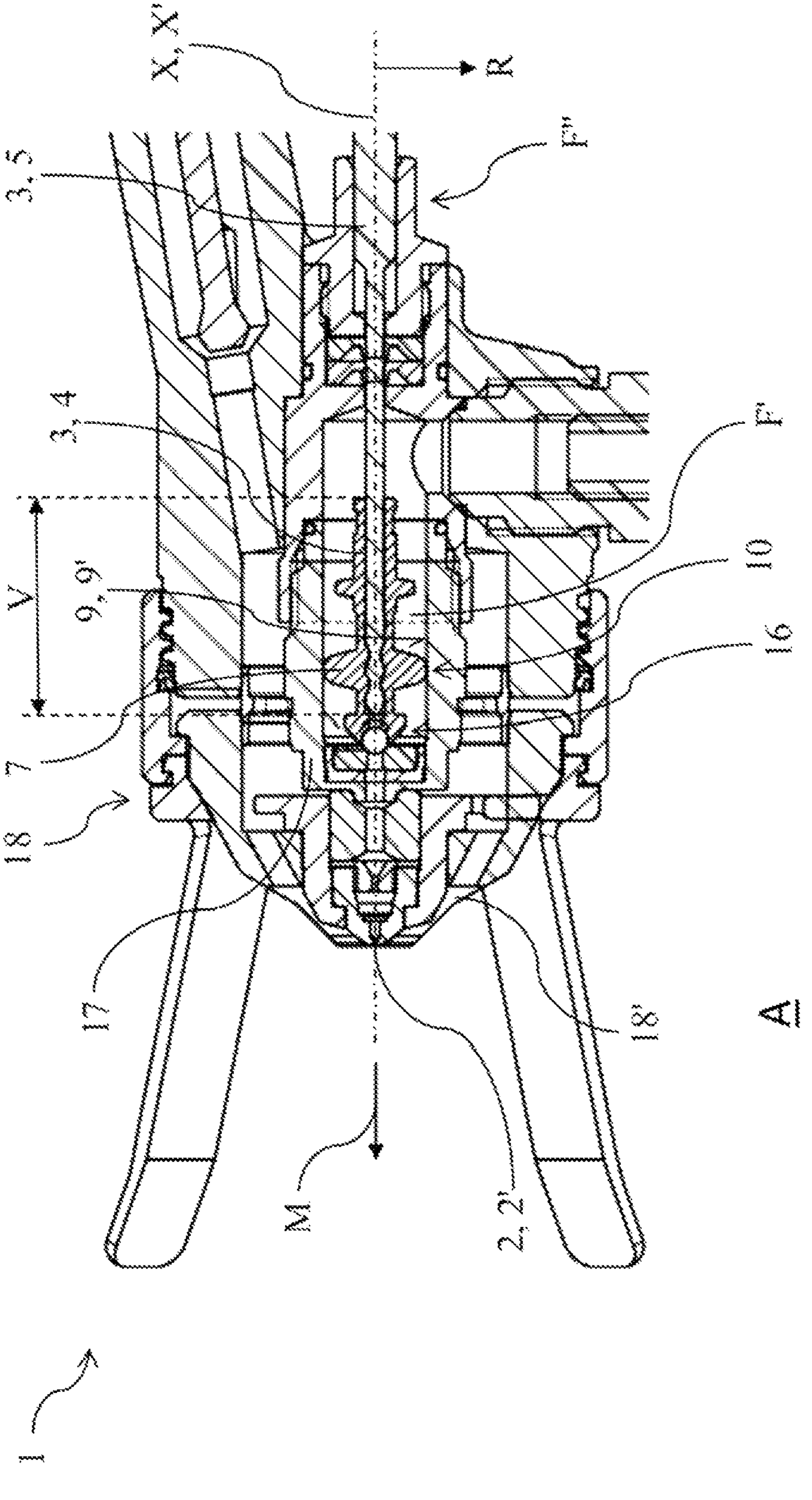
FIG. 2B is a detail view of a front portion of the paint spray gun from FIG. 2A.
Figure 3:
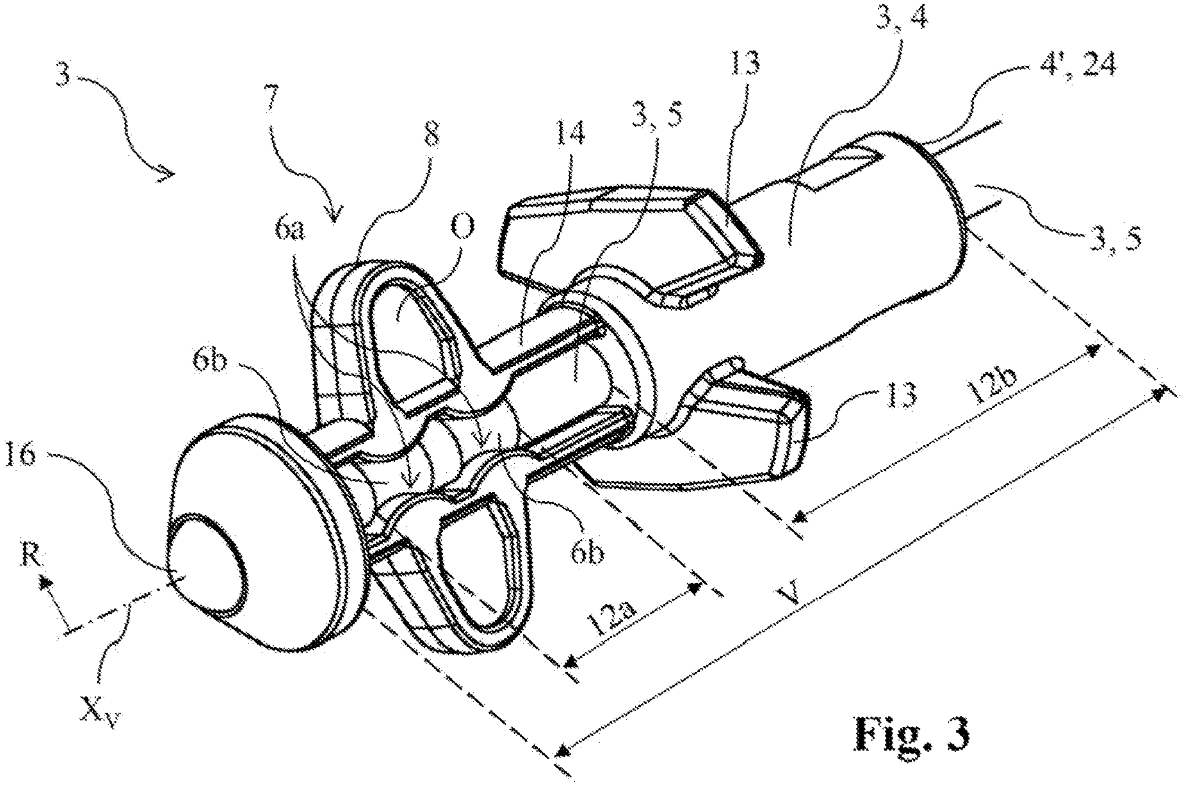
FIG. 3 is a perspective view of a front portion of a material needle according to the invention of the paint spray gun from FIG. 1.

In the normal state, the material needle 3 is pre-loaded by a counter-actuating element 11, which is designed here as a spring, as can be seen inter alia from FIG. 2A, with an axial prestressing force acting in a material dispensing direction M and closes the nozzle opening 2' or a valve seat located upstream with a needle tip 16.

For dispensing paint from the nozzle opening 2', an extraction element 20 of the paint spray gun 1 is manually actuated, via which the material needle 3 is displaced axially rearward over a defined needle stroke in order to release the nozzle opening 2'.

The material needle 3 is designed substantially in two parts, with a front needle 4, which is at the front in the axial direction, and a rear needle 5 connected to the front needle 4 along a connection portion V. The front needle 4 or rear needle 5 are connected together via an axial form-fitting connection.

The form-fitting connection is formed by respectively interlocking form-fitting elements **6*a* or 6*b* attached to the front needle 4 or the rear needle 5. In the embodiment shown here, the form-fitting elements 6*b* of the rear needle 5 are in each case two axially spaced-apart form-fitting elements 6*b* having a concave cross-section and formed as circumferential annular grooves at a front end of the rear-needle 5', as can be seen from the representation of a front portion of the rear needle 4 from FIG. 4. In each case diametrically opposite and convexly shaped form-fitting elements 6*a* of the front needle 4 which are, however, not convex over the entire circumference of the front needle 4, engage in these annular grooves, as can be seen, inter alia, from FIG. 3. The form-fitting elements 6*a* are attached to a radially deflectable spring tongue 14 of the front needle 4, so that the form-fitting connection can be released from the form-fitting elements 6*b* of the rear needle 5 by applying an axial tensile force to the front needle 4**.

Because the form-fitting elements **6*a* and 6*b* are designed to be concave-convex, the form-fitting elements 6*a* and 6*b* form a force transfer device, which causes tensile forces applied in the axial direction into radial deflection forces for lifting the form-fitting elements 6*a* from the form-fitting elements 6*b*. In other words, the form fitting connection designed in this way is designed to be not self-locking and is not designed to be releasable without a deflection of the spring tongue 14** in the radial direction R.

The form-fitting connection can be established by axially pushing the front needle 4 onto the rear needle 5 or by axially pulling the front needle 4 off of the rear needle 5.

In order to prevent a release of the axial form-fitting connection in an operating state A of the paint spray gun, the front needle 4 has a wing-like securing means 7 projecting radially from the spring tongue 14. The securing means 7 has a sliding bearing surface 8 which is shown in the axial direction with an arc shape in FIG. 3 and which in the operating state A is in contact with a portion of the wall 9 of the guide channel F' referred to as a sliding surface 9'. In the operating state A, the sliding bearing surface 8 and the sliding surface 9' form an axial sliding bearing 10 for axial-radial guidance of the front needle 4, i.e., for fixing a radial position of the front needle 4 relative to the guide channel F'. The securing means 7 thus serve on the one hand for securing the axial form-fitting connection and, on the other hand, for the position orientation of the front needle, that is to say the concentric alignment of the front needle 4 within the guide channel F'.

The sliding bearing 10 thus formed prevents a radial deflection of the spring tongue 14 and thus a lifting of the form-fitting elements **6*a* from the form-fitting elements 6*b*. The corresponding contact of the sliding bearing surface 8 on a portion of the wall 9 of the guide channel F', the sliding surface 9', is apparent, for example, from FIG. 5**A.

By means of such improved positional accuracy of the front needle 4, the needle tip 16 can be positioned more precisely relative to the nozzle opening 2' or the valve seat. This results in less wear, and in particular in a more uniform wear, and thus a greater service life of the front needle 4 and a more uniform spray pattern of the paint spray gun 1.

Figure 5A:
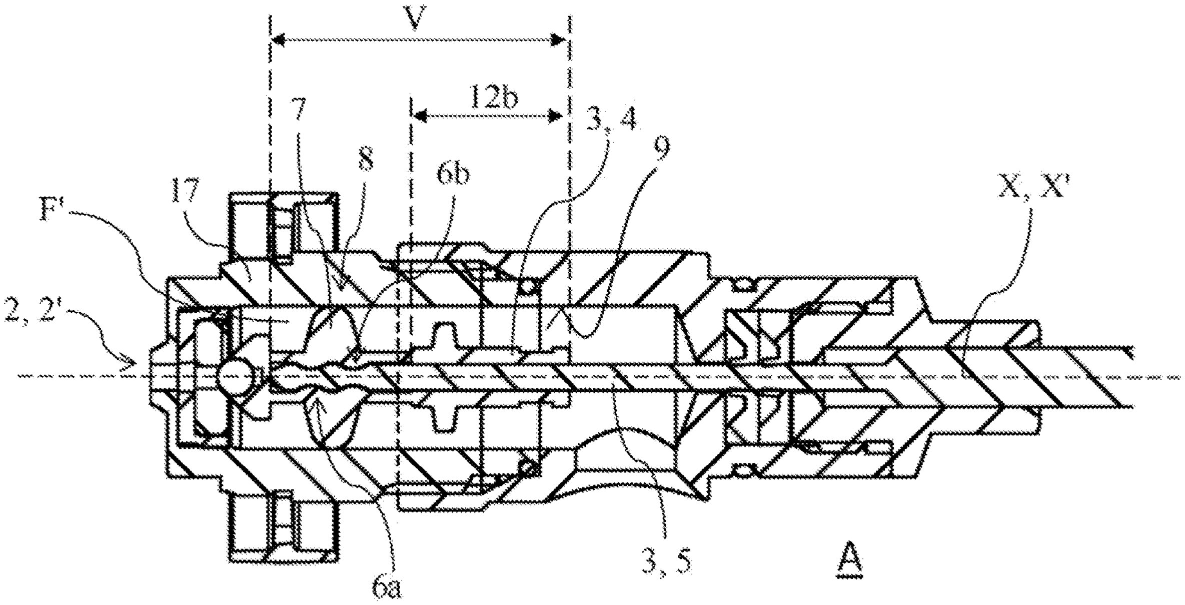
FIG. 5A is a longitudinal section through a guide channel of the paint spray gun from FIG. 1 in the operating state A.
Figure 5B:
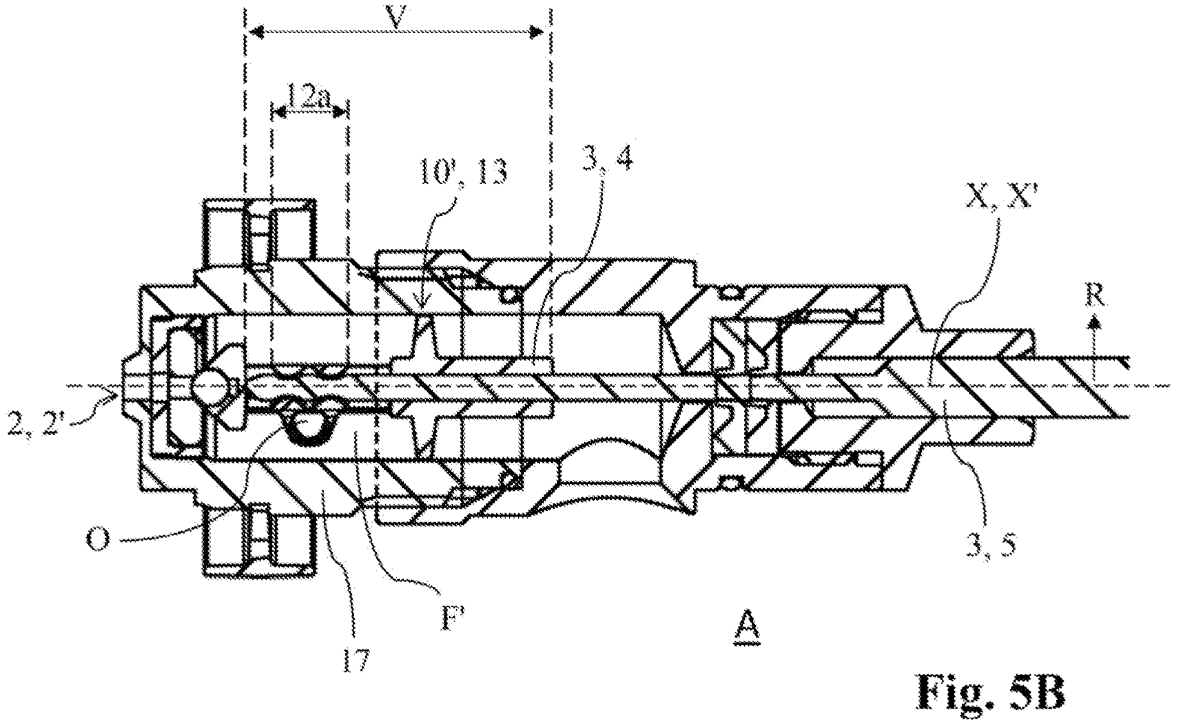
FIG. 5B is a longitudinal section rotated by 45° about the longitudinal axis to FIG. 5A.

In addition, in the embodiment shown here, the securing element 7 is designed to be radially elastically "soft," namely web-like and with an opening O or at least a recess located in the securing element 7; see, for example, FIG. 5B. Preferably, when inserted into the guide channel F, the securing element 7 is radially slightly prestressed and introduces corresponding radially acting forces into the axial form-fitting connection. On the other hand, a small play can also be provided between the securing element 7 and the channel wall 9, wherein the forces acting radially on the channel wall 9 only begin to act when the spring tongues 14 are deflected in the radial direction R by a slight opening of the connection between the front needle 4 and the rear needle 5, via the interaction of the form-fitting elements 6*a* and 6*b*. As a result, an improved securing of the form-fitting connection against radial deflection and in particular an additional frictional connection can be realized in the pairing of the form-fitting elements 6*a* and 6*b*.

The operating state A is understood to mean a state of the paint spray gun 1 in which the paint spray gun 1 is usable for dispensing paint or another liquid from the nozzle opening 2' and in which, in particular, the sliding bearing surface 8 and the sliding surface 9' are in contact.

For the best possible coaxiality of the front needle 4 with respect to the rear needle 5, which can be described via the front needle axis $X_V$ and the rear needle axis $X_H$, the material needle 3 has two tilting bearings, namely a front tilting bearing 12*a*, which is in the front in the axial direction, and a rear tilting bearing 12*b*, which is in the rear in the axial direction, which tilting bearings prevent a tilting of the front needle 4 (front needle axis $X_V$) relative to the rear needle 5 (rear needle axis $X_H$).

The rear tilting bearing 12*b* is formed by an outer circumferential bearing surface 12*b*" of the circumferential surface of a front end of the rear needle 5, which is formed by an inner circumferential bearing surface 12*b*', an inner surface of an end sleeve portion at the rear end of the front needle 4. The front tilting bearing 12*a* is formed by the form-fitting elements 6*a* and 6*b*.

The axially spaced-apart tilting bearings 12*a*, 12*b* thereby form support points via their bearing surfaces, which support points prevent a tilting of the front needle axis $X_V$ relative to the rear needle axis $X_H$.

The overlapping portion of the front needle 4 and the rear needle 5 between the axial front end of the rear needle 5' and the axial rear end of the front needle 4' forms the connection portion V.

In addition, a further guide surface 13 is integrally formed on a protruding wing in a radially protruding manner on the connection portion V of the front needle 4, in this case a guide sleeve of the front needle 4 designed as a hollow cylinder and forming the bearing surface 12*b*', which further guide surface 13 forms a second slide bearing 10' in combination with the channel wall 9 of the guide channel F'. In this case, the guide surface 13 is arranged with respect to the sliding bearing surface 8 of the securing means 7 at a different angular position in the circumferential direction U. This angular position is rotated by approximately 45° with respect to a radial position (circumferential direction) of the sliding bearing surface 8. The sliding bearing surface 8 thus defines a first radial position of the front needle 4, while the guide surface 13 determines a second radial position of the front needle 4. As a result, the front needle 4 is statically precisely determined in the guide channel F'. A corresponding contact of the guide surface 13 with the wall 9 of the guide channel F' can be seen in FIG. 5B, which shows a longitudinal section rotated 45° with respect to the one in FIG. 5A. Alternatively to the second sliding bearing 10', an extended first sliding bearing 10 can also be provided in order to ensure the tilt safety. Such a sliding bearing is shown, for example, in FIGS. 15 to 20. In this case, the first sliding bearing 10 is preferably longer in the longitudinal axis than the diameter of the material needle 3 at the sliding bearing point, preferably two or three times the length of the diameter.

In summary, the front needle 4 can be subdivided accordingly into three functional portions, namely into the guide sleeve at the axial rear end of the front needle 4 to form a tilting bearing 12*b*, spring tongues 14 which adjoin axially in the material dispensing direction M, and on which are arranged radially to the inside the form-fitting elements 6*a* for forming an axial form-fitting connection with the rear needle 5 and at the same time the bearing surface 12*a*' of the first tilting bearing 12*a* and also on the outside a securing means 7 having a sliding bearing surface 8 for forming the sliding bearing 10, and finally a front needle head adjoining the spring tongues 14 in the material dispensing direction and on which a needle tip 16 serving as a valve (needle valve) for opening and releasing the nozzle 2 is integrally formed.

In summary, the rear needle 5 has two annular grooves (form-fitting elements 6*b*) at the axial front end of the rear needle 5' to form the axial form-fitting connection and the bearing surface 12*a*"; following counter to the material dispensing direction, the rear needle 5 has a bearing surface 12*b*' to form the tilt bearing 12*b*.

In order to increase the service life, the needle tip in this embodiment is designed in multiple parts, in this case with a ball made of a hard metal or a technical ceramic introduced as a separate component into the needle tip. The rest of the front needle 4 is made here of a fiber-reinforced construction plastic, a ceramic or a metal alloy. The rear needle 5 is made of a metal, a metal alloy or a ceramic. Wear phenomena are thereby substantially limited to the exchangeable front needle 4, so that a regular exchange of the rear needle 5 can be avoided.

Figure 6:
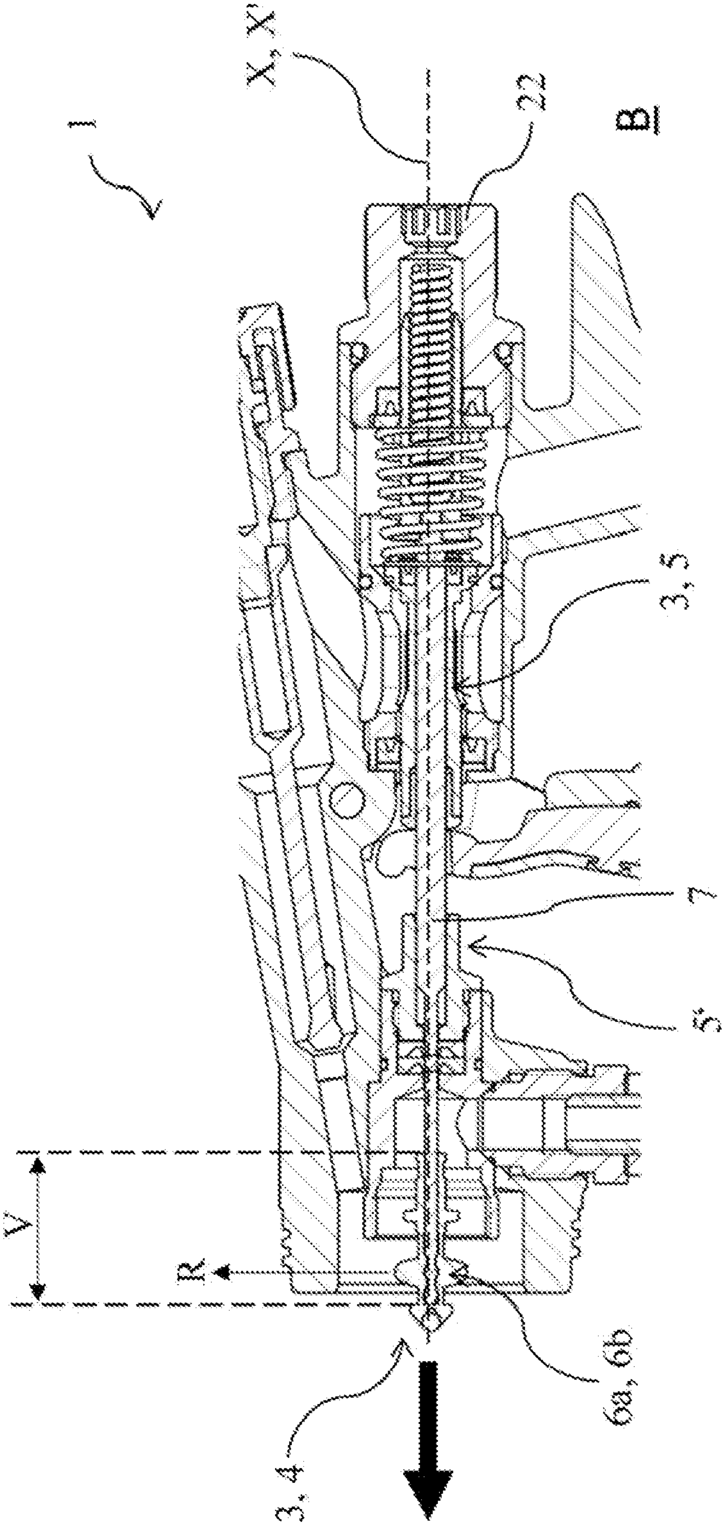
FIG. 6 is a detail of the longitudinal section according to FIG. 2 without an air cap and channel component in a maintenance state B of the paint spray gun.
Figure 7:
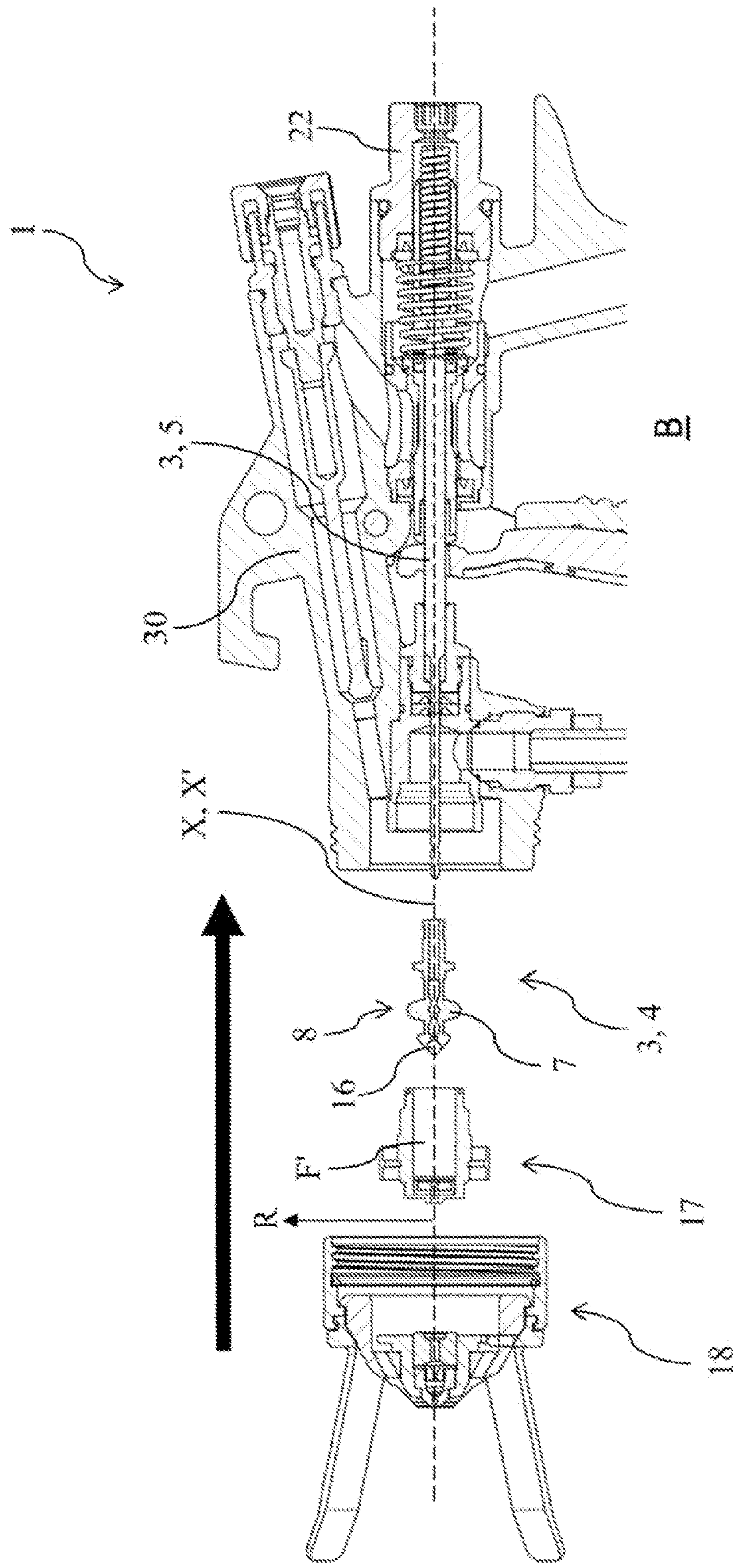
FIG. 7 is an illustration analogous to FIG. 6 with a front needle and an air cap and channel component to be applied.

To exchange the front needle 4, the paint spray gun can be set into a maintenance state B shown in FIG. 6, for example. The maintenance state B can be defined as that state of the paint spray gun 1 in which the contact between the sliding bearing surface 8 and the sliding surface 9' is released.

In the embodiment shown here, the maintenance state B is produced by removing an air cap 18 and a channel component 17 that forms the guide channel F'. By pulling the channel component 17 off of the sliding bearing surface 8 of the securing means 7 of the front needle 4, the axial form-fitting connection between the front needle 4 and the rear needle 5 is no longer secured, so that the front needle 4 can be pulled off by pulling it axially toward the front (to the left in the drawing plane) from the rear needle 5 under a radially elastic deflection of the horse tongue 14. The remote front needle 4 can be exchanged with a new front needle and pushed onto the rear needle 5 until an axial form-fitting connection of the form-fitting elements 6*a*, 6*b* is restored. Subsequently, the channel component 17 and then the air cap 18 are again mounted on the paint spray gun or the main body 30 of the paint spray gun 1.

The rear needle 5 can remain in the paint spray gun 1 for the exchange and need not be released, loosened or otherwise removed from the paint spray gun 1.

A corresponding embodiment of the paint spray gun 1 makes it possible to clean or, advantageously, exchange a front needle 4 quickly, easily and in particular without tools.

The rear needle 5 is mounted circumferentially over the entire circumference of the needle shaft of the rear needle 5 via a guide bushing F" located axially behind the paint channel F'. The guide bushing F" is sealed relative to the paint channel F' via sealing elements D. The radial position of the rear needle 5 is precisely defined via the guide bushing F".

FIGS. 8 to 12 show a second embodiment of the invention.

Insofar as identical or similar components are also provided with the same or similar reference characters for second and subsequent embodiment variants of the invention, reference is always made to the preceding statements and only the essential differences are highlighted and explained.

The paint spray gun 1 shown in the second embodiment is a low-pressure paint spray gun 1 in a paint flow cup variant in which paint can be introduced into the paint channel F' using gravity via a paint flow cup which can be attached to the material connection S, and the paint can be sprayed via the material nozzle 2 or the nozzle opening 2' thereof. In contrast to the high-pressure paint spray gun of the first embodiment, the paint is not fed under high pressure into the guide channel F' carrying the paint and atomized due to the pressure, but is entrained via a separate air flow, which comes out as atomizing air at the annular gap 26 near the nozzle opening, and is thereby atomized.

Figure 10:
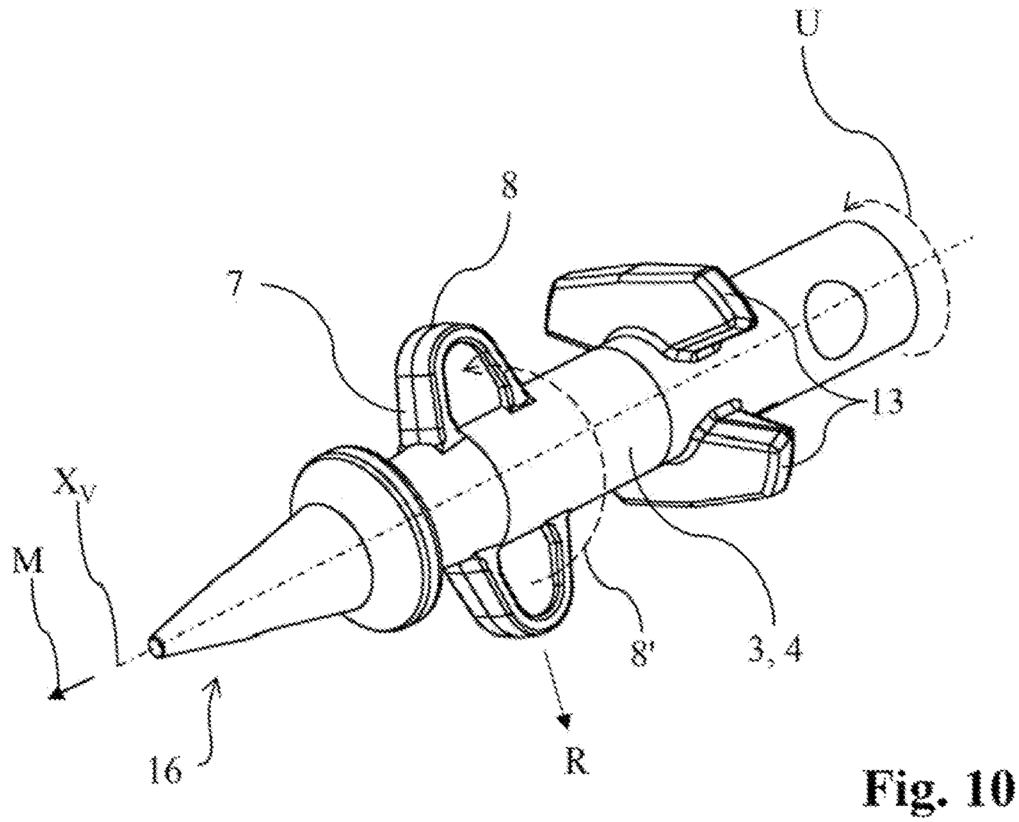
FIG. 10 is a perspective view of a front needle, according to the invention, of the paint spray gun from FIG. 8.

In addition to the different embodiment of the paint supply S, the nozzle 2 and the compressed air distribution, the second embodiment is distinguished by air outlet openings 18' arranged and designed differently with regard to the valve seat and the needle tip 16 forming the valve head, which is designed here with a needle shape, i.e., with a conically tapering end, see in particular FIG. 10.

A further difference relates to the embodiment of the second portion of the front needle 4 arranged between the needle tip 16 and the second tilting bearing 12*b,* which, in contrast to the first embodiment, is not open on the side and is instead designed to be circumferentially closed with a spring tongue 14, so that the front needle 4 substantially has a continuous sleeve-like shape from the axial rear end of the front needle 4' up to the needle tip 16, wherein a sliding bearing surface 8 is integrally formed on the radially projecting and wing-like securing means 7 in the front half of the front needle 4 analogously to the first embodiment. On the inside, analogous to the first embodiment, form-fitting elements 6*a* which can be seen in the figures with longitudinal sections are integrally molded onto radially inwardly oriented sides.

Figure 4:
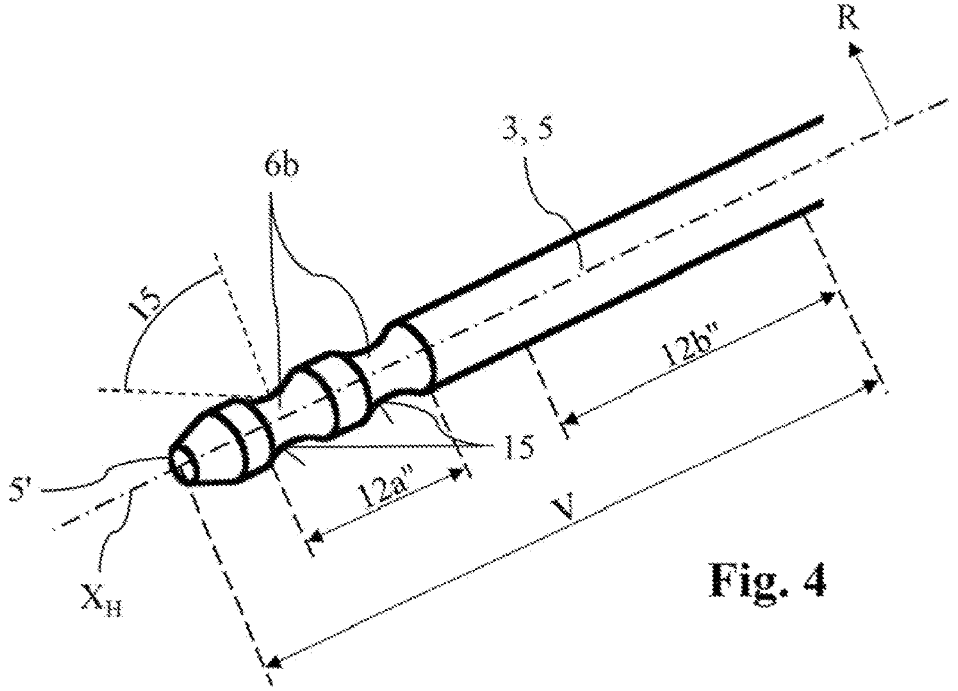
FIG. 4 is a perspective view of a front portion of a rear needle of the paint spray gun from FIG. 1.
Figure 13:
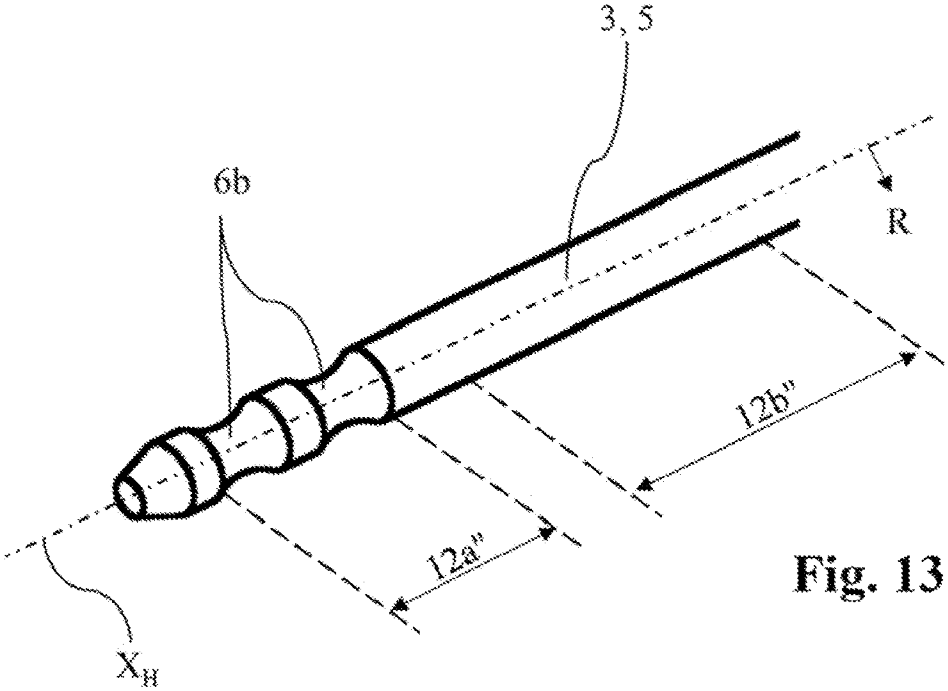
FIG. 13 is a perspective view of a rear needle for the paint spray gun from FIG. 8.

The rear needle 5 shown in FIG. 13 is designed in the same way as the first embodiment, i.e., analogous to FIG. 4.

Due to the sleeve-like design of the front needle 4, the elasticity in the radial direction R or the deflectability of the form-fitting elements 6*a* relative to the first embodiment is reduced and designed to be more rigid, so that somewhat higher axial forces are necessary to release the axial form-fitting connection. As mixed forms of both configurations, the lateral recesses of the first embodiment, which are provided for easier deflectability of the spring tongues in the radial direction R and run in the direction of the longitudinal axis X, can also be of a different shape, a different length and/or width or a different depth, and, for example, non-overlapping.

However, the function of securing the axial form-fitting connection in the operating state (FIG. 11) via the sliding bearing 10 between the wall 9 of the guide channel F' and the sliding bearing surfaces 8 of the securing means 7 is comparable. Here too, exchange of the front needle 4 is possible by removing the channel nozzle component 17 in the axial direction, exchanging the front needle and subsequently re-applying the guide channel 17.

Figure 11:
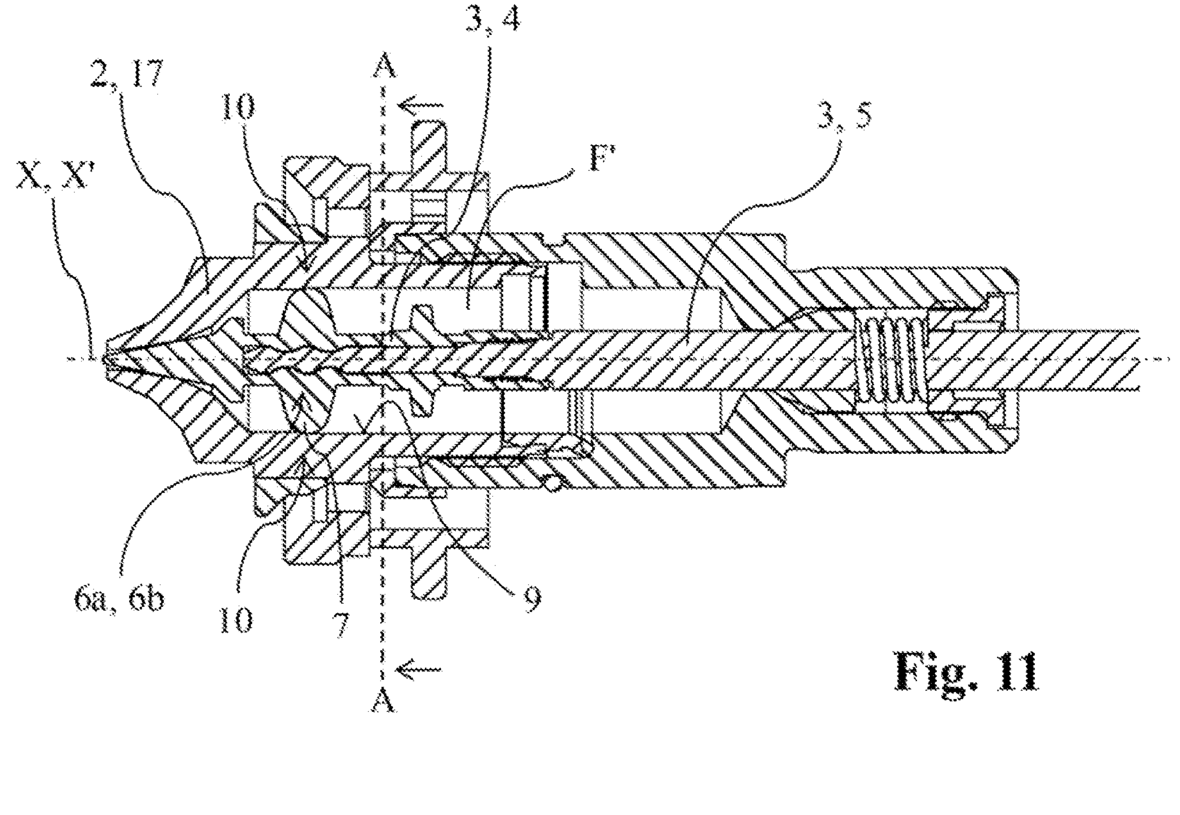
FIG. 11 is a longitudinal section of the paint channel of FIG. 9.
Figure 12:
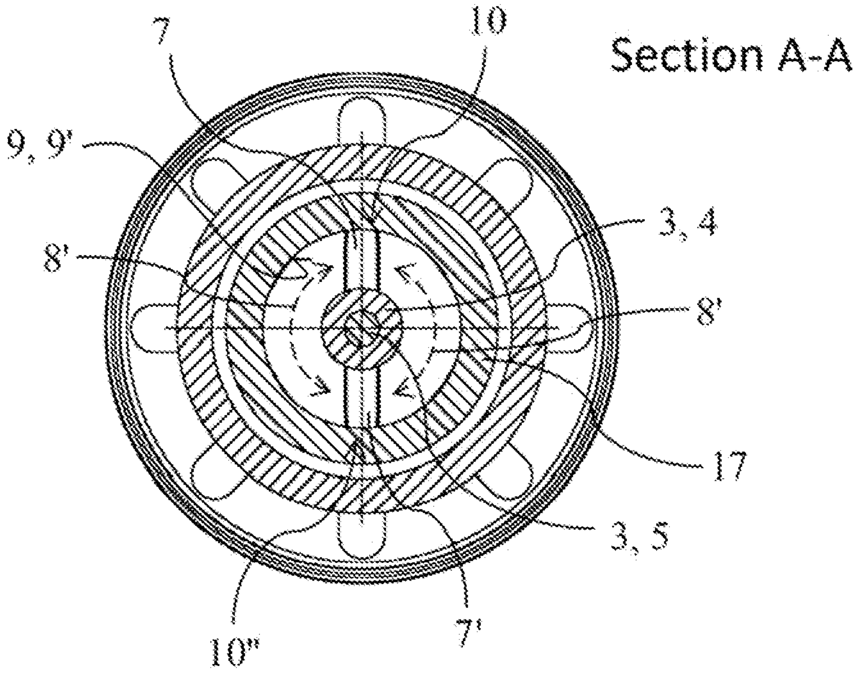
FIG. 12 is a cross-section through the paint channel according to section A-A from FIG. 11.

The cross-sectional design of the securing means 7 and the associated sliding bearing surface 8 can be seen in the cross-sectional view of FIG. 12 according to the section A-A from FIG. 11. In particular, it can be seen that the securing part 7 does not extend circumferentially over the entire circumference of the guide channel F', but rests against the wall 9 of the guide channel F' only in portions, in this case approximately over an angular range of a few degrees. As a result, the paint can flow laterally past the securing means 7 approximately unhindered via interruptions 8' of the securing means 7.

Furthermore, the reference signs 7', 8" and 10" indicate that, in addition to the securing means 7 with the sliding bearing surface 8, the front needle comprises a diametrically opposite second securing means 7' with an associated sliding bearing surface 8, which forms a second opposite sliding bearing 10" with the wall 9 of the guide channel F'.

However, instead of a front needle 4 having two securing means 7, 7', any other preferably radially symmetrical arrangement of a plurality of, and in particular precisely three, securing means 7 with correspondingly three sliding bearing surfaces 8 is also conceivable.

Figure 14:
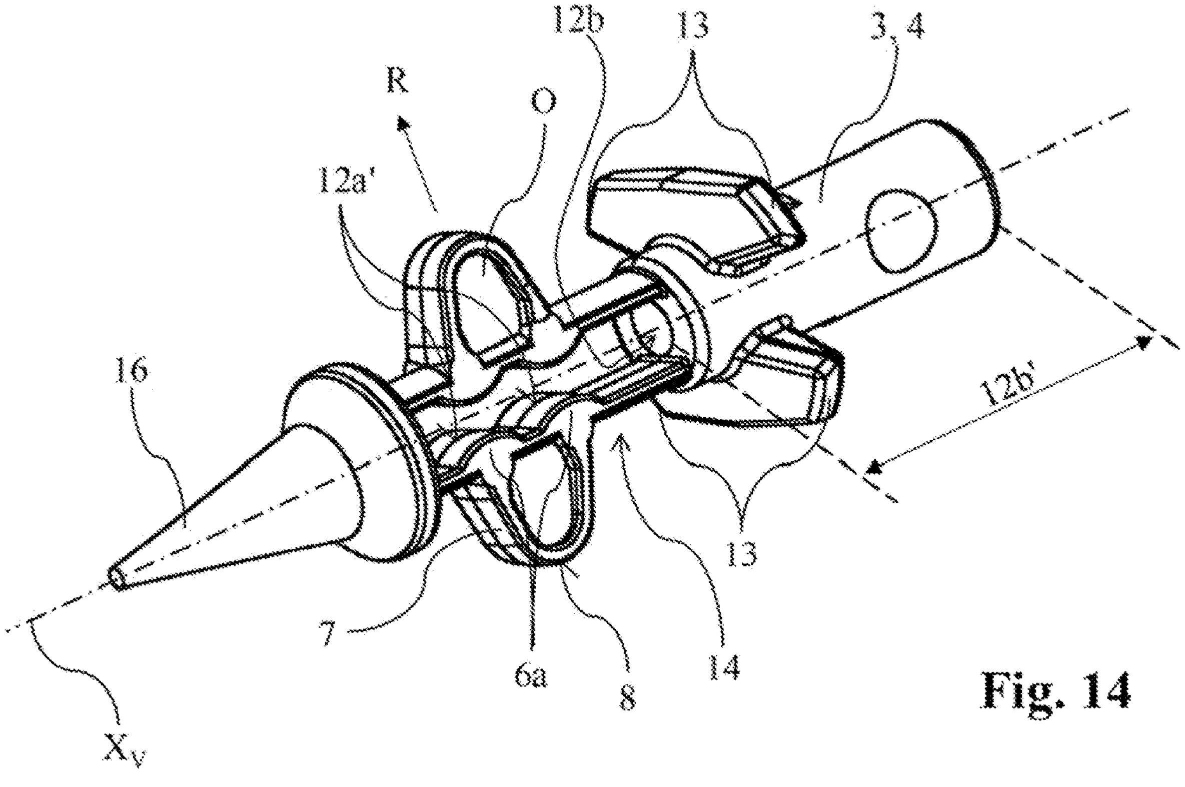
FIG. 14 is a perspective view of an alternative front needle for the paint spray gun from FIG. 8.
Figure 15:
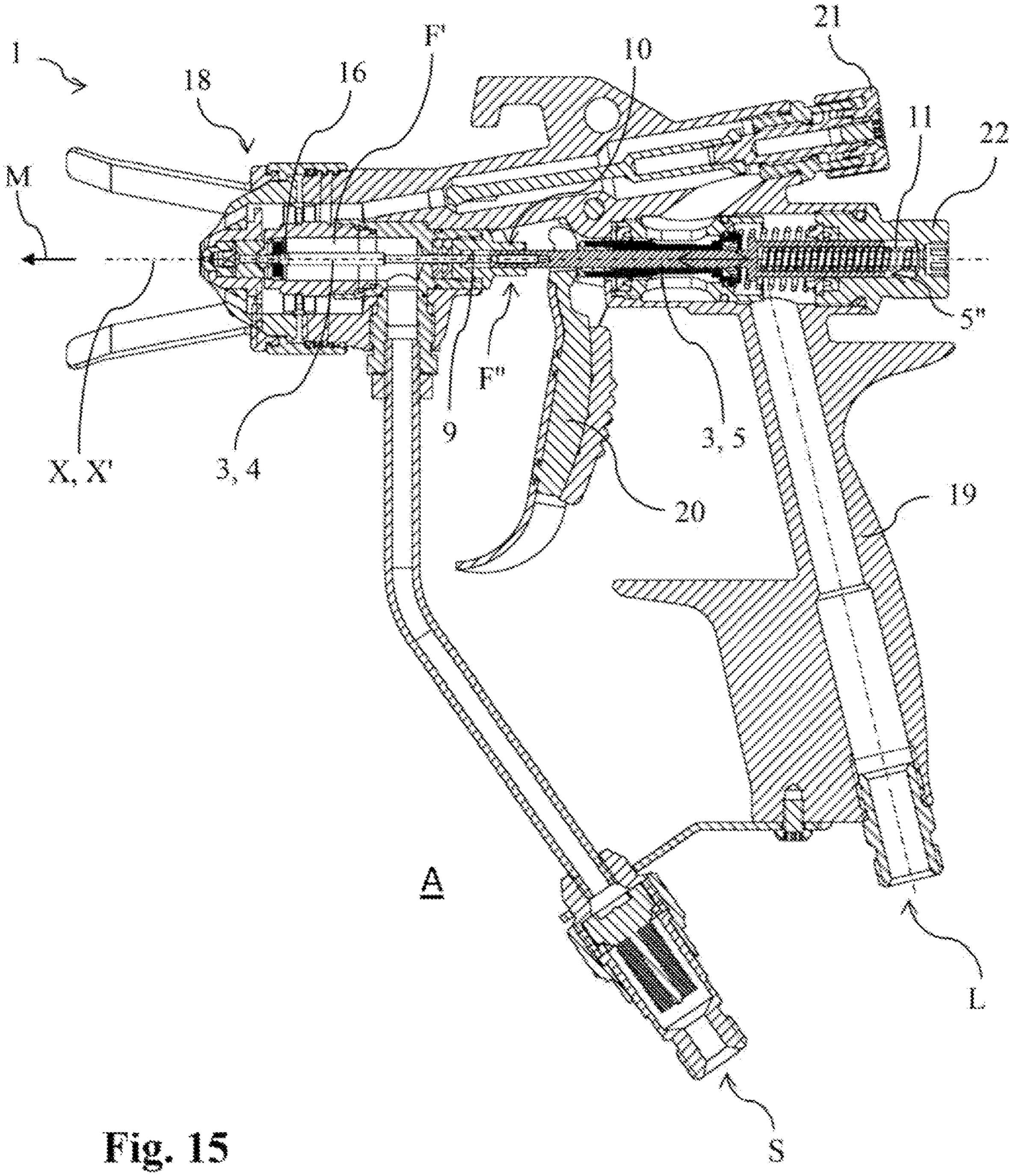
FIG. 15 is a sectional view of a third paint spray gun according to the invention in an operating state A.
Figure 16:
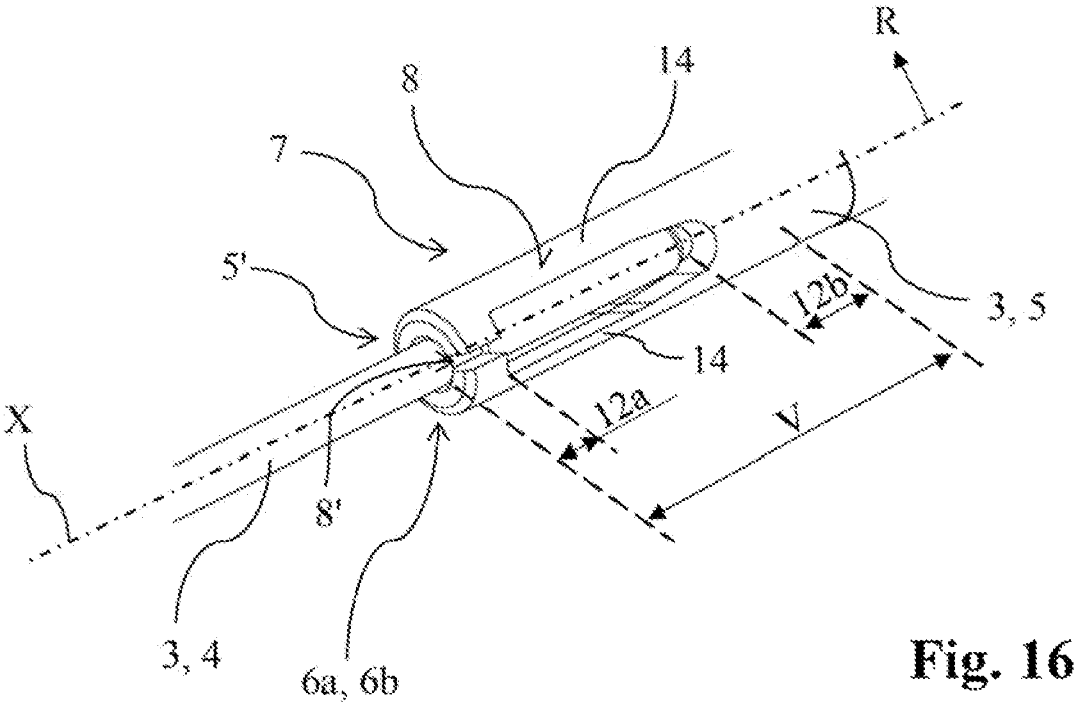
FIG. 16 is a perspective view of a connection portion between a front needle and a rear needle connected to the front needle for the paint spray gun from FIG. 15.

FIGS. 13 and 14 show a variant of the second embodiment of FIGS. 8 to 12, which differs from the second embodiment in that the front needle 4 is designed, analogously to the first embodiment, with spring tongues 14, and the front needle 4 is designed to be laterally open over a portion between the guide sleeve forming the tilting bearing 12*b* and the needle tip 16. The use of a spring tongue 14 can be made dependent on whether or which prestressing forces are realized in the form-fitting connection between the form-fitting elements 6*a,* 6*b* and how high release forces for releasing the axial form-fitting connection—that is to say pulling the front needle 4 off of the rear needle 5—need to be designed. Otherwise, reference is made to the statements relating to the preceding embodiments which are applicable analogously to this embodiment.

FIGS. 15 to 20 show a third embodiment of a paint spray gun according to the invention with a material needle 3 according to the invention, which spray gun is designed as a high-pressure paint spray gun analogously to the paint spray gun 1 of the first embodiment. In this regard, reference is made to the statements regarding the first embodiment which are applicable analogously to this embodiment.

The third embodiment differs substantially in the arrangement and the design of the connection portion V from the first embodiment. In the third embodiment, the front needle 4 is likewise connected to the rear needle via an axial form-fitting connection which is formed by form-fitting elements 6*a,* 6*b* of the front needle 4 or the rear needle 5. However, the form-fitting elements 6*b* are designed as latching projections on a front end 'of the rear needle 5' designed in a fork-like manner with two spring tongues 14, which engage in a circumferential annular groove at the axial rear end of the front needle 4', wherein the annular groove represents the form-fitting elements 6*a*.

Unlike in the first embodiment, the front, substantially cylindrical end of the rear needle 5' forms the securing means 7, wherein a circumferential surface of the cylindrical end of the rear needle 5' forms the sliding bearing surface 8. The circumferential surface is mounted in a guide channel F, which is designed as a guide bushing F" for the cylindrical front end of the rear needle 5'. The inner circumferential surface of the guide bushing F" forms the counter bearing surface required for the sliding bearing 10 in the form of the sliding surface 9'. Via the sliding bearing 10, the axial form-fitting connection is also secured here against release as long as the connection portion V is located between the front and rear needles 4, 5 within the guide channel F".

The securing means is released by displacement of the connection section V of the material needle along the longitudinal axis of the material needle X counter to the material dispensing direction M. The material needle is displaced in this direction until a point is reached at which the connection section V is located outside of the guide channel F", whereby the securing means is released. This state characterizes a maintenance state B.

Figure 17:
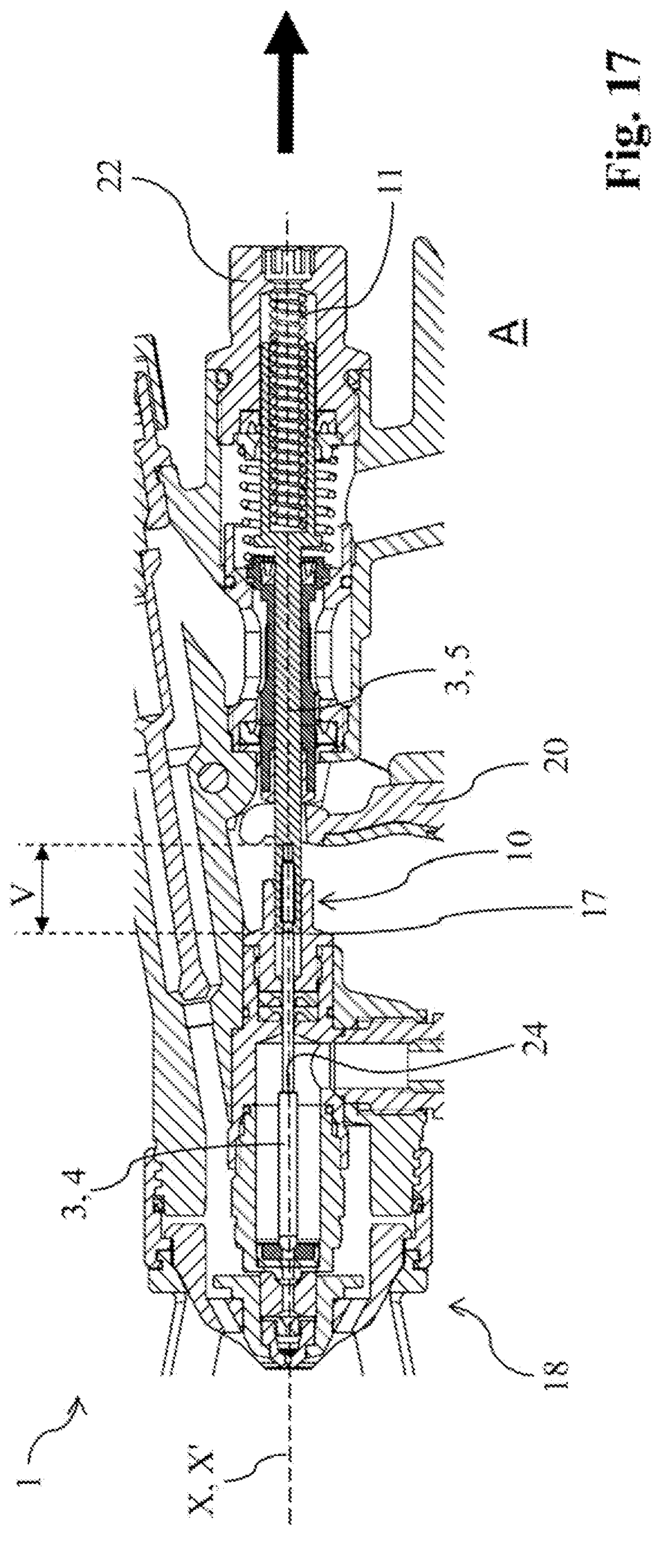
FIG. 17 is a detail of the longitudinal section from FIG. 15.
Figure 18:
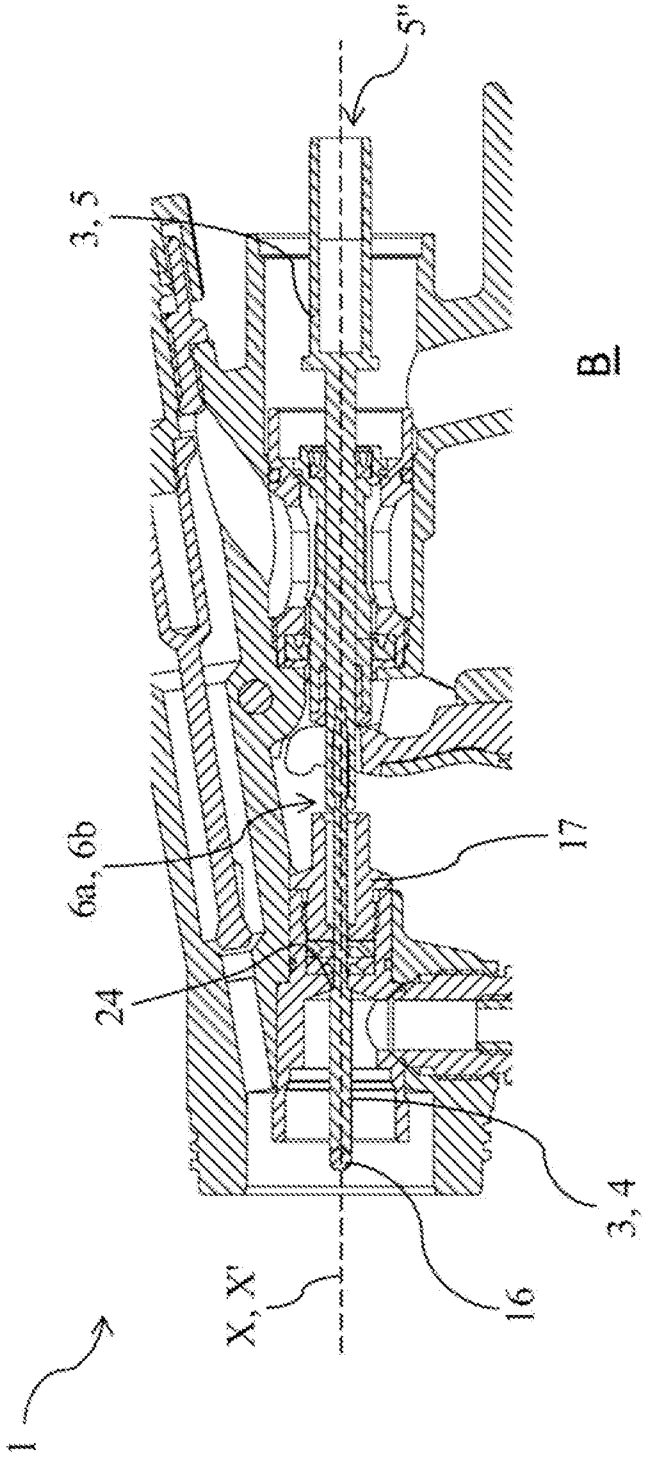
FIG. 18 is a longitudinal section according to FIG. 17 in a maintenance state B, in which an air cap, a channel component, and a rear part are removed.
Figure 19:
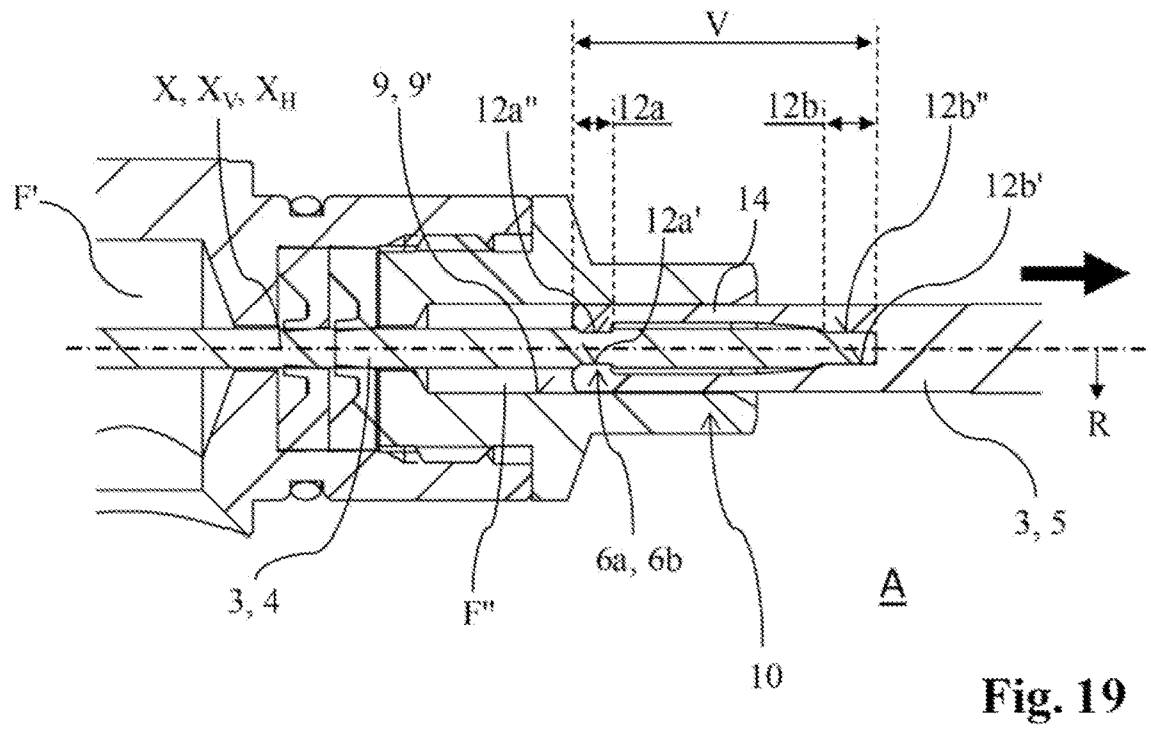
FIG. 19 is a detail of the longitudinal section from FIG. 17 with a material needle in an operating state A in which the connection portion is located within the guide channel.

Depending on the design of the paint spray gun 1, as indicated here in FIGS. 17 and 18, it may be necessary to remove a rear part 22 of the paint spray gun 1 in order to be able to move the material needle 3 counter to the material dispensing direction M, that is to say axially to the rear, until the point is reached at which the securing means is released. Only in this state is the securing of the axial form-fitting connection, that is to say the sliding bearing 10, released, and the front needle 4 can be removed from the rear needle 5 axially toward the front by applying an axial tensile force and exchanged with a new front needle. In order to facilitate this process, the front needle 4, in the region which is located in the material-carrying operating channel F' in the operating state A, can have a shoulder 24 at which the circumference of the front needle 3 widens from the rear to the front. The shoulder 24 can be designed in such a way that, after the release of the securing means and further retraction of the material needle 3, it abuts against a wall in the material-carrying channel F', wherein the connection between the front needle 4 and the rear needle 5 releases during further retraction. In the third embodiment, it is also necessary to remove an air cap 18 and a channel component 17 forming the paint channel F' before the front needle 4 is removed.

In addition, the rear part 22 can also serve as a material quantity regulation with which the maximum quantity of material discharged can be set. In the operating state A, the rear part 22 forms a stop for the rear end of the rear needle 5", which stop abuts against an inner surface of the rear part 22 at a maximum deflection of the material needle counter to the material dispensing direction M, that is to say when the extraction element 20 is completely released. If this stop or the rear part 22 itself is displaced counter to the material dispensing direction M, the material needle can be deflected further counter to the material dispensing quantity M, whereby the material valve can be opened further and a larger quantity of material can be dispensed. If the rear part is displaced in opposition, i.e., in the material direction, the maximum material dispensing quantity can be reduced. The rear part preferably has an adjusting mechanism which allows a translational movement relative to the longitudinal axis X of the material needle 3, which movement preferably takes place via a rotational movement in or counter to the circumferential direction and preferably in the manner of a screw gear. Such a material quantity regulation is used, preferably with air-atomizing low-pressure paint spray guns corresponding to FIGS. 8 to 14. However, these air-atomizing low-pressure paint spray guns can also be configured in a single-axis design corresponding to FIGS. 1 to 7, wherein the material valve or the material needle is preferably configured corresponding to FIGS. 9 to 11 or 13 and 14.

Figure 20:
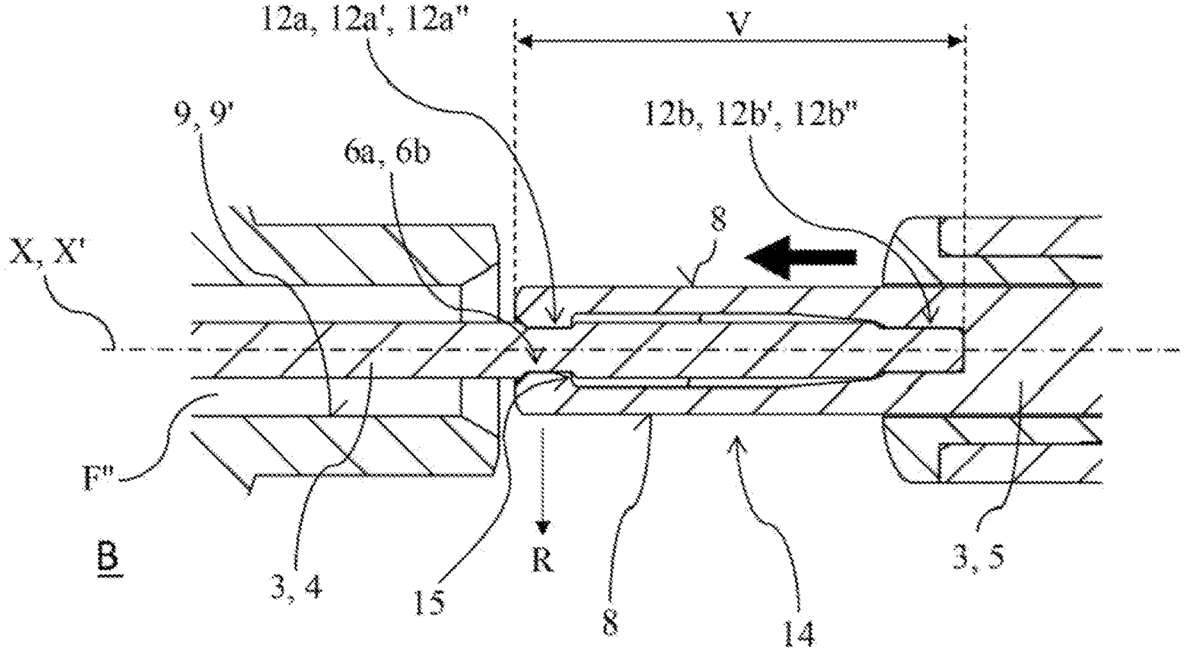
FIG. 20 is a detail of the longitudinal section from FIG. 18 with a material needle in a maintenance state B, in which the connection portion is located outside the guide channel.

As can be seen in particular from FIG. 20, an axially rear tilting bearing 12*b* in the material needle 3 is formed by a pin-shaped, cylindrical rear end of the front needle 4, wherein the opposite receiving opening of the rear needle 12*b*" is accommodated, preferably with a slight interference fit. A second tilting bearing 12*a* located further forward in the material dispensing direction M is formed by the form-fitting elements 6*b*, in the form of the latching projections, in interaction with the form-fitting elements 6*a*, in the form of the circumferential annular groove. The spring tongue 14 of the rear needle 5 does not touch the portion of the front needle 4 located between the first and the second tilting bearings 12*a* and 12*b*. A statically precisely determined location positioning of the front needle relative to the rear needle can thereby be achieved.

In all the figures except FIG. 12, for reasons of clarity, only one securing means 7, one spring tongue 14, etc. is referred to in each case, which, however, must not be understood to mean that only precisely one securing means 7, one spring tongue, etc. is provided in each case, rather, that at least one securing means 7, one spring tongue 14, etc., but in each case a plurality of such functional elements is expediently provided. As can be seen from FIGS. 1 to 7, in the embodiment shown therein, two diametrically opposite spring tongues 14, two diametrically opposite securing means 7, and two diametrically opposite form-fitting elements 6*a* are actually provided. Another circumferential distribution of, for example, three or more elements is likewise possible, insofar as the material flow in the material dispensing direction M remains ensured by the distribution and number of elements.

By means of the invention shown here, it is possible to produce a front needle that can be manufactured inexpensively and simply with a rear needle for use in a paint spray gun, which ensures excellent positional accuracy between a guide channel and the front needle and a front needle relative to a rear needle.

In reference to the figures and the above embodiments, preferred embodiments of the invention are described only by way of example. Other designs, materials or types of connection are conceivable and become apparent to a person skilled in the art when reading the embodiments and the prior art. All individual features of the embodiments can be combined with one another, even if this is not explicitly mentioned. This also relates to the embodiments per se. A person skilled in the art clearly recognizes if a combination is not possible or not useful. All embodiments can be applied to different types of paint spray guns, even if this is not explicitly described.

The invention described can be applied to all types of paint spray guns, even if these do not fall into the above categorization. In particular, the single-axis paint spray guns shown in the drawings 1 to 7 and 15 to 20 can also be equipped with a material valve corresponding to FIGS. 9 to 11 and 13 and 14, preferably as low-pressure paint spray guns. Furthermore, the connection between the front needle and the rear needle of FIGS. 1 to 7 and 9 to 14 can be combined with a connection corresponding to FIGS. 15 to 20. The connection of FIGS. 15 to 20 can also be used in a paint spray gun according to FIGS. 1 to 19.

The invention claimed is:

1. A material needle, which extends along a longitudinal axis, for a paint spray gun comprising a material nozzle, wherein the material needle is insertable into a guide channel of the paint spray gun and is displaceable along the longitudinal axis in order to open and close a nozzle opening of the material nozzle by means of a defined needle stroke movement, the material needle comprising:

- a front needle, which is at a front of the material needle in an axial direction, and a rear needle, which is at a rear of the material needle in the axial direction,
- wherein the front needle and the rear needle are releasably connected together in order to guide axial forces via an axial form-fitting connection,
- wherein the axial form-fitting connection is formed by front form-fitting elements, which are arranged on the front needle, and rear form-fitting elements, which are arranged on the rear needle,
- wherein the front and/or the rear form-fitting elements are elastically deflectable in a direction perpendicular to the longitudinal axis in order to release the axial form-fitting connection,
- wherein the axial form-fitting connection is secured against being released by a securing member which prevents a deflection of the front and/or rear form-fitting elements perpendicularly to the longitudinal axis,
- wherein the securing member comprises an externally sliding bearing surface of the front needle and/or the rear needle in order to interact with a corresponding sliding surface of the paint spray gun in a form-fitting manner.

2. The material needle of claim 1, wherein the sliding bearing surface is rounded in the direction of the longitudinal axis or is rounded in a circumferential direction.

3. The material needle of claim 1, wherein the maximum static frictional force between the sliding bearing surface of the front needle and/or the rear needle and the sliding surface of the channel of the paint spray gun is smaller than the force exerted by a counter-actuating element in the material dispensing direction on the material needle in the direction of the longitudinal axis and counteracting the needle stroke.

4. The material needle of claim 1, wherein the sliding bearing surface is continuously closed in a circumferential direction of the sliding bearing, is continuously closed along the longitudinal axis, or is designed with interruptions.

5. The material needle of claim 1, wherein the front needle and the rear needle, in order to ensure a coaxial alignment of a front needle axis and a rear needle axis, are connected together in a tilt-proof manner via at least two tilting bearings which are axially spaced apart from one another, wherein each tilting bearing comprises an outer circumferential bearing surface of the front needle and/or the rear needle extending along the longitudinal axis and an inner circumferential bearing surface of the rear needle and/or the front needle, which bearing surface extends along the longitudinal axis, wherein the inner circumferential bearing surface encloses the outer circumferential bearing surface in a contacting manner.

6. The material needle of claim 5, wherein at least one of the tilting bearings is designed as cylinder-cylinder-receptacle, wherein the inner circumferential bearing surface forms a cylinder receptacle and the outer circumferential bearing surface forms a cylinder.

7. The material needle of claim 5, wherein a tilting bearing is arranged at an end of the front needle, which end is at the rear in the axial direction.

8. The material needle of claim 5, wherein an inner circumferential or an outer circumferential bearing surfaces of a tilting bearing are simultaneously designed as the form-fitting elements of the axial form-fitting connection between the front needle and the rear needle.

9. The material needle of claim 1, wherein the front needle and the rear needle each form at least two form-fitting elements, each axially spaced apart from one another, for the axial form-fitting connection between the front needle and the rear needle.

10. The material needle of claim 1, wherein the front form-fitting elements are arranged in a front half of the front needle.

11. The material needle of claim 1, wherein the sliding bearing surface is designed axially at the height of the front form-fitting elements or the sliding bearing surface is arranged axially between two axially spaced apart form-fitting elements.

12. The material needle of claim 1, wherein the rear form-fitting elements are arranged at an end of the rear needle, which end is at the front in the axial direction.

13. The material needle of claim 1, wherein the guide channel is a material-carrying guide channel and the releasable connection between the front and rear needles is arranged within the material-carrying guide channel or wherein the guide channel is designed as a guide bushing which is not material-carrying and is arranged axially behind a material- carrying guide channel.

14. The material needle of claim 1, wherein the front needle forms guide surfaces for forming a second sliding bearing with the channel wall of the guide channel.

15. The material needle of claim 14, wherein the guide surfaces are located at a radial position different from the radial position of the sliding bearing surface of the securing member.

16. The material needle of claim 1, wherein the form-fitting elements of the front needle and/or the rear needle are arranged on radially deflectable spring tongues, in particular in such a way that the spring tongues of the front needle or the rear needle do not touch the rear needle or the front needle, respectively, in the connected state.

17. The material needle of claim 1, wherein the axial form-fitting connection between the front needle and the rear needle is prestressed in the radial direction, in particular by forming the pairing of the front form-fitting elements with the rear form-fitting elements as an interference fit.

18. The material needle of claim 1, wherein the axial form-fitting connection between the front and rear needles is designed to be not self-locking with respect to an axial tensile force in a release direction, and/or

- the material needle has a force transfer device acting between the front and rear needles, in particular in the form of a removal bevel, for converting an axial force component into a radial force component, namely in such a way that the force transfer device at least partially converts an introduced axial tensile force into a radial force which causes the form-fitting elements of the axial form-fitting connection between the front and the rear needles to be lifted off of one another.

19. The material needle of claim 1, wherein the securing member is radially elastically deformable.

20. A paint spray gun comprising the material needle of claim 1 mounted in the paint spray gun, wherein the sliding surface of the guide channel is made of a first material, and wherein the sliding bearing surface of the securing member is made of a second material different from the first material.

21. A method for exchanging the front needle of the material needle of claim 1, wherein the material needle is mounted in a paint spray gun, wherein the nozzle opening of the material nozzle of the paint spray gun defines an axis, with the longitudinal axis of the material needle coinciding with the axis of the nozzle opening, wherein the material needle is axially displaceable relative to the longitudinal axis in order to release or close the nozzle opening in an operating mode for spraying paint within a defined needle stroke in the guide channel, wherein the axially extending connection portion of the material needle is located at least in portions in the guide channel if the material needle is located within the defined needle stroke, and wherein the guide channel precisely defines a radial position of the connection portion and wherein the material needle is displaceable beyond the defined needle stroke in a maintenance mode so that the connection portion is located outside the guide channel, and wherein the front needle and the rear needle only and precisely then is able to be separated from one another if the connection portion is located outside the guide channel, the method comprising:

axial displacing the material needle beyond the defined needle stroke up to a point at which the connection portion is located outside of the guide channel, releasing the front needle from the rear needle, exchanging the front needle with a different front needle or reinserting the same front needle and connecting the front needle to the rear needle at the connection portion, axially inserting the material needle up to a point at which the connection portion is within the guide channel.

22. The method of claim 21, wherein the axial displacement of the material needle beyond the defined needle stroke up to a point at which the connection portion is located outside the guide channel takes place in the axial direction to the rear.

23. A method for exchanging the front needle of the material needle of claim 1, wherein the material needle is mounted in a paint spray gun, wherein the nozzle opening of the material nozzle of the paint spray gun defines an axis, with the longitudinal axis of the material needle coinciding with the axis of the nozzle opening, wherein the material needle is displaceable axially with respect to the longitudinal axis in order to open and close the nozzle opening in an operating mode for spraying paint within a defined needle stroke in the guide channel, wherein the sliding bearing surface of the front needle forms an axial sliding bearing with a wall of the guide channel, wherein the guide channel is extractable axially away from the material needle in a maintenance mode, so that contact between a channel wall of the guide channel and the sliding bearing surface is released, the method comprising:

axially removing the guide channel for releasing the sliding bearing surface of the front needle, exchanging the front needle with a different front needle or reinserting the same front needle, and applying the guide channel.

* * * * *